United States Patent
Diab

(10) Patent No.: US 7,130,863 B2
(45) Date of Patent: *Oct. 31, 2006

(54) METHOD FOR ENHANCING OBJECT-ORIENTED PROGRAMMING THROUGH EXTENDING METADATA ASSOCIATED WITH CLASS-BODY CLASS-HEAD BY ADDING ADDITIONAL METADATA TO THE DATABASE

(75) Inventor: Salleh Diab, Amherst, NH (US)

(73) Assignee: TableCode Software Corporation, Amherst, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/870,406

(22) Filed: Jun. 17, 2004

(65) Prior Publication Data

US 2005/0065942 A1    Mar. 24, 2005

Related U.S. Application Data

(60) Provisional application No. 60/505,908, filed on Sep. 24, 2003.

(51) Int. Cl.
*G06F 17/30* (2006.01)
*G06F 9/44* (2006.01)
*G06F 17/20* (2006.01)

(52) U.S. Cl. .............................. 707/103 R; 707/103 Z; 717/106

(58) Field of Classification Search ..... 707/100–104.1; 713/165–167; 715/750; 717/110–118, 100–101, 717/106, 120–121
See application file for complete search history.

(56) References Cited

U.S. PATENT DOCUMENTS

| 5,638,504 | A |   | 6/1997  | Scott et al. |
|-----------|---|---|---------|--------------|
| 5,778,356 | A | * | 7/1998  | Heiny ........................... 707/2 |
| 5,787,431 | A | * | 7/1998  | Shaughnessy ............... 707/100 |
| 5,937,409 | A | * | 8/1999  | Wetherbee ............... 707/103 R |
| 5,960,438 | A |   | 9/1999  | Chang et al. |
| 5,974,416 | A |   | 10/1999 | Anand et al. |
| 6,003,038 | A | * | 12/1999 | Chen ...................... 707/103 R |
| 6,025,836 | A | * | 2/2000  | McBride .................... 715/750 |
| 6,061,690 | A | * | 5/2000  | Nori et al. ............... 707/103 R |

(Continued)

FOREIGN PATENT DOCUMENTS

CA    2280284    *   2/2001    .................... 17/30

(Continued)

OTHER PUBLICATIONS

George Sotak, Picture Metadata toolkit, C++ style guide, document version: 1.1, Apr. 25, 2001 15 pages.*

(Continued)

*Primary Examiner*—Srirama Channavajjala
(74) *Attorney, Agent, or Firm*—Law Office of Jeffrey M. Weinick, LLC

(57) ABSTRACT

The invention relates to a method for enhancing an object-oriented programming language. The method includes declaring one or more class structures in databases having metadata describing characteristics defining the class structures. The method also includes extending the metadata associated with the class structures by adding any number of additional metadata to the databases.

24 Claims, 38 Drawing Sheets

U.S. PATENT DOCUMENTS

| | | | |
|---|---|---|---|
| 6,061,692 | A | 5/2000 | Thomas et al. |
| 6,085,198 | A | 7/2000 | Skinner et al. |
| 6,105,035 | A * | 8/2000 | Monge et al. .......... 707/103 R |
| 6,295,643 | B1 | 9/2001 | Brown et al. |
| 6,360,218 | B1 | 3/2002 | Zander et al. |
| 6,385,769 | B1 | 5/2002 | Lewallen |
| 6,505,188 | B1 | 1/2003 | Ghazal et al. |
| 6,513,112 | B1 | 1/2003 | Craig et al. |
| 6,529,921 | B1 | 3/2003 | Berkowitz et al. |
| 6,564,368 | B1 | 5/2003 | Beckett et al. |
| 6,587,856 | B1 * | 7/2003 | Srinivasan et al. ......... 707/102 |
| 6,591,272 | B1 * | 7/2003 | Williams ..................... 707/102 |
| 6,611,844 | B1 * | 8/2003 | Saulpaugh et al. ......... 707/100 |
| 6,647,391 | B1 | 11/2003 | Smith et al. |
| 6,704,745 | B1 | 3/2004 | Della-Libera et al. |
| 6,782,394 | B1 * | 8/2004 | Landeck et al. ......... 707/104.1 |
| 6,950,828 | B1 * | 9/2005 | Shaw et al. ............. 707/103 R |
| 2002/0138727 | A1 * | 9/2002 | Dutta et al. ................. 713/167 |
| 2003/0028550 | A1 * | 2/2003 | Lee et al. ................... 707/200 |
| 2003/0182652 | A1 | 9/2003 | Custodio |
| 2003/0208493 | A1 | 11/2003 | Hall et al. |
| 2003/0226132 | A1 * | 12/2003 | Tondreau et al. ........... 717/116 |
| 2003/0237051 | A1 | 12/2003 | LaMarca et al. |
| 2004/0064456 | A1 * | 4/2004 | Fong et al. ................. 707/100 |
| 2004/0230555 | A1 * | 11/2004 | Phenix et al. .................... 707/1 |
| 2005/0091640 | A1 * | 4/2005 | McCollum et al. ......... 717/117 |
| 2005/0125438 | A1 * | 6/2005 | Krishnaswamy et al. ... 707/102 |

FOREIGN PATENT DOCUMENTS

| | | | | |
|---|---|---|---|---|
| EP | 1585287 A2 | * | 10/2005 | ...................... 29/8 |
| GB | 2381898 | * | 5/2005 | ..................... 13/38 |
| WO | WO 99/33004 | * | 7/1999 | ..................... 17/30 |
| WO | WO 02/093430 A1 | * | 11/2002 | ..................... 17/30 |
| WO | WO 2004/053635 A2 | * | 6/2004 | |
| WO | WO 2005/008396 A2 | * | 1/2005 | |
| WO | WO 2005031510 A2 | * | 4/2005 | |
| WO | WO 2005/106705 A2 | * | 11/2005 | ..................... 17/20 |

OTHER PUBLICATIONS

Mary Jean Harrold et al. "incremental testing of object-oriented class structures", 1992 ACM, pp. 68-80.*

Salleh Diab et al. "tablecode: defining, extending and deploying object-oriented programs directly from databases", companion to the 20th annual ACM SIGPLAN conference on object-oriented programming systems, alnguages, and applications, 2005, pp. 192-193.*

Databasse on "Table Oriented Programming"with Fabian Pascal, posted Oct. 15, 2005, one page only.*

Gilad Bracha et al. "Mirrors: design principles for meta-level facilities of object-oriented programming languages", proceedings of the 19th annual ACM SIGPLAN conference on object-oriented programming systems, alngauges, and applications, 2004, pp. 331-344.*

R.J.Stroud et al. "using meta-objects to adapt a persistent object system to meet application needs", proceedings of the 6th workshop on ACM SIGOPS european workshop: mathcing operating systems to application needs, 1994, pp. 35-38.*

Tom Mens et al. delclarative meta programming to support software development: workshop report, ACM SIGSOFT Software engineering notes vol. 28, No. 2; Mar. 2003 3 pages.*

* cited by examiner

V.h

```
201 —— #include "other_object.h"    // Includes files
208 —— #include "W.h"

202 —— Class V : public W          // Class head as name, inheritance type and inheritance name  —— 209
        {                           // Start of Class Body
            protected:              // Visibility type
203 ——      double A;               // Atomic data
204 ——      other_object B;         // Composite data
205 ——  public:                     // Visibility type
206 ——      void C ( double );      // Method or function declaration
207 ——      int D;                  // Atomic data
        };                          // End of Class Body  —— 210
```

FIG. 2

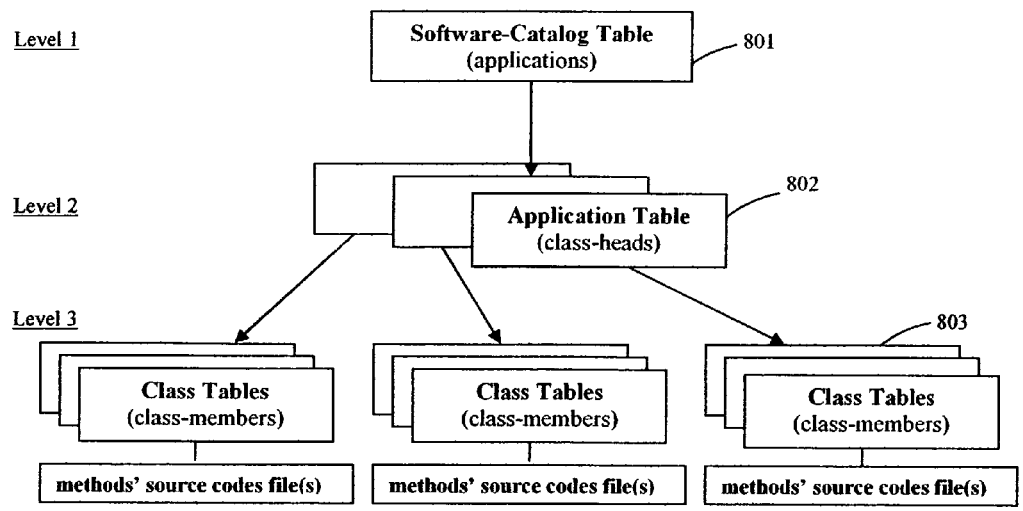
Fig. 8-A
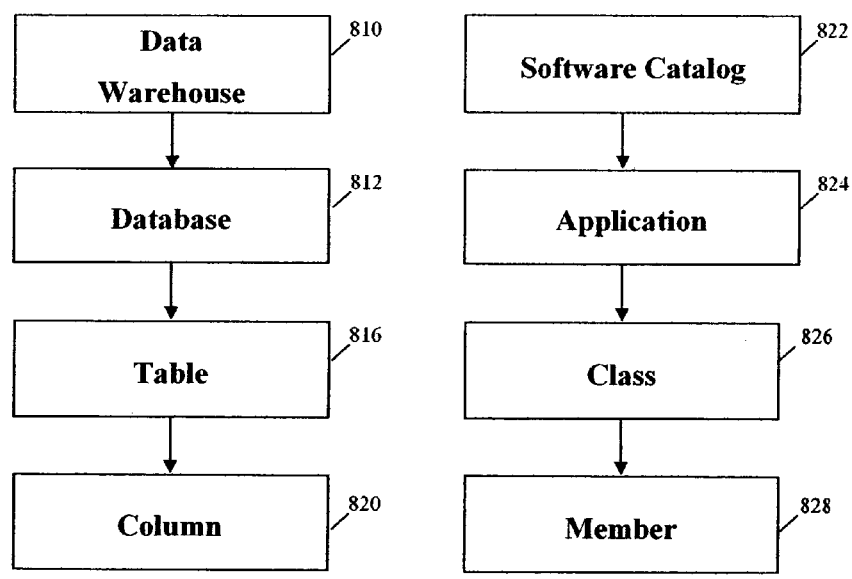
Fig. 8-B

| Corp-Software-Catalog-Metatable.pdf | | | | | 1000 |
|---|---|---|---|---|---|
| MetaID | Title | DataType | Width | Decim | Remarks |
| 1 | AID | Numeric | 4 | 0 | Application Unique ID |
| 2 | ApplName | Character | 16 | 0 | Application Name |
| 3 | ApplFile | Character | 64 | 0 | Application file name |
| 4 | ApplRole | Character | 16 | 0 | Application category (Data or Document) |
| 5 | ApplType | Character | 16 | 0 | Application Type (WordProcessing, Spreadsheet,CAD..) |
| 6 | Author | Character | 64 | 0 | Author Name |
| 7 | CreateDate | Character | 10 | 0 | Creation Date - MM/DD/YYYY Format |
| 8 | Version | Numeric | 12 | 2 | Version number |
| 9 | Parameters | Character | 32 | 0 | Parameters list for gerericity (Templates) |
| 10 | Inherit | Character | 64 | 0 | List of AID for Application table to inherit |
| 11 | Virtual | Boolean | 8 | 0 | Is the Application virtual? |
| 12 | Help | Character | 32 | 0 | Help message for the End User about the Application |
| 13 | Remarks | Character | 64 | 0 | Comments by Modeler - not used by program |

FIG. 10

Corp-Software-Catalog.pdf

FIG. 11

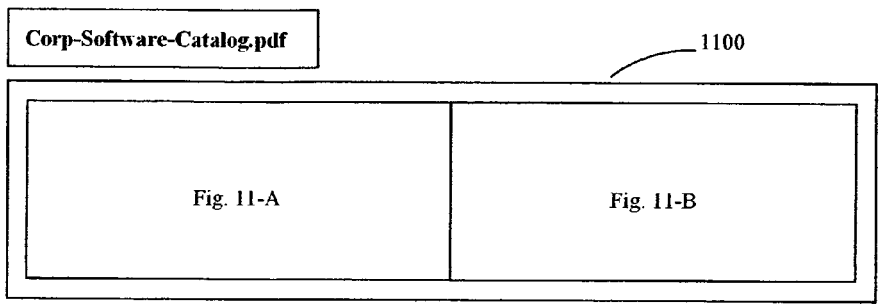

| AID | AppName | AppFile | AppRole | AppType | Author | CreateDate |
|---|---|---|---|---|---|---|
| 1 | CorpDBase | corp-dbase.dbf | Data | DBMS | SYD | 2/15/2004 |
| 2 | CorpCAD | corp-cad.dbf | Data | CAD | BJK | 11/1/2003 |
| 3 | CorpSpreadSheet | corp-spreadsheet.dbf | Data | Spreadsheet | MGT | 4/19/2004 |
| 4 | FX-Management | fx-man.dbf | Data | fxman | SYD | 2/19/2004 |
| 5 | Book | CorpBook.dbf | Document | BookMngr | JK | 1/10/2003 |
| 6 | ConstructDoc | ConsDoc.dbf | Document | DocMngr | YD | 4/19/2004 |

Fig. 11-A

| Version | Parameters | Inherit | Virtual | Help | Remarks |
|---|---|---|---|---|---|
| 1.02 | | | | Corp DBMS on Oracle | Designed by Sales Dept |
| 1.21 | | | | Customized CAD System for electrical | ASM Group |
| 2.02 | | | | Customized SpreadSheet | Designed by FN Dept |
| 1.01 | | | | Facility Management for all branches | Designed by Mark J. |
| 1.02 | | | | Formatting a book style | Marketing |
| 1.21 | | | | Construction Document Project | CAD Dept |

Fig. 11-B

| Application-Metatable.dbf | | | | | 1200 |
|---|---|---|---|---|---|
| MetaID | Title | DataType | Width | Decim | Remarks |
| 1 | OID | Numeric | 4 | 0 | Object Unique ID |
| 2 | ObjectName | Character | 16 | 0 | Object Class Name |
| 3 | ClassFile | Character | 64 | 0 | Class Schema file name |
| 4 | DataFile | Character | 64 | 0 | Data file name that store object-instances |
| 5 | Abstractness | Character | 10 | 0 | Abstract or Concrete class |
| 6 | ObjRole | Character | 12 | 0 | Object Category use to organize Menu |
| 7 | RoleTitle | Character | 16 | 0 | Name to display for the category |
| 8 | Inheritance | Character | 32 | 0 | list of OID's for the Table/Object to inherit |
| 9 | InheritAccess | Character | 64 | 0 | Access for the inheritance list e.g. Public |
| 10 | Parameters | Character | 32 | 0 | Parameters list for Templates for Genericity |
| 11 | Virtual | Character | 8 | 0 | Is the class virtual |
| 12 | Vers | Numeric | 8 | 2 | Version for the Table/Class |
| 13 | Auth | Numeric | 6 | 0 | Authorization level for the class |
| 14 | Help | Character | 32 | 0 | Help message for the End User about the class |
| 15 | Transaction | Character | 12 | 0 | Transaction mechanism to use |
| 16 | Locking | Character | 12 | 0 | Locking mechanism to use |
| 17 | StorageType | Character | 12 | 0 | Type of persistence storage for instances |
| 18 | Recovery | Character | 12 | 0 | Recovery mechanism to use |
| 19 | Author | Character | 64 | 0 | Author Name |
| 20 | Remarks | Character | 32 | 0 | Comments by Modeler - not used |

FIG. 12

| Application Table (Corp-Cad.dbf) | 1300 |
|---|---|
| Fig. 13-A | Fig. 13-B |

FIG. 13

| OID | ObjectName | ClassFile | DataFile | Abstractness | ObjRole | RoleTitle | Inherit | InhritAccess | Parameters |
|---|---|---|---|---|---|---|---|---|---|
| 1 | EntityHeader | SchEntHeader.dbf | | Abstract | None | | 0 | Public | |
| 2 | TableHeader | SchTblHeader.dbf | | Abstract | None | | 0 | Public | |
| 3 | Line | SchLine.dbf | Line.dbf | Concrete | Product | Draw | 1 | Public | |
| 4 | Arc | SchArc.dbf | Arc | Concrete | Product | Draw | 1 | Private | |
| 5 | Text | SchText.dbf | Text.dbf | Concrete | Product | Draw | 1 | Private | |
| 6 | Wall | SchWall.dbf | | Abstract | None | | 0 | Public | |
| 7 | Layer | SchLayer.dbf | Layer.dbf | Concrete | Attribute | Tables | 2 | Private | |
| 8 | TextStyle | SchTextStyle.dbf | TextStyle.dbf | Concrete | Attribute | Tables | 2 | Private | |
| 9 | LineType | SchLineType.dbf | Ltype.dbf | Concrete | Attribute | Tables | 2 | Private | |
| 10 | Cursor | SchCursor.dbf | Cursor.dbf | Concrete | Tools | Settings | 0 | Private | |
| 11 | BrickWall | SchBrickWall.dbf | BrickWall.dbf | Concrete | Product | Draw | 3,6 | Public,Public | |
| 12 | Dimension | SchDimension.dbf | Dimension.dbf | Concrete | Product | Draw | 1 | Private | |
| 13 | Snap | SchSnap.dbf | Snap.dbf | Concrete | Tools | Settings | 0 | Private | |
| 14 | Coord | SchCoord.dbf | Coord.dbf | Concrete | None | Draw | 0 | Private | |
| 15 | Color | SchColor.dbf | Color.dbf | Concrete | Attribute | Tables | 0 | Private | int, numeric |

Fig. 13-A

| Virtual | Vers | Auth | Help | Transaction | Locking | StorageType | Recovery | Author | Remarks |
|---|---|---|---|---|---|---|---|---|---|
| Yes | 1 | 1 | Entity Header | | | | | J.Thomas | Base Class |
| Yes | 1 | 1 | Table Header | | | | | J.Thomas | Base Class |
| Yes | 1 | 2 | Line Object | Tr-12 | lk-1 | db-1 | recv-1 | L.Smith | Derived Class |
| No | 1 | 2 | Arc Object | Tr-12 | lk-1 | db-1 | recv-1 | L.Smith | Derived Class |
| No | 1 | 2 | Text Object | Tr-12 | lk-1 | db-1 | recv-1 | L.Smith | Derived Class |
| No | 1 | 4 | Wall Object | | | | | M.Clarck | Base Class |
| No | 1 | 2 | Layer Table | Tr-6 | lk-3 | db-2 | recv-2 | D.Wells | Derived Class |
| No | 1 | 2 | Style Table | Tr-6 | lk-3 | db-2 | recv-2 | J.Thomas | Derived Class |
| No | 1 | 2 | LineType table | Tr-6 | lk-3 | db-2 | recv-2 | J.Thomas | Derived Class |
| No | 1 | 1 | Cursor Shape | Tr-2 | lk-10 | db-2 | recv-2 | D.Wells | Base Class |
| No | 1 | 8 | Brick Wall Object | Tr-19 | lk-15 | db-2 | recv-2 | M.Clarck | Derived Class |
| No | 1 | 2 | Dimension Object | Tr-14 | lk-5 | db-2 | recv-2 | J.Thomas | Derived Class |
| No | 1 | 8 | Snap settings | Tr-1 | lk-11 | db-2 | recv-2 | M.Clarck | Base Class |
| Yes | 1 | 3 | Pt Coordinates | Tr-12 | lk-1 | Tree | recv-1 | S.Clarck | Base Class |
| No | 1 | 5 | Color Number | Tr-6 | lk-3 | db-2 | recv-2 | D.Wells | Base Class |

Fig. 13-B

| | Class-Metatable.dbf | | | | | 1400 |
|---|---|---|---|---|---|---|
| MetaID | Title | DataType | Width | Decim | Description | |
| 1 | MemberID | Numeric | 6 | 0 | Unique ID for the member | |
| 2 | AttributeName | Character | 16 | 0 | Member/Field Name - naming convention conforming with Extension PL | |
| 3 | VisibilityType | Character | 10 | 0 | Public, Protected or Private to access attribute value | |
| 4 | MemberType | Character | 16 | 0 | Atomic data, Composite data or Function | |
| 5 | OODataType | Character | 16 | 0 | Data type to use at run time for object structure in memory | |
| 6 | LinkFile | Character | 32 | 0 | File name if Member Type is Composite (Join) or Function | |
| 7 | DBDatatype | Character | 8 | 0 | Data type to use in the data table | |
| 8 | Width | Numeric | 5 | 0 | Field Width in DB table | |
| 9 | Decim | Numeric | 7 | 0 | Field Decimal number | |
| 10 | IsPKey | Character | 5 | 0 | Is primary key - used in joining tables and is ordered | |
| 11 | IsFKey | Character | 5 | 0 | Is foreign key - used in joining tables | |
| 12 | IsOrdered | Character | 10 | 0 | Used to sort the table on that field in reports. | |
| 13 | ScopeLevel | Integer | 8 | 0 | level is bit value: Class=0 Query=1 Instance=2 | |
| 14 | changeable | Character | 12 | 0 | Is the attribute has a fixed value or changeable | |
| 15 | Multiplicity | Character | 12 | 0 | Is '0 or 1', 0 or more', 'unique' or '1 or more' | |
| 16 | DefaultValue | Character | 32 | 0 | Default value for the attribute | |
| 17 | Prompt | Character | 24 | 0 | Prompt message to get value to display in prompt area | |
| 18 | Message | Character | 24 | 0 | Message to display for this attribute in display area | |
| 19 | Icon | Character | 16 | 0 | Icon or images as alternate to use in Menu system | |
| 20 | Trigger | Character | 16 | 0 | Trigger function name | |
| 21 | AuthorizeLevel | Character | 12 | 0 | User access level for the member | |
| 22 | Version | Character | 12 | 0 | Version for the member for automatic upgrade | |
| 23 | Help | Character | 32 | 0 | Help message for the end user | |
| 24 | Remarks | Character | 32 | 0 | Comments by Modeler - not used by the program | |

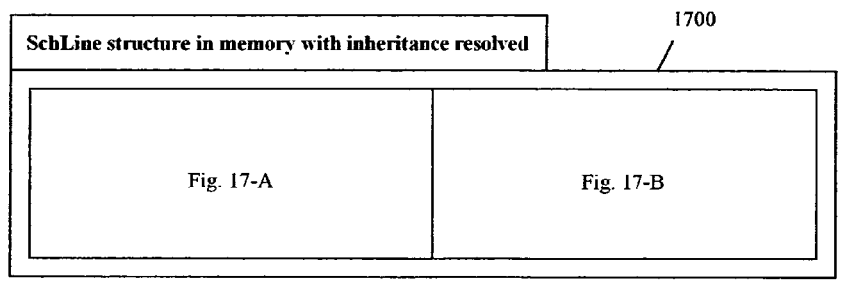

FIG. 17

| MembID | AttribName | VisibType | MembType | OODataType | LinkFile | DBDataType | Width | Decim | IsPKey | IsFKey | IsOrdered |
|---|---|---|---|---|---|---|---|---|---|---|---|
| 2.1.1 | EID | Private | Atomic | int | | Numeric | 8 | 0 | 0 | 0 | 0 |
| 2.1.2 | Layer | Protected | Composite | String | layer.dbf | Character | 24 | 0 | 0 | 1 | 0 |
| 2.1.3 | LType | Protected | Composite | String | type.dbf | Character | 24 | 0 | 0 | 1 | 0 |
| 2.1.4 | Color | Public | Composite | Generic | color.dbf | Generic | 12 | 0 | 0 | 1 | 0 |
| 2.1.5 | LineWt | Public | Atomic | int | | Numeric | 12 | 4 | 0 | 0 | 0 |
| 2.1.6 | Pen | Public | Atomic | int | | Numeric | 6 | 0 | 0 | 0 | 0 |
| 2.3.1 | Point1 | Protected | Composite | String | Coord.pdf | Character | 36 | 4 | 0 | 1 | 0 |
| 2.3.2 | Point2 | Protected | Composite | String | Coord.pdf | Character | 36 | 4 | 0 | 1 | 0 |
| 2.3.3 | Length | Protected | Atomic | Real | | Numeric | 12 | 4 | 0 | 0 | 0 |
| 2.3.4 | Draw | Private | Function | String | cadsys.asc | Character | 10 | 0 | 0 | 0 | 0 |
| 2.3.5 | Move | Private | Function | String | cadsys.asc | Character | 10 | 0 | 0 | 0 | 0 |
| 2.3.6 | Copy | Private | Function | String | cadsys.asc | Character | 10 | 0 | 0 | 0 | 0 |
| 2.3.7 | Delete | Private | Function | String | cadsys.asc | Character | 10 | 0 | 0 | 0 | 0 |
| 2.3.8 | Change | Private | Function | String | cadsys.asc | Character | 10 | 0 | 0 | 0 | 0 |

Fig. 17-A

| ScopeLev | Changeable | Multiplicity | DefaultVal | Prompt | Message | Icon | Trigger | AuthLev | Version | Help | Remarks |
|---|---|---|---|---|---|---|---|---|---|---|---|
| 2 | 0 | 1 | | | | | | 0 | 1.01 | Entity Handle | ID |
| 2 | 1 | 1 | 0 | Select layer | F10 to exit | _ly | | 1 | 1.01 | Layer for Ent | ly |
| 2 | 1 | 1 | 0 Continuous | Select ltype | F10 to exit | _ltp | | 1 | 1.01 | Ltype for Ent | ltyp |
| 2 | 1 | 1 | 7 | Select color | F10 to exit | _col | | 16 | 1.01 | Ent Color | col |
| 2 | 1 | 1 | 1 | Enter LnWt | | _lwt | | 16 | 1.01 | Ent LnWt | lwt |
| 2 | 1 | 1 | 1 | Enter pen# | | _pen | | 16 | 1.01 | Ent Pen | pen# |
| 2 | 1 | 1 | | First Point | F10 to exit | | | 44 | 1.01 | Line First point | p1 |
| 2 | 1 | 1 | | End Point | F10 to exit | | | 44 | 1.01 | Line End point | p2 |
| 1 | 0 | 1 | | | | | trig_func | 87 | 1.01 | Line Length | len |
| 0 | 0 | 0 | draw | | | _dr | | 1 | 1.01 | Draw a line | draw |
| 0 | 0 | 0 | move | | | _mv | | 1 | 1.01 | Move a line | mv |
| 0 | 0 | 0 | copy | | | _cp | | 1 | 1.01 | Copy a line | cp |
| 0 | 0 | 0 | erase | | | _del | | 1 | 1.01 | Erase a line | del |
| 0 | 0 | 0 | change | | | _chg | | 1 | 1.01 | Chg properties | chg |

Fig. 17-B

| EID | Layer | LType | Color | LineWt | Pen | Point1 | Point2 |
|---|---|---|---|---|---|---|---|
| 2.3.0.1 | floor1 | dashed | 3 | 0.1 | 2 | 34 | 35 |
| 2.3.0.2 | floor1 | dashed | 3 | 0.1 | 2 | 35 | 36 |
| 2.3.0.3 | floor1 | dashed | 3 | 0.1 | 2 | 36 | 37 |
| 2.3.0.4 | floor1 | dashed | 3 | 0.1 | 2 | 37 | 34 |
| 2.3.0.5 | floor2 | Continuous | 32 | 0 | 1 | 42 | 43 |
| 2.3.0.6 | floor2 | Continuous | 32 | 0 | 1 | 43 | 44 |
| 2.3.0.7 | floor2 | Continuous | 32 | 0 | 1 | 44 | 45 |
| 2.3.0.8 | floor2 | Continuous | 32 | 0 | 1 | 45 | 42 |

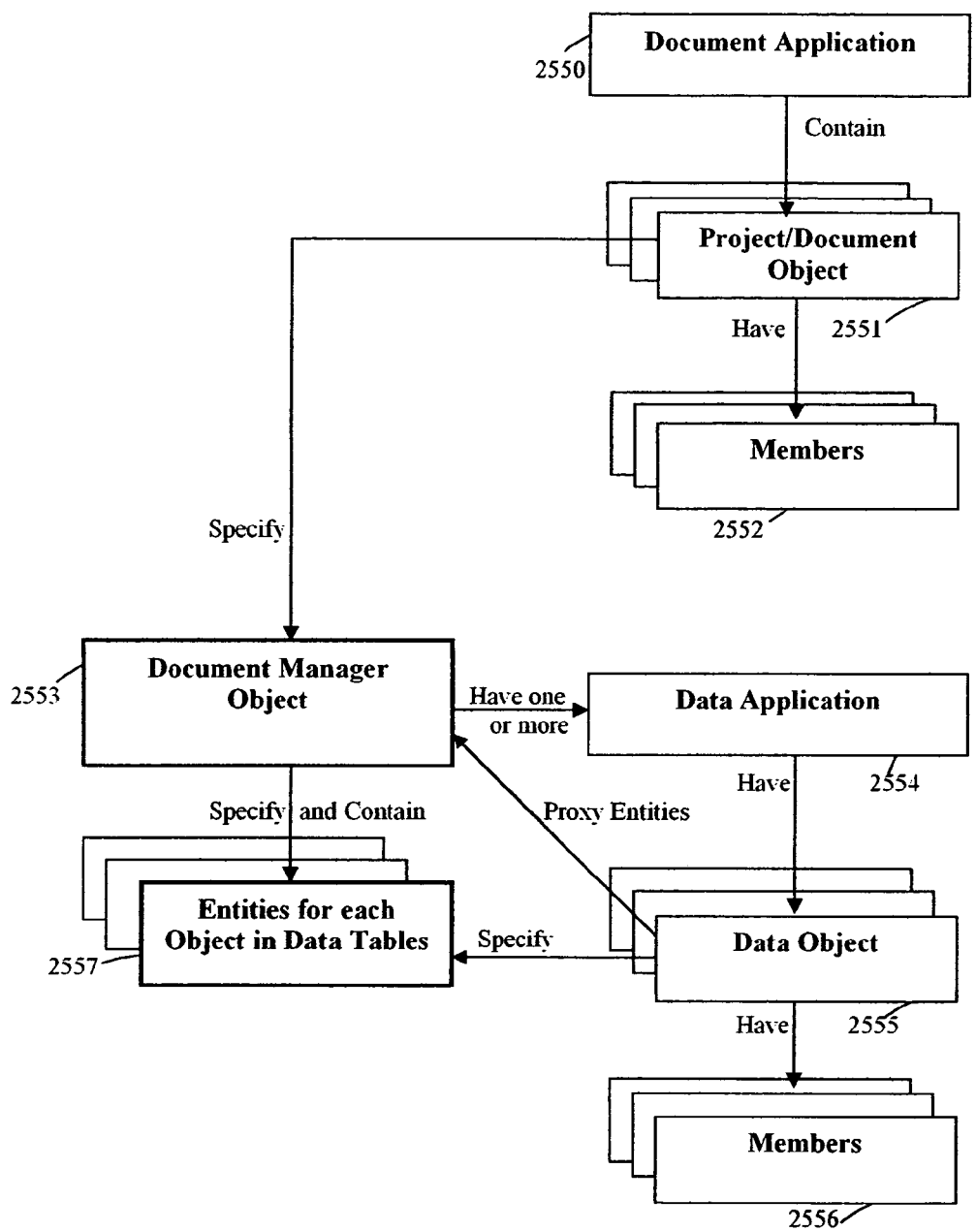
Fig. 25-A

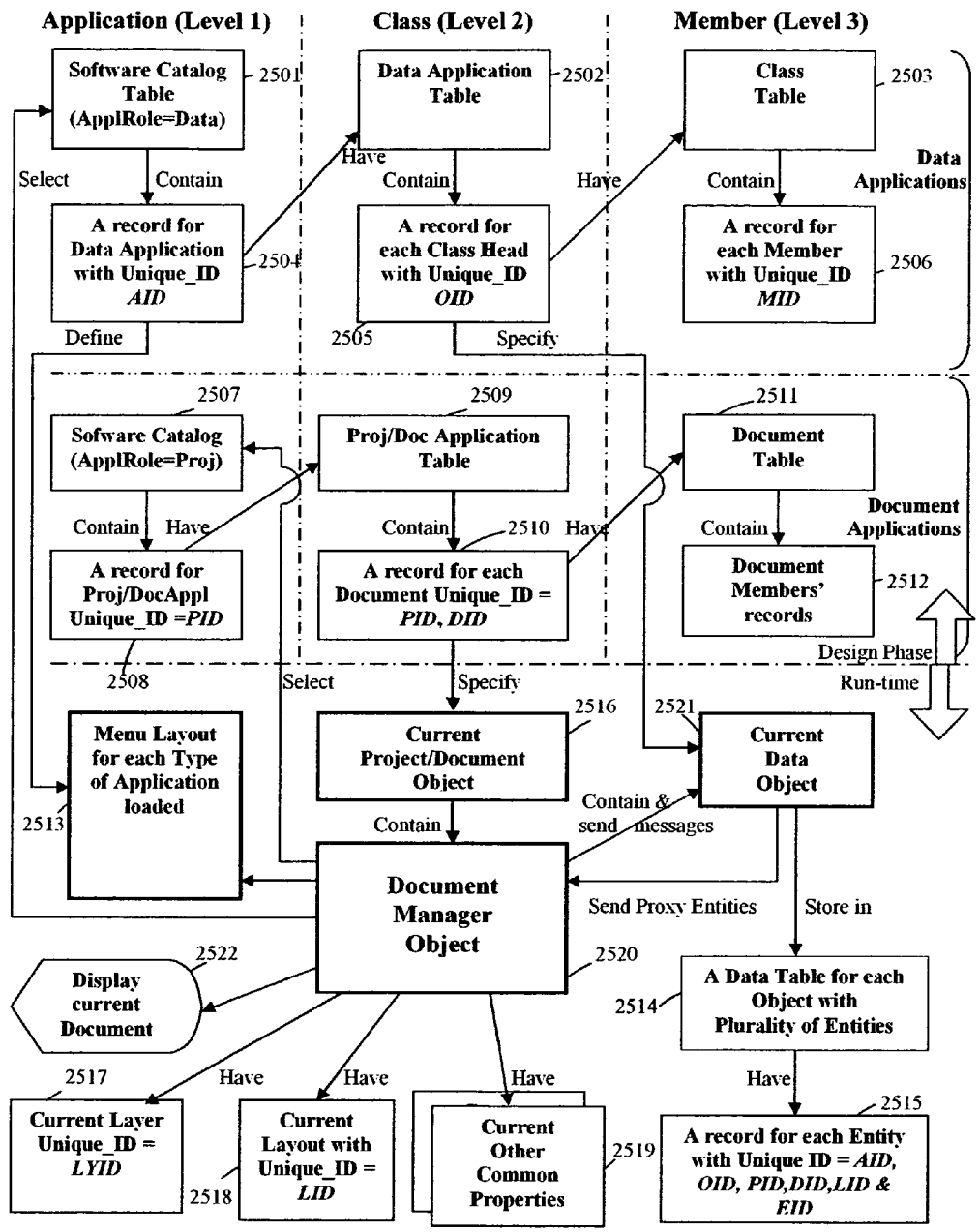
Fig. 25-B

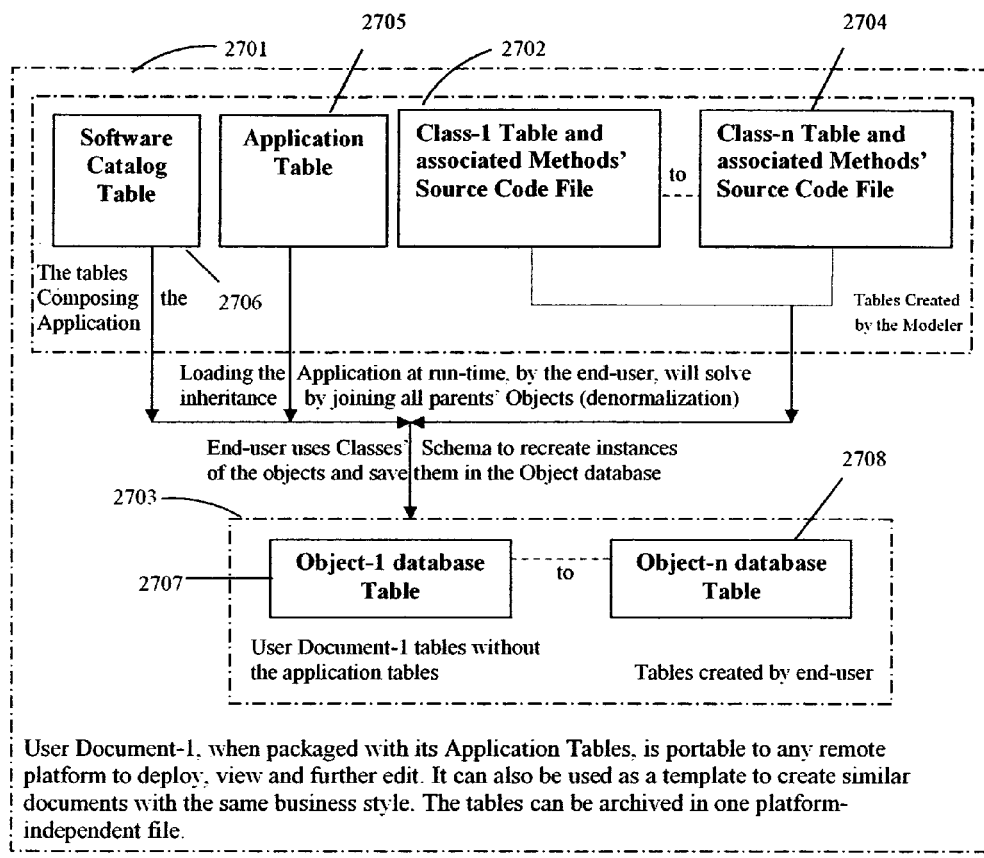
Fig. 27-A

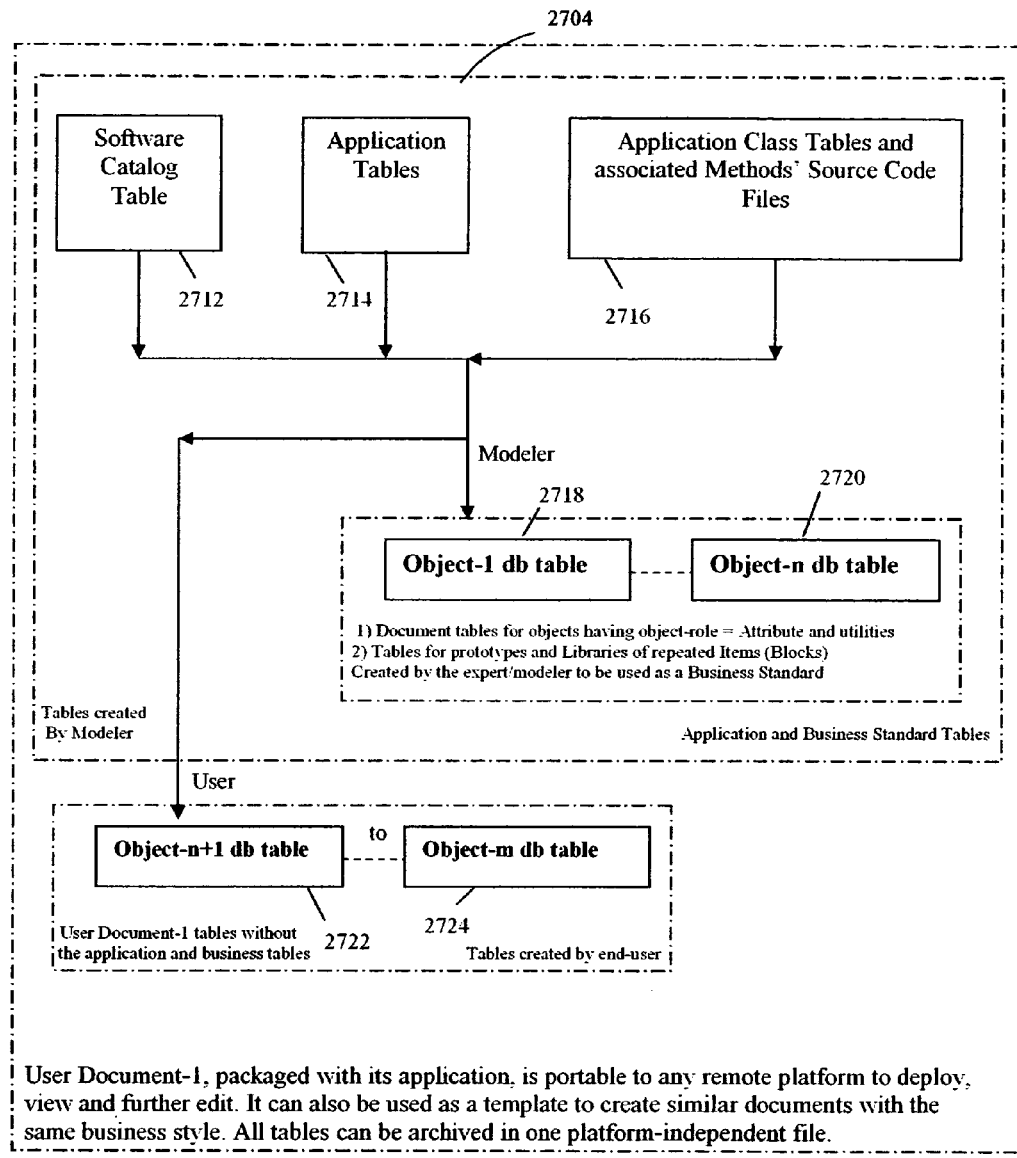
Fig. 27-B

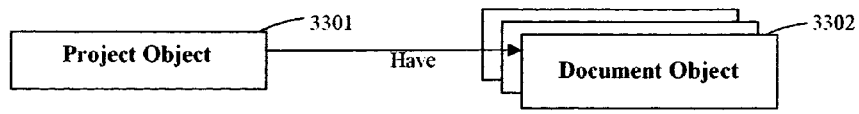
FIG. 33
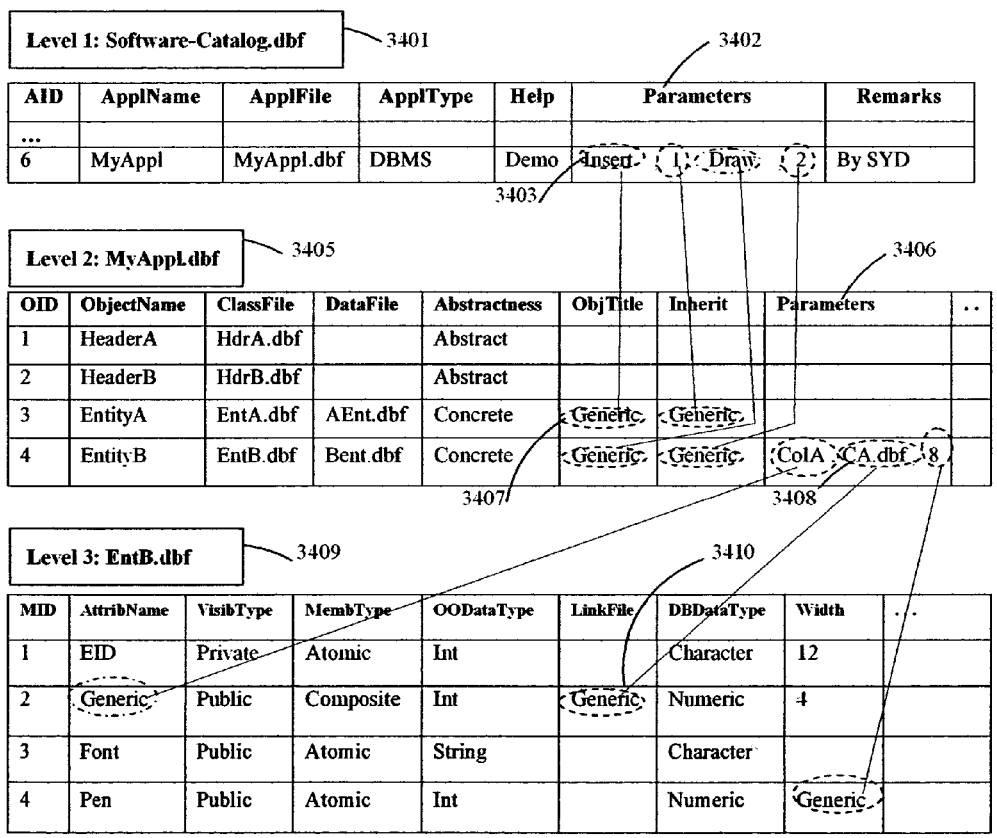
Fig. 34-A

METHOD FOR ENHANCING OBJECT-ORIENTED PROGRAMMING THROUGH EXTENDING METADATA ASSOCIATED WITH CLASS-BODY CLASS-HEAD BY ADDING ADDITIONAL METADATA TO THE DATABASE

CROSS-REFERENCE TO RELATED APPLICATIONS

This application claims the benefit of U.S. Provisional Application No. 60/505,908, entitled "Direct deployment of an object-oriented application written as a set of relational database tables," filed Sep. 24, 2003. The provisional application Ser. No. 60/505,908 is incorporated by reference herein.

TECHNICAL FIELD

The present invention relates to an object-oriented programming environment that uses relational database management system techniques for the software development.

BACKGROUND

Innovation in the modern business world is often an unquenchable necessity which demands more from, and imposes more complexity upon, software. Conventional software development is itself frequently a complex process typically consisting of authoring source code using a particular programming language. Most modern-day software applications are created using a high level object-oriented programming language ("OOPL") such as C++, Smalltalk, or Java®. The object-oriented approach to programming subsists around "objects," which are structured software entities comprising, for example, data elements (or attributes) and methods (or functions). The attributes and functions can enable objects to model virtually any real-world entity in terms of the entity's characteristics. In object-oriented programming, the programmer traditionally designs a program as a set of cooperating objects rather than as a set of cooperating functions.

Although the object-oriented approach is generally intended to model objects and help create structure, current OOPLs instead, and perhaps ironically, typically require programming codes to be written in an unstructured text environment understood only by those skilled in the art of programming. That is, using a particular OOPL typically requires thorough familiarity with, and adherence to, grammatical rules, syntax and language for that OOPL, and written code can quickly become voluminous and hard to manage for a software project. As a result, the development, design, comprehension and/or maintenance of software is often burdensome and difficult.

Further, software programs are conventionally compiled and delivered in binary format, which cannot be comprehended or modified. Finally, OOPLs typically do not support multi-applications documents. Instead, OOPLs generally support single application documents because they are produced for a single software application.

Thus, an expert in a particular field (i.e., a domain expert) or business usually cannot read, write, customize, enhance or modify an object-oriented program that the domain expert uses for personal or business computing.

Meanwhile, relational database tools currently represent a relatively mature and popular technology with which software developers and non-developers alike have extensive familiarity. Database tables are clean, self descriptive, intuitive and able to organize complex information while remaining easy to work with. Adding an object-oriented paradigm to database management systems (DBMS) has been known in the art for some time, and emerged as a new breed of database technology. However, software development continues to be done in the traditional, difficult, time-consuming, and costly way of text-based source code.

As software is increasingly looked for to be a vehicle and catalyst for innovation, the methodology for software development should be as simple as possible, yet still yield high quality applications. In other words, the true rewards of software lie in the destination (applications) and not the voyage (coding). Unfortunately, the voyage throughout the lifecycle of any software project using traditional development tools is, more often than not, a difficult and costly one—inviting complexity with maybe a million lines of code, lowering productivity between developers trying to make the "puzzle fit," increasing costs, decelerating time-to-market, and widening the chasm between software development and domain knowledge. And, as generally difficult as it may be for a professional programmer to design, develop, deploy and manage software, it is nearly impossible for a domain expert or businessperson to do so using traditional OOPLs. The solution to these obstacles may be found in the language of tables.

Accordingly, a tabular software development environment that allows domain experts to author, deploy and manage object-oriented software applications is needed to solve the shortcomings of software and software development described above.

SUMMARY OF THE INVENTION

In one aspect, the invention relates to a method for enhancing an object-oriented programming language. The method includes declaring one or more class structures in databases having metadata describing characteristics defining the class structures. The method also includes extending the metadata associated with the class structures by adding any number of additional metadata to the databases.

In one embodiment, the declaring further includes declaring a class-head comprising class-head metadata describing characteristics defining the class-head. The declaring can also include declaring a class-body comprising body members. Each body member includes class-body member metadata in the plurality of metadata. The class-body member metadata describes characteristics defining the class-body member. The declaring a class-body further includes storing the class-body into rows and columns in one or more database. Each row represents a class-body member definition and each column represents metadata defining a single characteristic of the class-body member.

In one embodiment, the database storing the class-body member metadata includes a metatable. Further, the class-body member metadata can include object-oriented definition data for a class-body member. The class-body member metadata can also include relational database definition data for an attribute type and/or definition data to store specific programming information about the class-body member. The class-body member metadata can also include definition data for classifying the class-body members into different categories.

The declaring of the class-head can also include declaring the metadata defining the characteristics of the class-head for each class and/or extending the object-oriented metadata associated with the class-heads by adding additional metadata to the database. The method can also include organizing the metadata describing the class-head metadata into rows and columns, each row representing a class-head definition and each column representing metadata defining a single characteristic of the class-head. The database storing the class-head metadata can also include a metatable.

In one embodiment, the class-head metadata can include object-oriented definition data for a class-head. The class-head metadata can also include relational database definition data for a database table type. In yet another embodiment, the method includes storing programming information about the class in the class-head metadata. The classes can also be classified into different categories.

The metadata can also be updated to develop an object-oriented software application. In another embodiment, the method includes declaring metadata defining the characteristics for the software application in a database table. The metadata describing the software application can be organized into rows and columns of a database. The rows can represent a software application definition and the columns can represent metadata defining a single characteristic of the software application. In one embodiment, the database table further includes a metatable. The metadata definition can include a unique identifier for the software application.

The method can also include storing programming information about the application in definition data of the metadata definition. The method can also include using definition data to classify the software application into a category. The software application can also be deployed from the class structures and the metadata associated with the class structures. The method can also include reading the metadata and the any number of additional metadata for the software application.

In yet another embodiment, the method includes generating data structures in memory for each class structure. Each data structure can include metadata describing characteristics defining a software application, metadata describing characteristics defining the class-heads of the application, and metadata describing characteristics defining the class-body members for the classes of the deployed software application. In one embodiment, the method includes recursively resolving inheritance for the deployed application. Genericity for the deployed application and/or for each class structure can also be recursively resolved.

In one embodiment, the method includes initializing instances of the data structures from the class-body member metadata. In one embodiment, a document manager application is used to create a document to be used as a container for instances created by applications used by the document. The method can also include using the software application metadata, the class-heads metadata, and the class-body metadata to dynamically create a menu system for the software application. In one embodiment, the method includes using the software application metadata, the class-head metadata, and the class-body members' metadata to dynamically create a help system for the software application. In another embodiment, the method further includes using the software application metadata, the class-head metadata, and the class-body members' metadata to dynamically create a user interface. In one embodiment, a domain expert extends the metadata by adding additional metadata to the databases.

BRIEF DESCRIPTION OF THE DRAWINGS

In the drawings, like reference characters generally refer to the same parts throughout the different views. Also, the drawings are not necessarily to scale, emphasis instead generally being placed on illustrating the principles of the technology.

FIG. 2 demonstrates a prior art sample of an embodiment of a C++ class definition, composed of includes files, a class-head and a class-body.

FIG. 8-A is a block diagram illustrating an embodiment of the hierarchical relationship of the three steps shown in FIGS. 5–7 that compose the entire source code of an application.

FIG. 8-B is a schematic block diagram showing an embodiment of a comparison between the metadata hierarchy of a database and a software application.

FIG. 10 is a diagrammatic representation of an embodiment of a fragment of one preferred embodiment of the Software Catalog Metatable, which specifies the contents and format of the Software Catalog Table, a sample of which is shown in FIG. 11.

FIG. 11 depicts an embodiment of a Software Catalog Table.

FIG. 11-A depicts an embodiment of a fragment of the Software Catalog Table of FIG. 11.

FIG. 11-B depicts another embodiment of a fragment of the Software Catalog Table of FIG. 11.

FIG. 12 is a diagrammatic representation of a fragment of an embodiment of an Application Metatable specifying the contents and format of the Application Table.

FIG. 13 depicts a diagrammatic representation of an embodiment of an Application Table.

FIG. 13-A depicts an embodiment of the Application Table of FIG. 13.

FIG. 13-B depicts another embodiment of the Application Table of FIG. 13.

FIG. 14 is a diagrammatic representation of an embodiment of a fragment of the Class Metatable, which defines the contents and format of the Class Table.

FIG. 15-A depicts an embodiment of a fragment of the Class Table of FIG. 15.

FIG. 15-B depicts another embodiment of a fragment of the Class Table of FIG. 15.

FIG. 16-A depicts an embodiment of a fragment of the Class Table of FIG. 16.

FIG. 16-B depicts an embodiment of a fragment of the Class Table of FIG. 16.

FIG. 17A depicts an embodiment of a fragment of the Class Table of FIG. 17.

FIG. 17-B depicts another embodiment of a fragment of the Class Table of FIG. 17.

FIG. 17-C depicts an embodiment of a database table representing the persistent storage for the objects instantiated from the Line class shown in FIG. 17.

FIG. 18-B depicts an embodiment of a block diagram illustrating how the tables that form an application, the functions' source code and the user document are loaded in memory to form an object-oriented data structure with pointers to the document data tables and pointers to the data indices.

FIG. 25-A is a block diagram illustrating an embodiment of the object hierarchical relationship of an application's three levels, shown in FIG. 9, that compose the entire source code of this application, and wherein that relationship also includes a Project/Document hierarchy.

FIG. 25-B is a flowchart illustrating an embodiment of the details of the hierarchical relationship of an application's three levels, shown in FIG. 9, and wherein that relationship also includes a Project/Document hierarchy which defines the container Document.

FIG. 27-A is a block diagram illustrating an embodiment of the role of an application modeler and the role of an end-user in creating the different tables for an application and a document.

FIG. 27-B is a block diagram illustrating an embodiment of an extended role of an application modeler to create document tables for objects having object-role=Attribute or Tools (see FIG. 13-A 1306) to be part of an application package to be used as business, office or end-user standards.

FIG. 33 depicts a diagrammatic representation of an embodiment of the Project Object/Document Object hierarchy.

FIG. 34-B is a diagrammatic representation of an embodiment of a fragment of a Software Catalog that depicts how the Metadata-Variables Method works to support parameterized classes.

DETAILED DESCRIPTION

Overview

Figure 1:
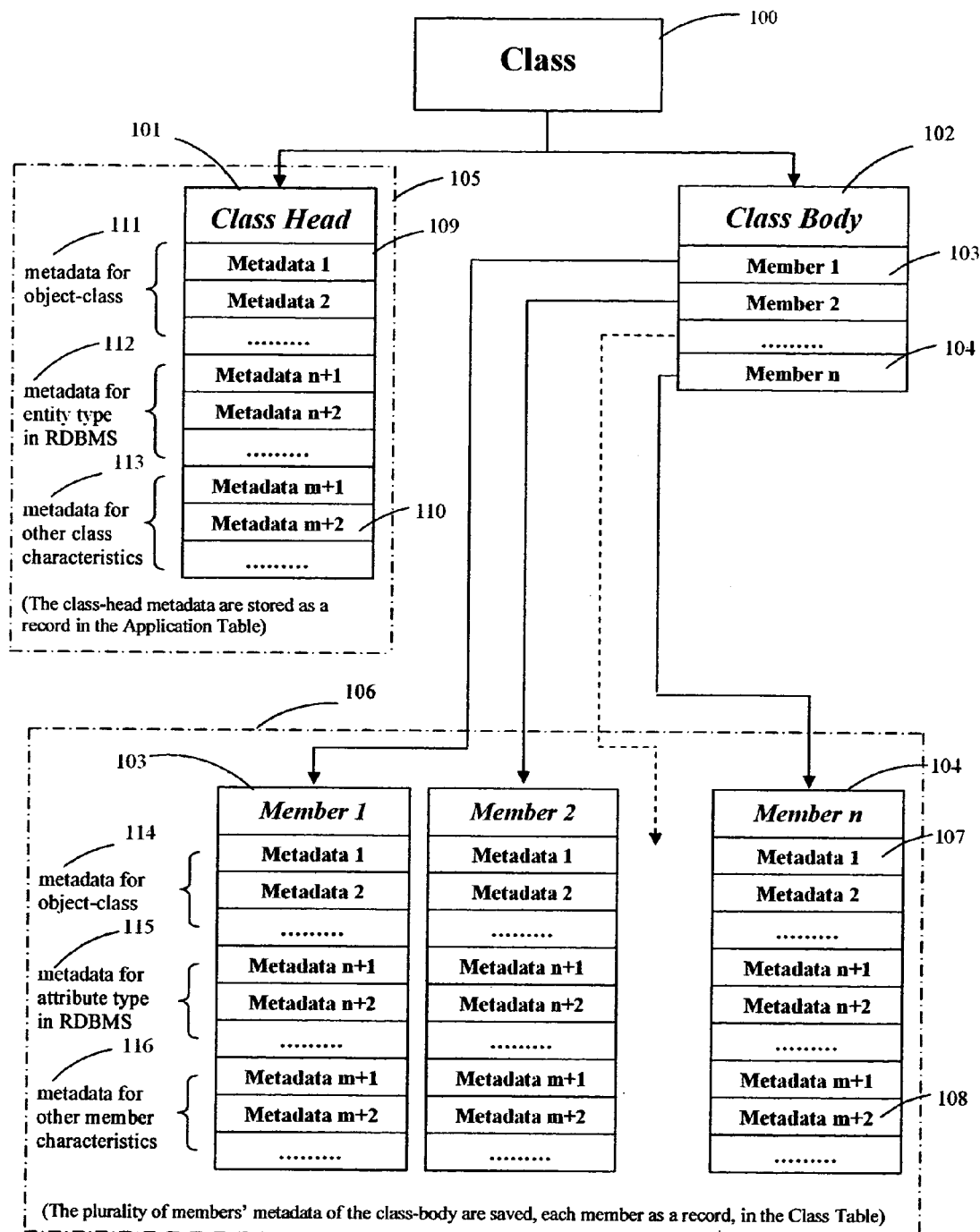
FIG. 1 is a block diagram illustrating an embodiment of the metadata hierarchy of the components that compose a class.

A class is a description tool used in a program to define a set of attributes and a set of methods that characterize the members of an object. The definition of classes in OOPL is comparable to the definition of types in languages such as C or Pascal. For example, in C++ a class is defined as a structure that contains data elements as well as functions that manipulate these data elements.

The benefits of an object-oriented approach arise out of three basic principles: encapsulation, polymorphism and inheritance. Generally speaking, from a programming point of view, an object model is a unifying set of rules that describe object structure, object lifecycle, and inter-object communication. Object structure relates to the physical layout of objects in memory. Object lifecycle refers to how applications create and destroy objects. Inter-object communication refers to protocols by which objects communicate with one another. Most OOPLs do not specify true object models, but merely specify syntax and semantics of a basic object implementation without specifying the actual rules that unify object systems.

A goal of an embodiment of the present invention is to have an object-oriented programming environment (OOPE) to create software programs that can be designed and developed by a domain expert without, or with minimum help, from a software developer. The OOPE also is portable and platform independent. A software application created by the present invention can support inheritance, encapsulation, information-hiding, genericity or parameterized classes, and/or operator overloading or polymorphism. In one embodiment, the present invention has debugging capabilities, modularity and object reusability.

The present invention was developed around the concepts of (1) defining the classes of an object-oriented program in a database table; (2) using well tested, reusable classes existing in libraries or repositories; (3) applying relational databases techniques to object-oriented programming; and (4) giving the objects' entities in the storage repositories a universal immutable Unique ID to create an environment where multi-applications can be used to place entities on the same document and where an object can be referenced from another document without loosing its identity.

Defining the Classes of an Object-Oriented Program in a Database Table

A table or a database is a repository of data that is self descriptive and holds a clean representation of data (or information). Traditional OOPLs are structured languages (i.e., a class is a structure) but this structure is represented in the source code as text—a non-structured fashion. The present invention defines the classes in one or more database tables, enabling a self descriptive, clean presentation of the data. Moreover, when the data are stored in a database, several relational database techniques can be applied which can greatly enhance the capability of the object-oriented languages and systems. This may also have many other advantages including:

A. Simplifying the creation, extendibility and development of programs because tables are self-descriptive and relatively easy to work with.
B. Making the object-oriented codes more understandable to the domain expert. Using a table to express the object-oriented theory rather than plain text, which usually has hundreds of invented keywords and rules, serves to create an environment of expert-made and innovative software.
C. A compiler is a program that translates non-structured source code text into binary structured language that can be processed by a computer. In one embodiment, starting with a table simplifies this process as we can directly load the tables as object structures in memory, without compilation, to represent a running program.
D. Syntax are automatically respected and checked by using standard forms for data input.
E. Make the source code a vehicle of organized thought, which can help through the stages (or software lifecycle) of the development work, results in a seamless development process.

Using Well Tested, Reusable Classes Existing in Libraries or Repositories

One way to simplify the software development is to use well-tested, reusable classes existing in libraries or repositories. But in systems of prior art, it is often not an easy task for a developer to find, select and modify the required class to perform a certain task from these libraries, as normally he or she must carefully study these libraries before starting to modify its contents. The present invention describes means to organize and automate the usage of reusable classes by extending a class definition as follows:

A. The Purposes:
 1. Classify the applications, the classes and the classes' members into different categories; and automate the reusability of the existing objects and applications in libraries based on this classification. By automating the standard tasks, the modeler of a program concentrates on the essential of his or her application (Model). This also allows rapid incremental development in an ad-hoc fashion.
 2. Using the extended class definition to store data, and using the data for automating several parts of the software development based on information saved as metadata with the class, member, application, project or document.

B. The Means:
The present invention also describes several means for extending the class definition horizontally and vertically.
 1. Horizontally means adding additional metadata as a column in a table to the class-member definition and to the class-head definition.
 2. Vertically means creating additional tables to store, at another level, information that is related to the objects of an application as follows:
  i. Characteristics about the application itself, thus creating static hierarchical relations between the objects and their application. This enables classifying the objects according to their usage and also enables having inheritance between the applications.
  ii. The project and its documents' characteristics, thus creating a dynamic relationship between the objects and the projects/documents that are using them.

Applying Relational Databases Techniques to Object-Oriented Programming

The present invention applies relational databases techniques to object-oriented programming, such as:
A. Indexing the data in either the tables defining the application or in the tables created by the application, for fast access to increase performance.
B. Creating relationships between objects, similar to that used by relational database management systems (RDBMS).
C. Loading the tables holding the definition of the object-oriented classes at run-time into memory to compose object-oriented structures without the need for compilation.

Giving the Objects' Entities an Immutable Universal Unique ID

Giving the objects' entities, in the storage repositories, an immutable universal unique ID (Entity Unique ID) based upon their Application ID, their Class ID and their Own Entity ID, as well as their Project ID and Document ID, creates an environment where multi-applications can be used to place entities on the same document, and where an object can be referenced from another document without loosing its identity.

Figure 3:
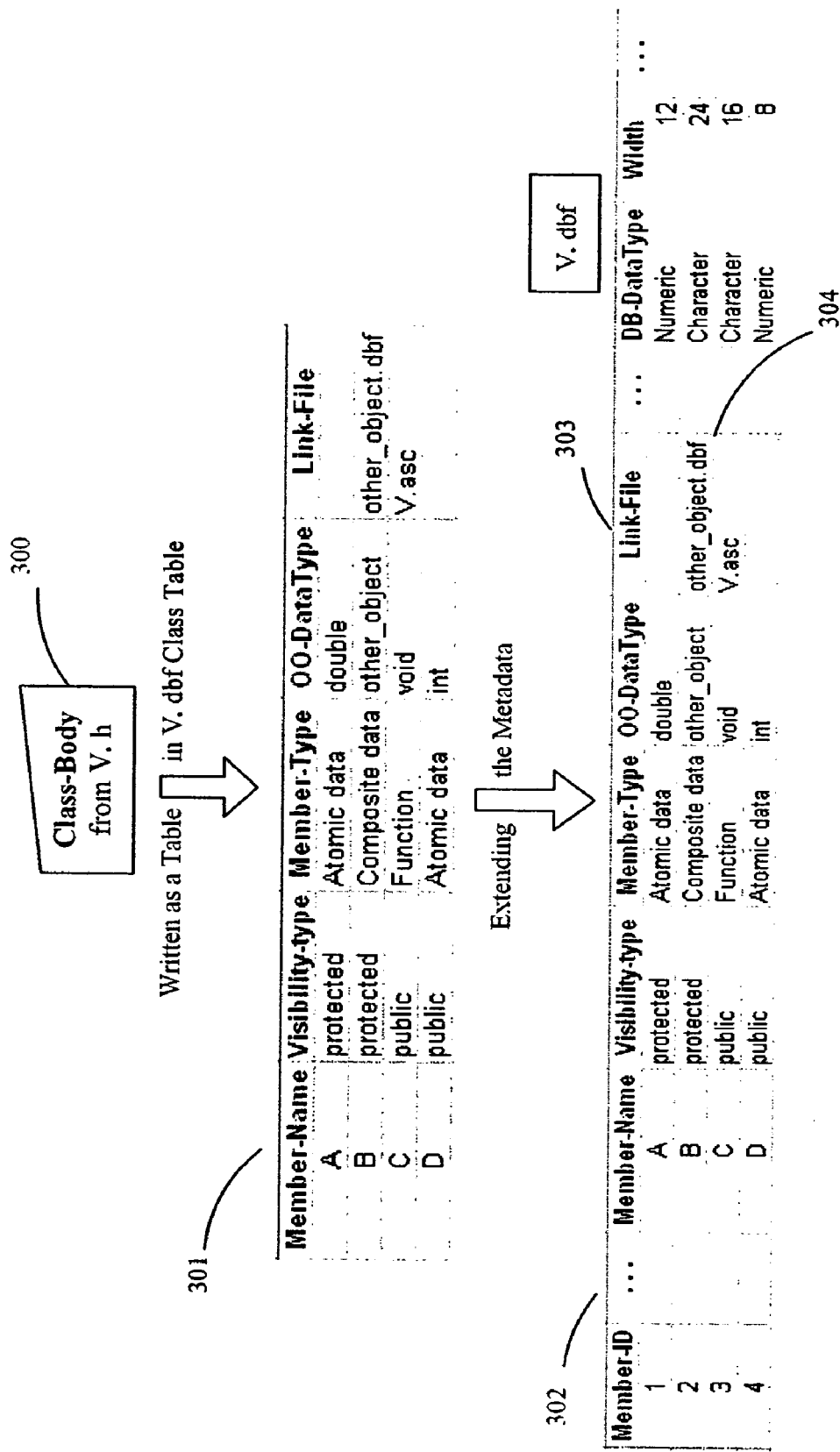
FIG. 3 is a diagrammatic representation of an embodiment of a fragment of the Class Members' Metatable that depicts how the C++ class-body definition of FIG. 2 (written as unstructured text) is represented in a database table, and extended with an unlimited number of metadata.
Figure 4:
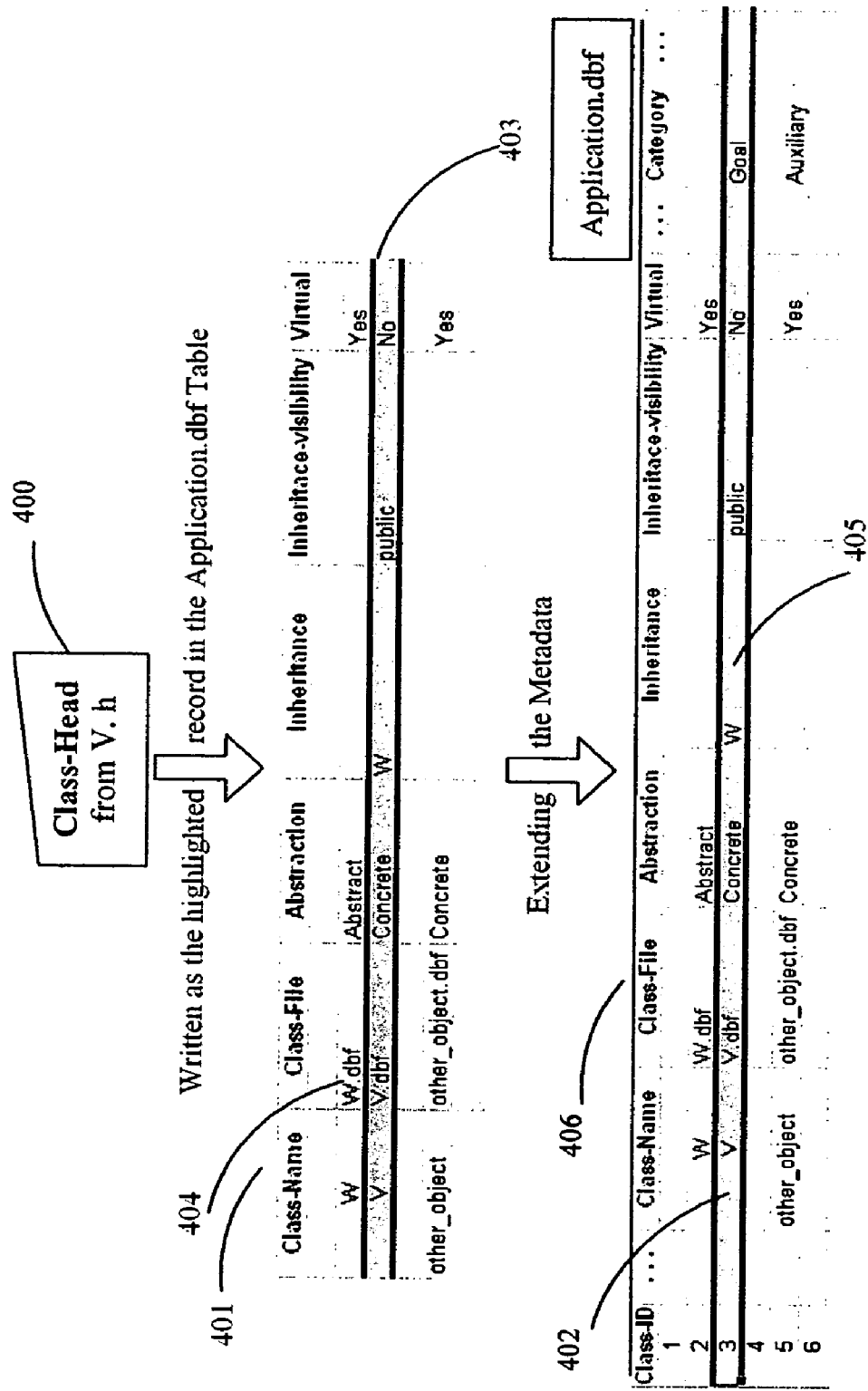
FIG. 4 is a diagrammatic representation of an embodiment of a fragment of the Application Table that depicts how the C++ class-head definition of FIG. 2 (written as unstructured text) is represented as a record in a database table, and extended with an unlimited number of metadata.
Figure 35:
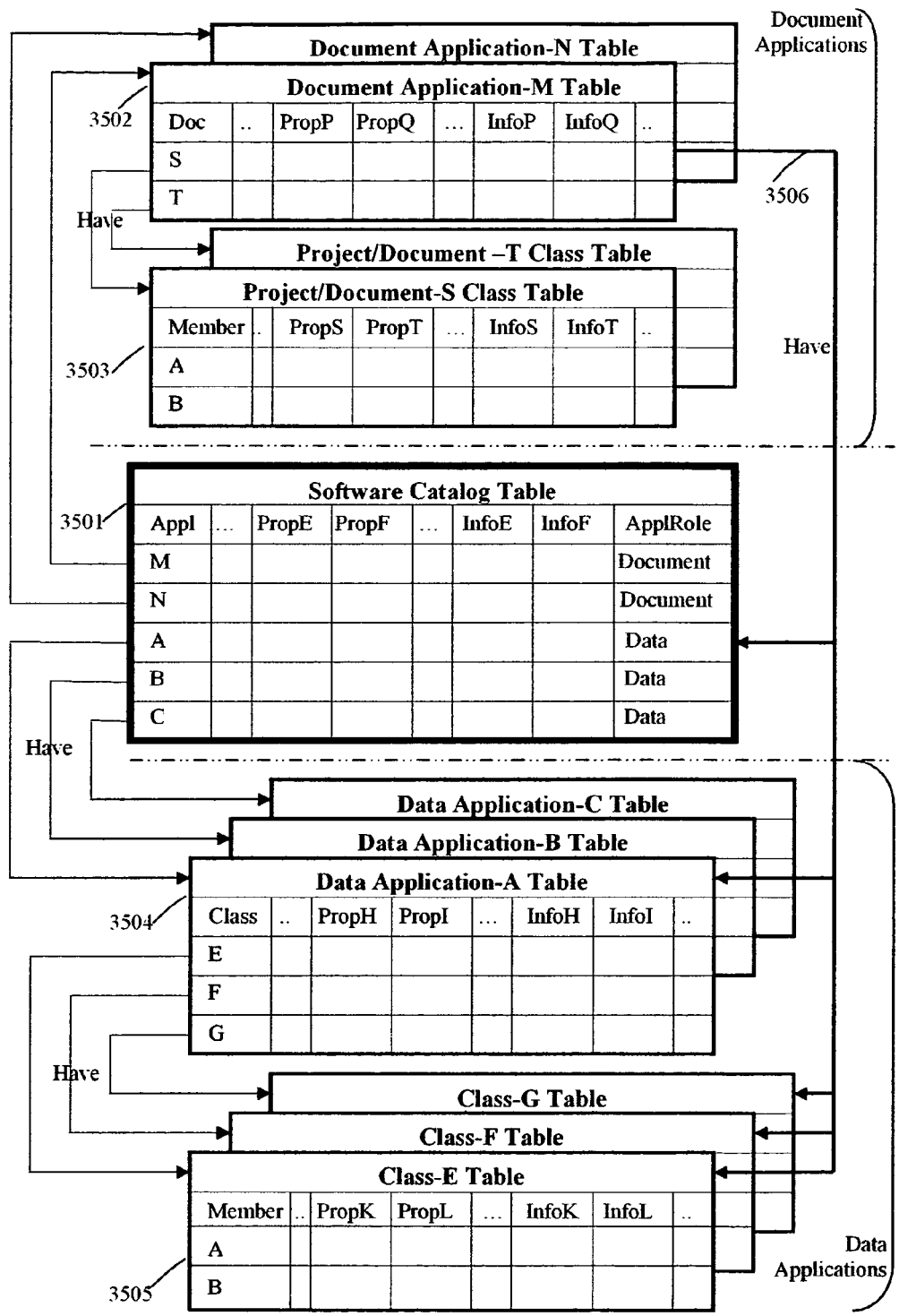
FIG. 35 depicts a diagrammatic representation of an embodiment of a fragment of a hierarchical structure for an application's tables as created by a domain expert or modeler, composed of a Project/Document Application and a Data Application, showing the relationships between the different components in these tables.
Figure 36:
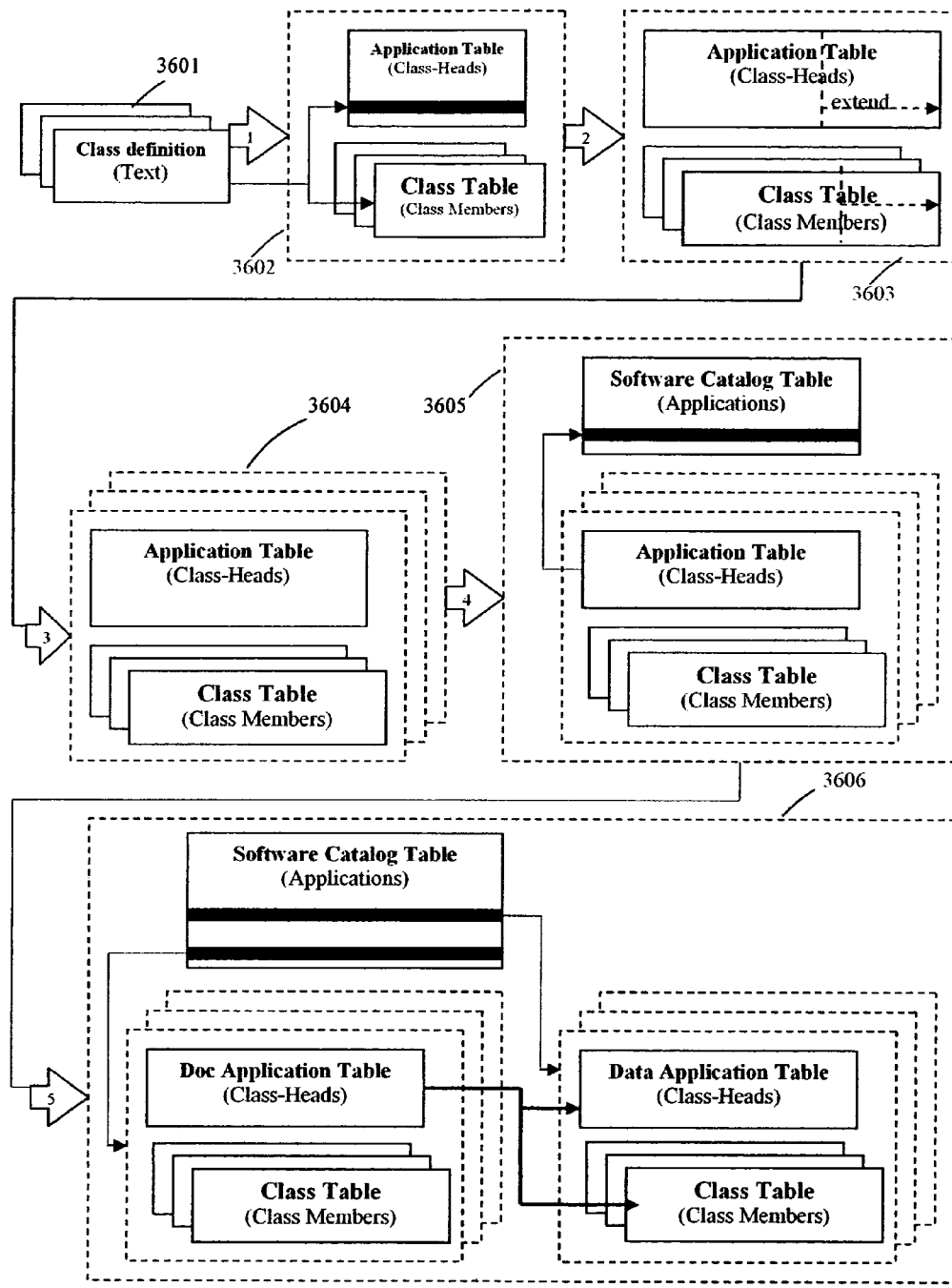
FIG. 36 is a block diagram schematically depicting an embodiment of the steps used in the design stage of the present invention.

Enabling the development of object-oriented software applications using the preferred embodiment of the present invention can be regarded as the execution of the several steps of FIG. 36 that represent the "design stage" of a software application, and of FIG. 25-B that represents the "run-time stage" for the direct deployment of the software from the above design stage as follows:

Design Stage: FIG. 36 is a block diagram schematically depicting an embodiment of the present invention. The first step 3601–3602 depicts how the traditional C++ class definition 3601 (a sample is shown in FIG. 2) is represented in relational database tables 3602. The metadata representing the class-head is stored as a record in the Application Table as seen in FIG. 4. The metadata representing each members of the class-body are stored in the Class Table as seen in FIG. 3. The second step 3602–3603 depicts how the metadata describing the characteristics of the class-head and the characteristics of the member of the class-body are horizontally extended with more metadata to represent additional characteristics for the class definition. These additional characteristics are used by the present invention to simplify the development of the application by classifying the classes and the members into different categories, to enable automating the reusability of classes. FIG. 1 further details these extended metadata representation of the class definition. The third step 3603–3604 in FIG. 36 depicts how the plurality of the classes that represent an application have their class-head characteristics stored in the Application Table. This Application Table is used to automatically link the different classes at run-time. The fourth step 3604–3605 in FIG. 36 depicts how the plurality of the applications on a computer system have their characteristics represented as metadata stored as records in the Software Catalog Table. This represents how the information about the classes is vertically extended by the metadata that represent their application. The fifth step 3605–3606 in FIG. 36 depicts the relationship between two applications used to create and/or edit a user document. The first represents the Project/Document Application, and the second represents the Data Application which is used to place entities in the document. This combination of the two application further vertically extends the metadata definition of the objects to enable further automation of the processes that compose a software application based on the characteristics of the Document/Project used. FIG. 35 further depicts these two applications and their relationship.

Figure 9:
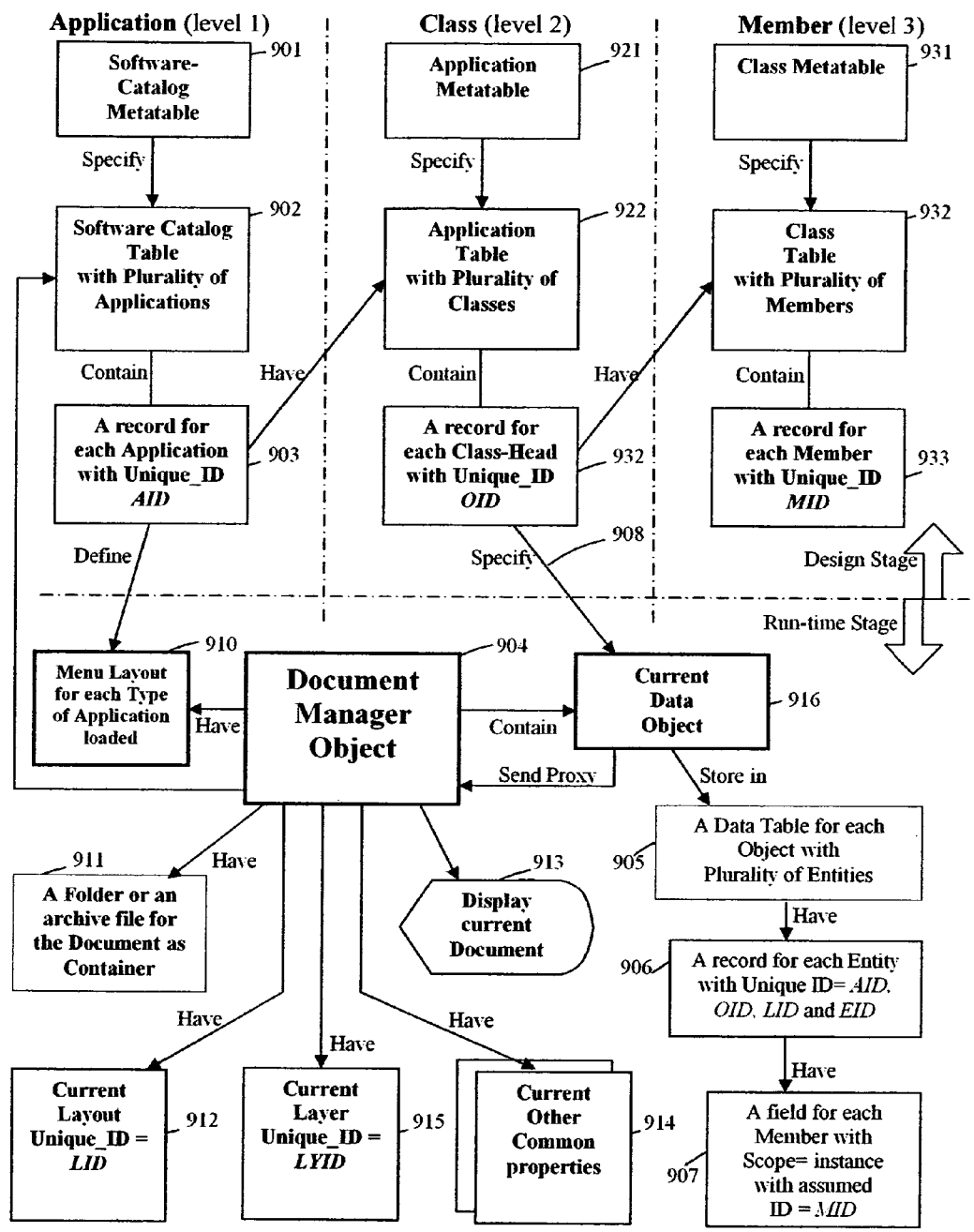
FIG. 9 is a flowchart illustrating an embodiment of the details of the hierarchical relationship of the three steps shown in FIGS. 5–7 that compose the entire source code of an application, and their relationship with the document that contains the persistent objects.
Figure 18:
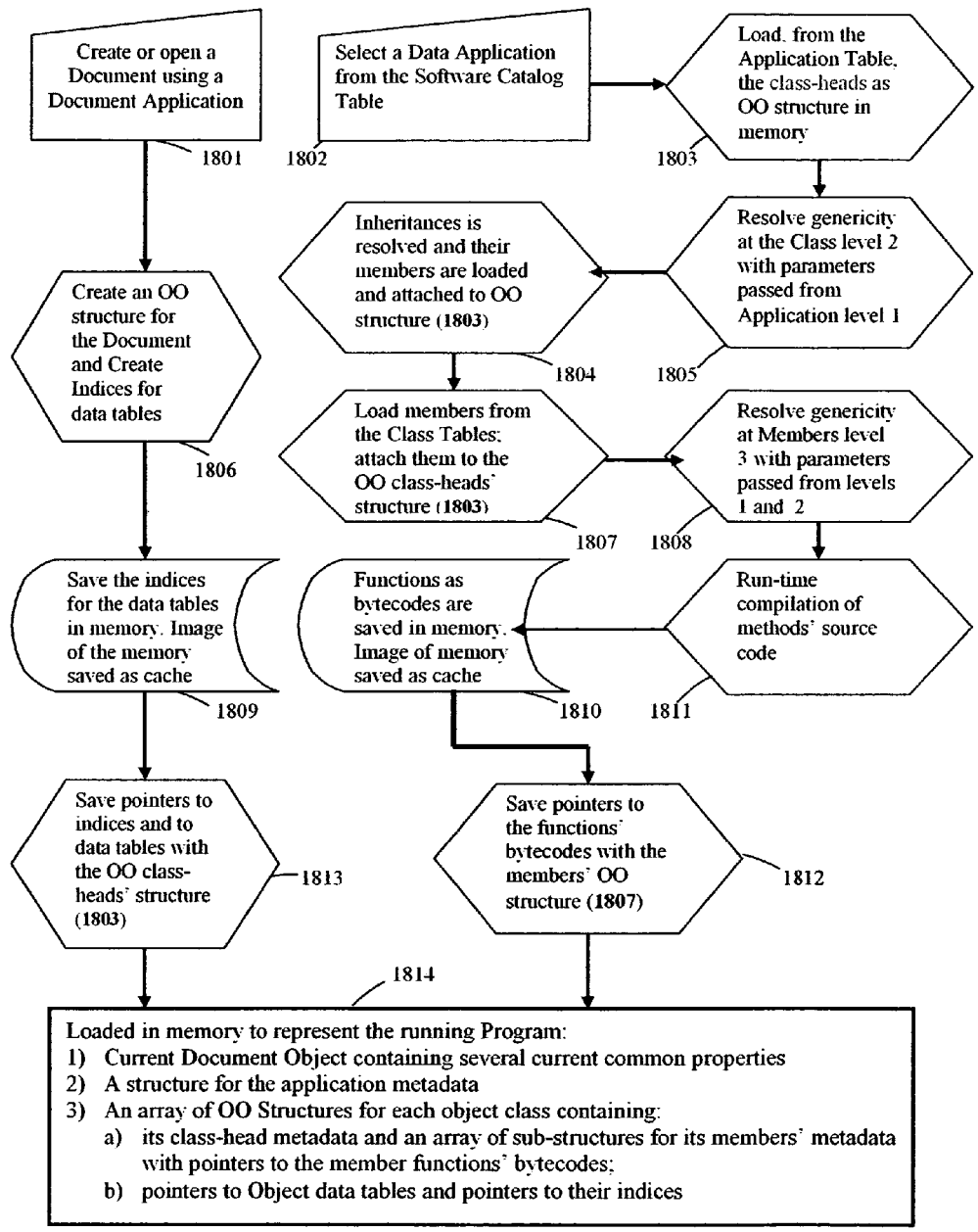
FIG. 18-A depicts a schematic representation of an embodiment of the hierarchical object-oriented data structure loaded in memory from the different tables that form an application which is represented as a record in the Software Catalog Table.

Run-time Stage: FIG. 18-B depicts a block diagram further illustrating how the different tables that represent a Document Application and a Data Application work together at run-time. The Software Catalog Table 1802, Application Table 1803, the Class Table 1807, the functions' source code 1811, and the user document 1801 application are loaded in memory to form an object-oriented data structure for each object, and, together, represent a running program. The functions' source code 1811 are compiled at run-time to platform independent bytecodes and saved in memory 1810. The end-user opens or creates a document 1801, and creates or selects a layout. The document data tables (e.g., as shown in FIG. 9) are indexed and the indices are saved in memory 1809. Pointers to the functions' bytecodes 1812 and pointers to the data tables and their indices 1813 are saved with the object-oriented data structure 1803–1807 for each object. Image for memories of the functions' bytecodes 1810 and the tables' indices are saved as cache on a hard disk or any networked storage structure to increase performance when the document or the application is re-opened/re-loaded at a later time. The detailed description of the present invention is now sub-divided into the following 21 sections.

1. The Class-Body Definition

Similar to the C++ OOPL, the class definition for the present invention has two parts: the class-head and the class-body.

The present invention defines the object-oriented class-body, with similarity to the C++ class layout, in a database table called the "Class Table." This Class Table contains the metadata, or data about data, for object-oriented definitions of the class members.

Furthermore, the present invention extends the object-oriented C++ class member characteristics by adding more metadata to represent other, new characteristics to the member definition. This extended metadata includes:

1. metadata to assign a unique ID for each class member;
2. metadata to assign characteristics used to define the attributes in a relational database (RDB) similar to the conventional metadata used in RDMS (this capability also adds the possibility of creating relations between the objects—similar to RDBs, based on common keys—and the possibility to store the final persistent objects in RDB tables);
3. metadata to classify the class members into different categories to organize and enable the automatic, dynamic creation or selection of methods with common behavioral object-orientation, and that are needed to simplify the development of an application; and
4. metadata to hold data about the member to be used by the methods with common behavioral object-orientation as, for example, a prompt message or a help message about the member.

As in a DBMS, the Class Table has a metatable. A metatable is a database table that defines (i.e., contains metadata about) another database table. Thus, the metatable is an underlying record source that specifies the format and contents of the records in the Class Table. Further, metatables can be nested.

FIG. 1 is a block diagram schematically depicting an embodiment of the metadata hierarchy of the components that compose a class definition used in the present invention. The class 100 is composed of a class-head 101 and a class-body 102. The class-body 102 has a plurality of members, Member 1 103 to Member n 104. Each member is defined by a plurality of metadata, Metadata 1 107 to Metadata m+2 108. The pluralities of members' metadata of the class-body are saved, each as a record, in the Class Table 106. The class-head 101 is defined by a plurality of metadata, Metadata 1 109 to Metadata m+2 110, and such plurality of metadata are stored as a record in the "Application Table" 105. The Application Table stores the class-heads for all the classes that compose an application. In one embodiment, the metadata for the class-heads and the metadata for the class members contain metadata for the object 111, 114, metadata for the attribute type 115 in a RDMS, and any other metadata 113, 116 that may be needed for simplifying the development or modeling of an application.

For background purposes only, FIG. 2 demonstrates an embodiment of a traditional C++ class definition, composed of include files 201, a class-head 208, and a class-body 202–207. The class-body has a plurality of members, each defined either by standard keywords or metadata such as protected 202, public 205, double 203, void 206 and int 207; or by the name of another class, "other_object" 204.

FIG. 3 is a diagrammatic representation of an embodiment of class members' metatable and extending the class members' metadata in the table with an unlimited number of metadata 302. In particular, the C++ class-body 202–207 definition of FIG. 2—written in the traditional non-structured text format—is represented in a structured format in a database table 301. FIG. 3 also demonstrates how the include file "other_object.h" 201 in FIG. 2 for a "Has-A" composite attribute 204 is incorporated in the table as a "Link-File" column 303 as "other_object.dbf" metadata 304.

Figure 7:
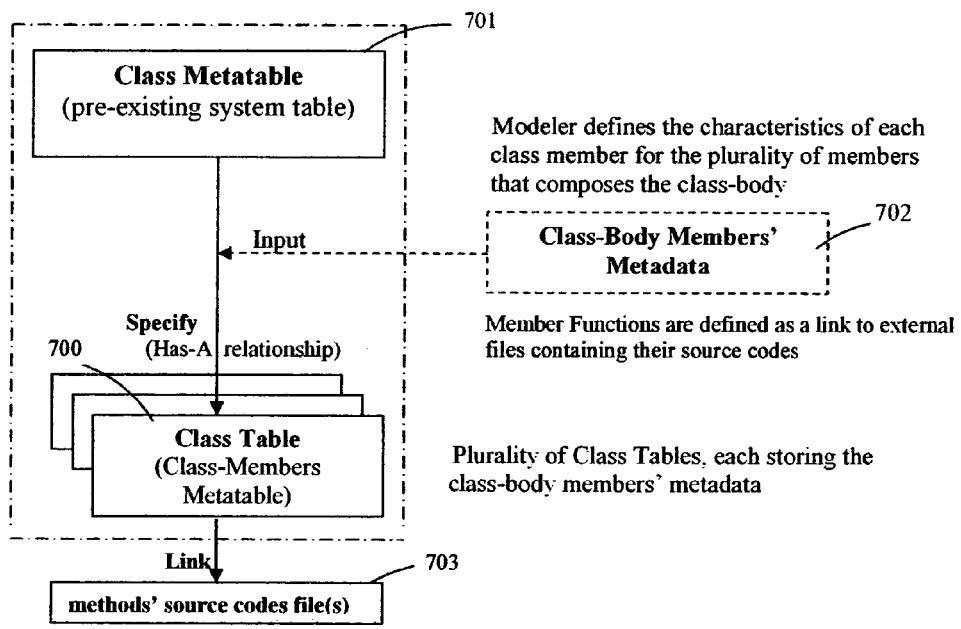
FIG. 7 is a block diagram illustrating an embodiment of how a domain expert or the application modeler defines the characteristics of each member of the plurality of members that compose a class-body, each member being represented by a record in the Class Table.

FIG. 7 is an embodiment of a block diagram illustrating how a domain expert or application modeler of a program defines the characteristics 702 of each member for the plurality of members that compose a class-body. In one embodiment, an application modeler (or conceptual designer) is the individual responsible for modeling the application area. Thus, the application modeler can be the person that specifies the conceptual schema by formalizing the knowledge of the domain expert. In one embodiment, the application modeler and the domain expert are the same person. Each member is represented by a record in a Class Table 700 (or "Class Members' Metatable") using a meta-metatable called the Class Metatable 701 (or "Class Members' Meta-Metatable"). The Class Metatable 701 specifies the format and contents of the Class Table 700. The Class Table 700, in turn, can, at run-time, specify how the objects of a particular class are instantiated. The source code of the member functions used by the object may be stored in a separate file 703. In one embodiment, the metadata for a member function contain the name of the function and the name of the function's source code file.

Figure 15:
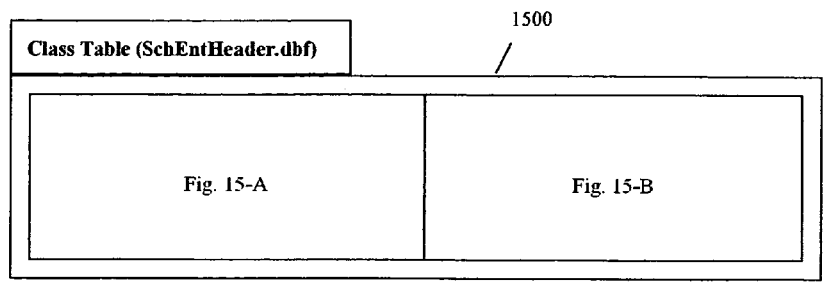
FIG. 15 depicts a diagrammatic representation of an embodiment of a fragment of a Class Table.
Figure 16:
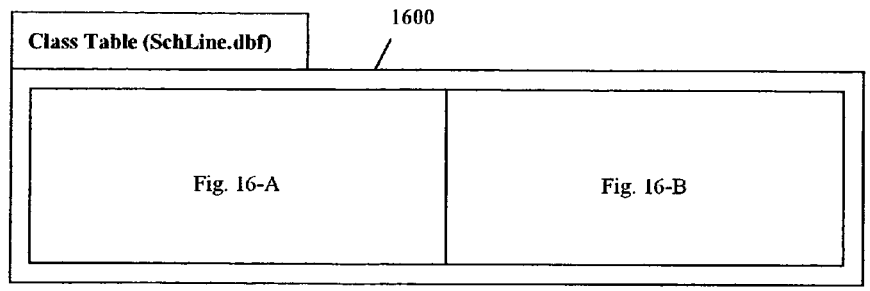
FIG. 16 depicts a diagrammatic representation of an embodiment of a fragment of another Class Table.

FIG. 14 is a more detailed representation 1400 of an embodiment of the Class Metatable 701. Again, the Class Metatable 1400 specifies and defines the contents and format of the Class Table 700. Two samples of the Class Table are shown in FIG. 15 and FIG. 16, respectively. The description of each column of these class table files are detailed hereafter.

FIG. 15 is an embodiment of an Entity-Header Class metatable 1500 with a filename "SchEntHeader.pdf." The Entity-Head Class metadata 1500 is composed of two parts: the left-side part is shown in FIG. 15-A, and the right-side part is shown in FIG. 15-B.

FIG. 16 is an embodiment of a Line Class metatable 1600 with a filename "SchLine.pdf." The Line Class metatable 1600 is composed of two parts: the left-side part is shown in FIG. 16-A, and the right-side part is shown in FIG. 16-B.

The information stored as columns in the Class Tables 1500, 1600 of FIG. 15 and FIG. 16 may be classified into categories, such as:

1. Object-oriented information having similarities to the C++ grammar for the class-member declaration. These are, for instance:
    a. AttributeName 1502, 1602 in FIG. 15-A and FIG. 16-A, respectively, is specified by the record which has MetaID equal to 2 in FIG. 14. The Attribute Name 1502, 1602 is the name of the class member and is also the title for the attribute column in a data table. It is also called Title, Field Name, Heading or Tag.
    b. VisibilityType 1503, 1603 in FIG. 15-A and FIG. 16-A, respectively, is specified by the record which has MetaID equal to 3 in FIG. 14. The legal values for this item can be, e.g., Public, Protected and Private. VisibilityType 1503, 1603 provides means for accessing and modifying the attribute value of this column to the "outside world" beyond this class. Thus, VisibilityType 1503, 1603 enables encapsulation of an object.
    c. OODataType 1505, 1605 in FIG. 15-A and FIG. 16-A, respectively, is specified by the record which has MetaID equal to 5 in FIG. 14. The OODataType 1505, 1605 is a keyword for object-oriented attribute atomic data type, such as Integer, Float, Void (for functions), String, etc. In one embodiment, the OODataType 1505, 1605 is also the return type of the member function.
    d. IsStatic. This metadata is not shown in the figures. This is a Boolean value set to True or False. It sets a global variable for its class with the capability of hiding information.
    e. IsVirtual. This metadata is not shown in the figures. This is a Boolean value set to True or False. In one embodiment, this value specifies a member function as virtual. In one embodiment, only class member functions may be declared as virtual.
2. Object-oriented information not having similarities to the C++ grammar for the class-member declaration. These are, for instance:
    a. MemberID 1501, 1601 in FIG. 15-A and FIG. 16-A, respectively, is specified by the record which has MetaID equal to 1 in FIG. 14. This is a unique ID for each member of an object class.
    b. MemberType 1504, 1604 in FIG. 15-A and FIG. 16-A, respectively, is specified by the record which has MetaID equal to 4 in FIG. 14. The present invention adds more functionalities to the object-oriented paradigm by providing relations between objects. Legal values for MemberType include, for example:
        i) ATOMIC data: Simple data.
        ii) Composite data: Can be:
            (1) JOIN: on foreign key or keys, with similar functionality to relational database management systems.
            (2) FUNCTION: With similarity to the C++ member function declaration but the function herein is declared in the database table by its name without the two parentheses ( ) operator. The "LinkFile" metadata—detailed below in part (d)—specifies the name of the file that contains the source code of the function. A function written in the source code file has the argument list and return type; both compose the signature for the function, as in C++, to support function overloading.
            (3) OBJECT: Like object-oriented complex attribute. This feature can, e.g., either:
                (i) normalize the members of the "Has-A" OBJECT with the current object members, or
                (ii) work as an automatic 1:N relationship with the "Has-A" object using the MemberID=1 as a primary and foreign key.
            (4) FRIEND_JOIN: Join with the keyword Friend with similar functionality as used in C++ grammar.
            (5) FRIEND_OBJECT: Object with the keyword Friend as used in C++ grammar.
            (6) LINK: This member represents a link to non-structured data (such as text, or multimedia) or semi-structured data (such as rtf, XML or HTML) in an external file. The file extension can define the type of the data stored.
        In one embodiment, each composite data has a file name that contains the table and the multimedia or the source code file saved in the LinkFile metadata as detailed below in part (d).
        The value of any members of the composite attribute can be retrieved from inside the source code of a function with the "." Period selector operator similar to the C++ grammar. Moreover, the metadata are also retrieved through the operator "!"

(though this operator may change depending on the type of extension programming language used), or through the operator "metaof (attribute, metadata)." And the application metadata (detailed in section 3 below) can be retrieved with the operator "applic_of (class-name)".

c. OODataType 1505, 1605 in FIG. 15-A and FIG. 16-A, respectively, is specified by the record which has MetaID equal to 5 in FIG. 14. This is the keyword for object-oriented attribute atomic data type, such as Integer, Float, Void (for functions), String, etc. This is also the return type of the member function (method). Moreover, this can be set to the keyword "Generic," to support "genericity" or parameterized types.

d. LinkFile 1506, 1606 in FIG. 15-A and FIG. 16-A, respectively, is specified by the record which has MetaID equal to 6 in FIG. 14. This metadata holds the file, multimedia or table name, if the MemberType is a composite data.

e. IsPKey 1510, 1610 in FIG. 15-A and FIG. 16-A, respectively, is specified by the record which has MetaID equal to 10 in FIG. 14. This depicts if this field (attribute) is a Primary Key as defined in a RDMS to be used in objects' relations.

f. IsFKey 1511, 1611 in FIG. 15-A and FIG. 16-A, respectively, is specified by the record which has MetaID equal to 11 in FIG. 14. This depicts if this field (attribute) is a Foreign Key as defined in a RDMS to be used in objects' relations.

g. ScopeLevel 1513, 1613 in FIG. 15-B and FIG. 16-B, respectively, is specified by the record which has MetaID equal to 13 in FIG. 14. The scope level—a bit value—can be:
  i) 0 for Class_level. The scope of this member is at the class level processing the functions.
  ii) 1 for Query_level. Attributes with ScopeLevel=Query_level are displayed to an end-user when an object is queried.
  iii) 2 for Instance_level. Attributes with ScopeLevel=Instance_level are stored when an object is instantiated.

h. Changeable 1514, 1614 in FIG. 15-B and FIG. 16-B, respectively, is specified by the record which has MetaID equal to 14 in FIG. 14. The attribute can have a fixed value or can be changeable.

i. DefaultValue 1516, 1616 in FIG. 15-B and FIG. 16-B, respectively, is specified by the record which has MetaID equal to 16 in FIG. 14. This is a value that is used to initialize the attribute.

j. Trigger 1520, 1620 in FIG. 15-B and FIG. 16-B, respectively, is specified by the record which has MetaID equal to 20 in FIG. 14. This is the name of the function to trigger when this member (attribute) is invoked by an end-user or by another function. The trigger function may be called: oninit, onerror, onchange, onfocus, onkillfocus, etc. The function may contain a switch to handle any of these calls if needed.

3. Information used at run-time to simplify the development of an object-oriented program, used for automatic, dynamic creation—or selection—of methods with common behavioral object-orientation:
  a. Prompt 1517, 1617 in FIG. 15-B and FIG. 16-B is specified by the record which has MetaID equals 17 in FIG. 14. This is the prompt message to use when the attribute value is set by an end-user at run-time.
  b. Message 1518, 1618 in FIG. 15-B and FIG. 16-B is specified by the record which has MetaID equals 18 in FIG. 14. This is a second message with more instruction to display when the attribute value is set by an end-user at run-time.
  c. Icon 1519, 1619 in FIG. 15-B and FIG. 16-B is specified by the record which has MetaID equals 19 in FIG. 14. This is an icon to represent the attribute in menu.
  d. AuthorizeLevel 1521, 1621 in FIG. 15-B and FIG. 16-B is specified by the record which has MetaID equals 21 in FIG. 14. This authorization level is used for group end-user access to the attribute to read, search or write. The method to use in authorization is set at the application level or the class level.
  e. Version 1522, 1622 in FIG. 15-B and FIG. 16-B is specified by the record which has MetaID equals 22 in FIG. 14. This is the version for a particular member used for version control and for automatic update for persistence storage.
  f. Help 1523, 1623 in FIG. 15-B and FIG. 16-B is specified by the record which has MetaID equals 23 in FIG. 14. This is a help message to display to an end-user at run-time with specific information about a particular member.

4. Database information to map an object's attribute to a database field in persistence storage to the relational database tabular format:
  a. DBDataType 1507, 1607 in FIG. 15-A and FIG. 16-A is specified by the record which has MetaID equals 7 in FIG. 14. This is the data type to use in database table or RDBMS. Moreover, it can be set to the keyword "Generic," to support "genericity" or parameterized types. This feature also adds a new functionality to a DBMS or RDMS.
  b. Width 1508, 1608 in FIG. 15-A and FIG. 16-A is specified by the record which has MetaID equals 8 in FIG. 14. This is the field width for the attribute to use in a database table or RDMS.
  c. Decimal 1509, 1609 in FIG. 15-A and FIG. 16-A is specified by the record which has MetaID equals 9 in FIG. 14. This is the field decimal number if the attribute is a numeric value to use in a database table or RDMS.
  d. Multiplicity 1515, 1615 in FIG. 15-B and FIG. 16-B is specified by the record which has MetaID equals 15 in FIG. 14. This is "0 or 1"; "0 or more"; "Unique"; or "1 or more."
  e. IsOrdered 1512, 1612 in FIG. 15-A and FIG. 16-A is specified by the record which has MetaID equals 12 in FIG. 14. This is used to index the persistence storage on an attribute for fast access.

5. Other information
  a. Remark 1524, 1624 in FIG. 15-B and FIG. 16-B is specified by the record which has MetaID equals 24 in FIG. 14. This is a modeler or developer comment similar to the C++ comments.

6. Other, optional information not shown in the figures:
Justification: In one embodiment, this is how the data in each field (column) is justified.

The Justification information can be, for instance, Not-Null or Maximum/Minimum values for real numbers and integers.

Moreover, all the above class members' metadata, except the MemberID, can be set to the keyword "Generic" to support "genericity" or parameterized classes. This is a more extended type of genericity than that used in the C++ programming language as it allows modifying the member name and the other characteristics of the members not used in C++.

2. The Class-Head Definition

The present invention defines the object-oriented class-head, as defined in the C++ OOPL class layout, for the plurality of classes that compose an application in a database table called the "Application Table." Each record in this Application Table represents a single class-head definition. Furthermore, the current invention extends the object-oriented C++ class-head characteristics by adding more metadata to represent other, new characteristics to the class-head definition. This extended metadata includes:

1. metadata to assign a unique ID for each class in an application;
2. metadata to assign characteristics used to define the database entity (table) in a relational database similar to the conventional metadata used in a RDBMS;
3. metadata to classify the classes into different categories to organize and enable the automatic dynamic creation—or selection—of methods with common behavioral object-orientation, and that are needed to simplify the development an object-oriented application; and
4. metadata to hold data about a class to be used by the methods with common behavioral object-orientation as, for example, a help message about a class.

As in DBMS, the Application Table has a metatable (underlying record source) that specifies the format and contents of the Application Table records.

This Application Table, besides storing the characteristics of the class-heads, also serves to list the classes to be linked at run-time to form the application.

FIG. 4 is a diagrammatic representation of an embodiment of an Application Table that depicts how the C++ class-head 208, which is written as text, is represented in a structured format as a record 403—having a plurality of fields (i.e., metadata)—in the Application Table 401. FIG. 4 also depicts how the class-heads' object-oriented metadata 403 may be extended with an unlimited number of additional metadata 402. Again, the extended Application Table 406 stores all the class-head definitions for the plurality of classes that compose an application. FIG. 4 also demonstrates how the class-head characteristics are defined and how the base class W (i.e., an "Is-A" inherited class W) is incorporated in the table as a column 405. FIG. 4 also demonstrates how the body of the class "V.dbf" is linked to the class-head as a "Class-File" in the column 404; it also depicts how the include file "W.h" is incorporated in the table as another record for the class W. Another embodiment of the present invention, not shown in the drawings, replaces the inheritance by class name list to the inheritance by the class-ID list.

Figure 6:
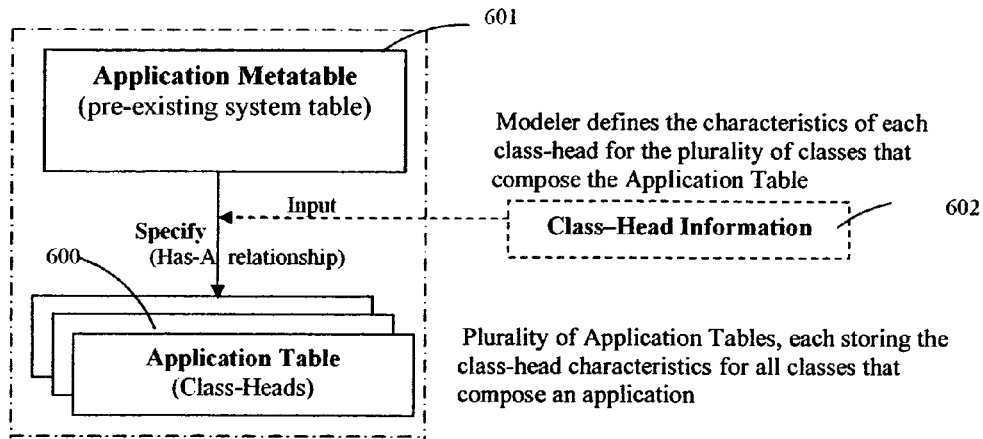
FIG. 6 is a block diagram illustrating an embodiment of how a domain expert or application modeler defines the characteristics of each class-head for the plurality of classes that compose an application as a record in the Application Table using a metatable that specifies that Application Table's format and contents.

FIG. 6 is an embodiment of a block diagram illustrating how a domain expert or application modeler defines the characteristics of each class-head 602 for the plurality of classes that compose an application as a record in the Application Table 600 using a metatable 601 that specifies the Application Table's format and contents.

FIG. 12 is a diagrammatic representation of an embodiment of the Application Metatable 1200. This metatable specifies the contents and format of the Application Table, a sample of which is shown in FIG. 13.

FIG. 13 is an embodiment of an Application Table 1300 with a file name "Corp-Cad.pdf." FIG. 13 is composed of two parts: the left-side part is shown in FIG. 13-A; and the right-side part is shown in FIG. 13-B.

The information stored in each column in the sample Application Table 1300 of FIG. 13 is detailed as follows:

1. Object-oriented information having similarities to the C++ grammar for the class-head declaration:
   a. ObjectName 1302 in FIG. 13-A is specified by the record which has MetaID equal to 2 in FIG. 12. This specifies the name of an object to incorporate for an application. The object name is a unique name.
   b. Inherit 1308 in FIG. 13-A is specified by the record which has MetaID equal to 8 in FIG. 12. This is the comma-delimited list of objects' unique IDs ("OID" with MetaID=1 in FIG. 12). The list of OIDs should be defined in the same Application table. For multi-inheritance, the list contains more than one object unique ID.
   c. InheritAccess 1309 in FIG. 13-A is specified by the record which has MetaID equal to 9 in FIG. 12. Legal keywords for this metadata are, e.g., Public, Protected and Private. For multi-inheritance, this is the list of the keywords separated by a comma. This provides a means for the way that the inherited components (Derived or Sub-Class) inherit if inheritance is to be used for a class. This is similar to the C++ programming language, as shown in the table below:

| Access in Base Class | Base Class Inherited as | Access in Derived Class |
|---|---|---|
| Public | Public | Public |
| Protected | | Protected |
| Private | | No access |
| Public | Protected | Protected |
| Protected | | Protected |
| Private | | No access |
| Public | Private | Private |
| Protected | | Private |
| Private | | No access | d. Parameters 1310 in FIG. 13-A is specified by the record which has MetaID equal to 10 in FIG. 12. A "non-null value" specifies that a class is a template class. This is a list of class members' metadata values separated by commas as seen in FIG. 14. The "Parameters" are distinguished by the order of appearance of the keyword "Generic" in the corresponding Class Table defining the members of the class.
   e. Virtual 1311 in FIG. 13-B is specified by the record whose MetaID is equal to 11 in FIG. 12. This is a Boolean value set to True or False and may specify a base class as virtual.

2. Object-oriented information not having similarities to the C++ grammar for the class-head declaration:
   a. OID 1301 in FIG. 13-A is specified by the record which has MetaID equals 1 in FIG. 12. This is the unique ID for each object in an application.
   b. ClassFile 1303 in FIG. 13-A is specified by the record which has MetaID equals 3 in FIG. 12. This is the name of the file or table where the class-body is defined.
   c. DataFile 1304 in FIG. 13-A is specified by the record which has MetaID equals 4 in FIG. 12. This is the name of the file or table that stores the persistent objects.
   d. Abstractness 1305 in FIG. 13-A is specified by the record which has MetaID equals 5 in FIG. 12. This is a Boolean value set to true or false. Abstractness specifies that this base or derived class is abstract.
   e. ObjRole 1306 in FIG. 13-A is specified by the record which has MetaID equals 6 in FIG. 12. This is a keyword to classify the role that this object plays with an application. Legal values are:

i) Product, the objects that are the goal of an application;

ii) Attribute, the objects that define complex properties for other objects; and iii) Tools, the objects that define tools used in instantiating or editing the product objects for an application.

f. RoleTitle 1307 in FIG. 13-A is specified by the record which has MetaID equals 7 in FIG. 12. This is a name to display as the title for that category as defined in ObjRole above.

g. Auth 1313 in FIG. 13-B is specified by the record which has MetaID equals 13 in FIG. 12. This is an authorization level used for group end-user access to the object to read search or write, The method to use for authorization is set at the application (or the class) level by the metadata AuthType.

h. AuthType is not shown in the figures, but is the authorization method to use.

i. Vers 1312 in FIG. 13-B is specified by the record which has MetaID equals 12 in FIG. 12. This is the version for a class and is used for version control and for automatic updates for persistence storage.

j. Help 1314 in FIG. 13-B is specified by the record which has MetaID equals 14 in FIG. 12. This is a help message about a class to display to an end-user at run-time.

k. Transaction 1315 in FIG. 13-B is specified by the record which has MetaID equals 15 in FIG. 12. This is a transaction mechanism to use with an object.

l. Locking 1316 in FIG. 13-B is specified by the record which has MetaID equals 16 in FIG. 12. This is a locking mechanism to use with an object.

m. StorageType 1317 in FIG. 13-B is specified by the record which has MetaID equals 17 in FIG. 12. This is a storage type to use for the persistent storage for an object. It can be a normal database, any RDMS, or any other customized or binary format.

n. Recovery 1318 in FIG. 13-B is specified by the record which has MetaID equals 18 in FIG. 12. This is the transaction mechanism to use with an object.

o. Author 1319 in FIG. 13-B is specified by the record which has MetaID equals 19 in FIG. 12. This is the name of an author of a class.

3. Other information:

a. Is_Proxy, not shown in FIG. 13-B, is a Boolean value to show if the object is a proxy. This specifies that the object has an internal object that has a display image. The internal objects have the same Object ID.

b. Remark 1320 in FIG. 13-B is specified by the record which has MetaID equals 20 in FIG. 12. This is the modeler's or developer's comments similar to the C++ comments.

Moreover, all the above class-heads' metadata, except the OID, can be set to the keyword "Generic," to support "genericity" or parameterized types. This is a more extended type of genericity than that used in the C++ programming language as it allows modifying the class name and the other characteristics of the members not used in the C++.

3. The Application Definition

The present invention also stores information about the plurality of applications, made from the present invention, on a computer network in a database, called the "Software Catalog Table." These are:

1. metadata to assign a unique ID for each application on a computer network;

2. metadata to assign a Name for each application on a computer network;

3. metadata to classify the plurality of applications into different categories to organize and enable the automatic dynamic creation—or selection—of methods with common behavioral object-orientation, and that are needed for simplifying the development of an application; and 4. metadata to hold data about an application to be used by the methods with common behavioral object-orientation as, for example, a help message about the application or a message to pass as a parameter for the Application Tables or Class Tables.

In one embodiment, this Software Catalog Table, besides storing the characteristics of an application, also defines and stores the inheritance relationship between applications to simplify the development of the software applications.

As in DBMSs, the Software Catalog Table has a metatable (underlying record source) that specifies the format and contents of the Software Catalog Table's records.

Figure 5:
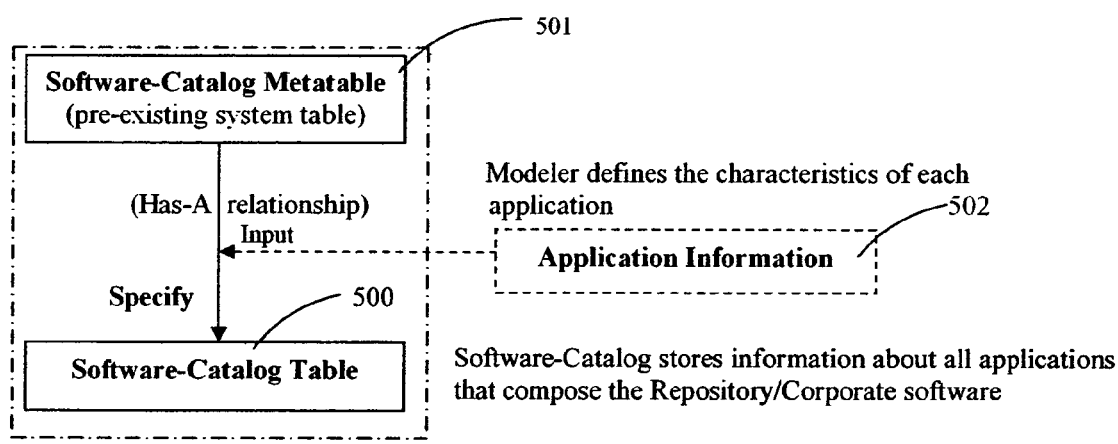
FIG. 5 is a block diagram illustrating an embodiment of how a domain expert or application modeler defines the characteristics of the application as a record in the Software Catalog Table using a metatable that specifies that Software Catalog Table's format and contents.

FIG. 5 is an embodiment of a block diagram illustrating how a domain expert or application modeler defines the characteristics of an application 502 as a record in the Software Catalog Table 500 using a metatable 501 that specifies the Software Catalog Table's format and contents.

FIG. 10 is a diagrammatic representation of an embodiment of a Software Catalog Metatable 1000. This metatable specifies the contents and format of the software-catalog, a sample of which is shown in FIG. 11.

FIG. 11 is an embodiment of a Software Catalog Table 1100 with a file name "Corp-Software-catalog.pdf." The Software Catalog Table 1100 is composed of two parts: The left-side part is shown in FIG. 11-A; and the right-side part is shown in FIG. 11-B.

The information stored in each column in the sample Software Catalog Table of FIG. 11 is as follows:

a) AID 1101 in FIG. 11-A is specified by the record which has MetaID equal to 1 in FIG. 10. This is a unique ID for each application in the software catalog.

b) ApplName 1102 in FIG. 11-A is specified by the record which has MetaID equal to 2 in FIG. 10. This is the name of the application to incorporate in this catalog. The application name should be a unique name.

c) ApplFile 1103 in FIG. 11-A is specified by the record which has MetaID equal to 3 in FIG. 10. This is the name of the file or table where an application is defined.

d) ApplRole 1104 in FIG. 11-A is specified by the record which has MetaID equal to 4 in FIG. 10. This is a keyword to classify the role that this application plays in the software development. Legal values include:

i) Data, the application is one that produces data, such as DBMS, WordProcessor, CADD system, Spreadsheet or Image Processing. These applications are called "Data applications."

ii) Document, (or Doc) the application is one that manages and organizes the projects and documents as a container for the data created by the Data applications that have ApplRole equals "Data" as shown in (i) above. A document application can contain object instances from more than one type of Data application. These applications are called "Document applications." Other roles for the applications are added when needed.

e) ApplType 1105 in FIG. 11-A is specified by the record which has MetaID equal to 5 in FIG. 10. This is the type of the application as, for example, database, CADD, spreadsheet, etc.

f) Author 1106 in FIG. 11-A is specified by the record which has MetaID equal to 6 in FIG. 10. This is the name of the author of an application.

g) CreateDate 1107 in FIG. 11-A is specified by the record which has MetaID equal to 7 in FIG. 10. This is the creation date of an application.

h) Version 1108 in FIG. 11-B is specified by the record which has MetaID equal to 8 in FIG. 10. This is the version of an application.

i) Parameters 1109 in FIG. 11-B is specified by the record which has MetaID equal to 9 in FIG. 10. A "non-null value" specifies that one or more of the plurality of classes of a particular application is a template class. This is a list of class-heads' characteristics separated by commas. The parameters of the list are distinguished by the order of appearance (fields from left to right and records from top to bottom) of the keyword "Generic" in the corresponding Application Table defining the class-heads of an application.

j) Inherit 1110 in FIG. 11-B is specified by the record which has MetaID equals 10 in FIG. 10. This is the comma-delimited list of applications' unique ID ("AID") with MetaID=1 in FIG. 10. The AID should be defined in the same table. The classes within the inherited applications (i.e., Base Applications) loaded with the current application (i.e., Derived Application) retain, at run-time, their own AID and own version.

k) Virtual, 1111 in FIG. 11-B is specified by the record which has MetaID equals 11 in FIG. 10. This is a Boolean value sets to True or False, and may specify a Base Application as virtual. The classes of a virtual Base Application are overwritten by classes of identical names of the Derived Application.

l) Help 1112 in FIG. 11-B is specified by the record which has MetaID equals 12 in FIG. 10. This is a help message about an application to display to an end-user at run-time.

m) Remarks 1113 in FIG. 11-B is specified by the record which has MetaID equals 13 in FIG. 10. In one embodiment, these are a modeler's or developer's comments not used by an application created by the present invention.

4. Extending the Object Hierarchy to Include an Application's Characteristics The present invention extends the definition of the object hierarchy of the object as shown in the following figures:

FIG. 8-A is a block diagram illustrating an embodiment of the hierarchical relationship of the three levels, shown in FIGS. 5–7, of the components used to create an application using the present invention. The Software Catalog 801 that contains an application definition is at level 1. The Application Table 802 that contains the class-head definition is at level 2. The Class Table 801 that contains the class-members' definition is at level 3. One advantage of the present invention over traditional object-oriented programming is that it adds information about the application to each object used. Having the characteristics for each application as "Application Head" defined separately in a table allows creating inheritances between applications, classifying the objects according to their application and the possibility to create parameterized applications. For example, a common object module used by two applications can have its behavior dependent on the application that calls this object. This further increases the modularity reusage of objects.

FIG. 8-B is a schematic block diagram showing an embodiment of the similarity between the metadata hierarchy of a database and a software application embodiment of this invention. An embodiment of the database includes a data warehouse 810, a database 812, a table 816, and a column 820. The software application includes a software catalog 822, an application 824, a class 826, and a member 828.

FIG. 9 is a flowchart further illustrating an embodiment of the hierarchical relationship of the three levels, shown in FIGS. 5–7, that compose the components of an application, and their relationship with the document that contains the persistent objects created by an end-user. The flowchart is subdivided into two stages: the "Design Stage" and the "Run-time Stage."

The Design Stage is where an application modeler/domain expert of an application fills the tables with information. This stage contains the details of the three levels defined in FIG. 8-A. Each level has a metatable 901, 921, 931 that defines the tables 902, 922, 932 which contain the records 903, 923, 933 for each Application, Class or Member as designed by the application modeler/domain expert.

The Run-time Stage is where an end-user instantiates an object according to his or her specification 908 as designed by the application modeler/domain expert in the design stage. The objects instantiated 916 are placed as records 906 in the Objects' Data Table 905 which is located in a document folder 911 that is specified by an end-user. In one embodiment, only the fields 907 (attributes) of the object which have scope-level equal to "Instance-Level" are stored. The Document Manager Object 904 is an object independent of the data application, and has a Layout relationship 912, a Layer relationship 915 and other common properties' relationship 914. The Document folder 911—which can be a folder or an archive file—the Layer 915 and the layout 912 are created, defined and selected by an end-user prior to instantiating the objects 908. The entities placed in the Data Table 905 have complex unique IDs which are composed of the current application (AID), the current class (OID), the current layout (LID), and the current entity unique ID (EID). This design enables placing entities in a document having different applications and different layouts or space model.

To increase modularity of software programs and to extend the documents' capabilities to include instances created from several Data Applications, one embodiment of the present invention divides a created program into two separate objects simultaneously loaded at run-time: (a) the "Document Manager Object" and (b) the current "Data Object." These objects work together at run-time, each with a specific task, as follows:

1. The task of the Data Object 908 is to define the instances of data objects 916 and their proxy entities.
2. The main task of the Document Manager Object 904 is to define the document container to hold the instances created at run-time by one or more Data Application; moreover, it has other tasks that include, for example:
    a) Display List Management for the proxy entities (e.g., storing, displaying and browsing a document);
    b) Layer Management.
    c) Layout Management.
    d) Printing and Plotting Management for a document.
    e) Saving the display list into different, popular file formats (e.g., PDF format).

f) Setting a current value for some common parameter for the objects (e.g., current color, text size, font and line width).

g) Load an adequate Menu Layout whenever a new application 903 is loaded, according to the metadata "ApplType" (FIG. 11A, 1105) setting.

The values of the data members (attributes), the function members and the metadata at the three levels for both the Document Manager Object and the Data Object are visible to each other at run-time.

Figure 17:
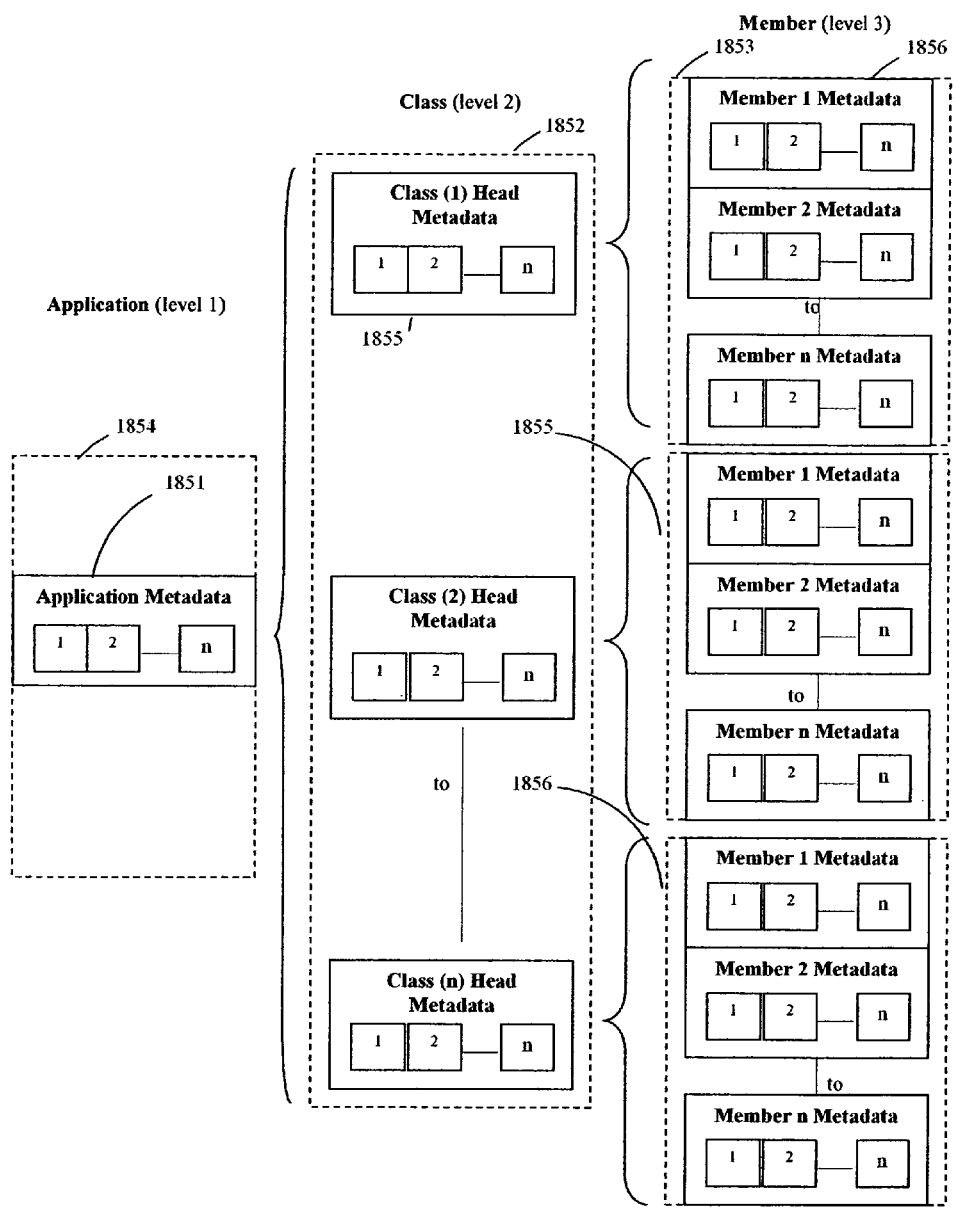
FIG. 17 depicts an embodiment of the Class Table of FIG. 16 after being loaded at run-time in the computer memory.

An example of the object hierarchies is shown in FIGS. 17, 17-A, 17-B and 17-C. FIG. 17 is composed of two parts: The left-side part is shown in FIG.17-A, and the right-side part is shown in FIG. 17-B. FIG. 17 collectively depicts an embodiment of a fragment of a sample Line Class Table 1700 ("SchLine.pdf" of FIG. 16) after being loaded at run-time in memory, and wherein the class inheritance as specified in the class-head stored in the Application Table of FIG. 13-A (under 1308 and 1309) has been solved as follows:

ObjectName=Line (OID=3) inherits OID=1(Entity-Header)

The members of the two classes are concatenated at run-time according to their virtual status. Multi-inheritance is resolved the same way.

FIG. 17-C depicts a sample database table representing the persistent storage for the Line objects instantiated from the Line class loaded in memory shown in FIG. 17. In one embodmient, only the attributes with scope_level 1713=Instance_level (i.e., 2) have been stored. The attribute universal unique ID (EID, 1725) is represented by four elements separated by a period ("."). The first element, representing the sample application, has a value of 2 for all records. This is the application "CorpCAD," whose AID is 2 as shown in FIG. 11-A, 1101. The second element, representing the class FIG. 13-A, 1301, has a value of 3 for all records. This is the object whose ObjectName is "Line" as shown in FIG. 13-A. The third element, representing the layout, has a 0 value for all elements (i.e., this is the model space). The fourth element is the entity ID and is a unique number for each entity placed in that table.

5. Creating a Relationship Between the Data Object and the Project/Document Object FIG. 25-A is a block diagram illustrating an embodiment of the object hierarchical relationship of the three levels (as shown in FIG. 9) that compose the entire source code of an application, and wherein the objects' relationship has been extended to include a Project/Document hierarchy.

FIG. 25-B depicts another embodiment of the present invention that further extends the object hierarchical relationship shown in FIG. 9 to include a hierarchical relationship with a Project/Document Object. A running program created by the present invention is composed of three objects simultaneously loaded at run-time, described as follows:

1. The Document Manager Object 2520 has the same tasks as described in the previous section 4 and in FIG. 9. Further, the Document Manager Object 2520 works as a host for the Project/Document Object 2516 and the Data Object 2521. In one embodiment, at run-time this Document Manager object is loaded first in memory.

2. Project/Document Object 2516 with tasks to specify the project and document definition from a Document Application 2508 and 2509 with ApplRole FIG. 11-A, 1104=Document. In one embodiment, at run-time this object is loaded second in memory.

3. Data Object 2521 specifies the definition of the data entities from a Data Application 2502, 2504 with Appl-Role FIG. 11-A, 1104=Data. In one embodiment, at run-time this Data Object is loaded third in memory. Other tasks of the Data Object may include:

a) Creating instances of the objects 2521 and storing them in persistence storages. These persistence storages are managed by this current Data Application but can get several of their properties as messages, or global or visible variables from the Document Manager Object 2520 and from the Project/Document Object 2516. These messages may include:

i) the name of the document (archive or folder) where these storages reside.

ii) the current value for several common properties for most applications which also have common attributes between the Document Manager Object 2520 and the Data Objects 2521.

iii) metadata value from the three levels of the Project/Document Application 2508, 2510 and 2512.

b) Creating proxy entities for these objects and sending them to the hosting Document Manager Object 2520 for storing, managing and displaying 2522 in a display list.

The values of the data members, the function members and the metadata at the three levels for the Document Manager Object 2520, the current Project/DocumentObject 2516 and the Current Data Object 2521 are visible to each other at run-time. In one embodiment, the metadata variables of the Document Manager Object 2520 are loaded first in memory before the Data Application; hence the Document Manager Object can be used to send metadata information for genericity use. For example, this metadata information can be used to automatically modify parametric class-heads and parametric class-members during loading a new Data Application. FIG. 35 further depicts this relationship between the Document Application 3502 and the Data Application 3504.

Furthermore, FIG. 25-B is a flowchart illustrating an embodiment of the details of the hierarchical relationship of the three levels (as shown in FIG. 9) that compose the entire source code of a Data Application, and wherein their relationship with the Documents Manager Object FIG. 25-A, 2553 has been extended to include a hierarchy defining the Project/Document Object FIG. 25-B, 2516 as follows:

1. Level 1 further contains the Software Catalog Table 2507 containing the list of applications that have ApplRole=Document. The Projects Catalog Table 2507 contains a record for each Doc-Application 2508 defining the plurality of characteristics of each document represented by a record in the Document Application Table 2509. Each Doc-Application 2508 has a Unique_ID (PID).

2. Level 2 contains the Document Application Table 2509 which has an Application Metatable (not shown) that defines the table records' contents and format. The Document Application Table 2509 contains a record 2510 for each document defining the characteristics of each document. Each record representing a document has a Document Class Table 2511. A sample Project Class Table (not shown) is similar to the example shown in FIG. 13 where the field datafile holds the Document Folder Name or the Archive File. Each Document has a Unique_ID (DID) and its universal ID is equal to PID.DID.

3. Level 3 contains the Document Table 2511 which has a Document Metatable (not shown) that defines that Document Table's contents and format. The Document Table 2511 contains a record for each Member (Field) 2512 defining the plurality of characteristics for each Member. The Document Table 2511 is similar to the Class Table 2503 but saves the class member definition for the Project/Document Class. A sample Document Table (not shown) would be similar to the example shown in FIG. 15. Each Member has a Unique_ID (MID) and the universal ID is equal to PID.DID.MID.

The following is an example of an embodiment of how the Document DID and the Object OID work together at the Run-time Stage:

a. Starting a program created by the present invention loads the Document Manager Object 2520, 2553.

b. The end-user selects or creates a document in a certain project, and the current Project/Document Object 2516 then has a universal ID (=PID.DID).

c. Similarly, a current layout 2518 is selected or created and has an ID (=LID).

d. The end-user selects an application 2501, and that selected application sends a message to load a Menu 2513 for itself, according to the type (ApplType) of the application 2501.

e. The end-user instantiates an object 2521 according to the object specifications 2506 as set by the application modeler in the Design Stage. The object is stored in a database table 2514 which is specified by the current Project/Document 2516.

f. The data entities instantiated are placed in table 2514 which has records 2515 that have complex unique IDs which are composed of: The current Application (AID), the current Class (OID), the current Project (PID), the current Document (DID), the current Layout (LID) and entity unique ID (EID). This design of the complex unique ID enables placing entities in a document having different applications and different layouts, or different design space models. Moreover, ViewPort entities may be instantiated and placed in a layout to view areas from remote documents belonging to the same or another project.

g. The above design also enables creating relationships between objects in different documents or projects in a dynamic way. For example, for a spreadsheet document (S) in a project (P) calculating a cost estimation from a CAD document (T) in the same project (P), the cost estimated in that spreadsheet automatically changes whenever changes are done in the CAD document (T) and vice-versa.

The relationship between the Project Object and the Document Object is illustrated in FIG. 33. The Project Object 3301 defines the characteristics of a project, and has one or more Document Object. Instantiated Project Objects are saved in a table in, for example, the Corporate Standard Directory. The Document Object 3302 defines the characteristics of a Document. Instantiated Document Objects are saved in a table in the Project Directory.

The advantages of creating a relationship between the Project/Document Object and the Data object may be summarized as follows. First, metadata defining and classifying the Project/Document Application may be used as parameters to a Data Application to customize its Parameteric Data Application, its Parameteric Data Classes and its Parameteric Data Class Members (see Genericity in section 9 below). Second, metadata holding information about the Project/Document Object may be used as parameters to member functions of the Data Object. It is also possible to customize the type of Data Applications to use with each type of Project according to its classification.

6. The Extension Programming Language Used to Write Member Functions

The present invention describes authoring the class-head and class-body of an object. The member functions present in the Class Table are defined as links to their source code in an external file in which they are written using an extension programming language. The extension programming language can be with or without object orientation paradigms.

One embodiment of the present invention uses a non-OOPL such as, for instance, "MINERtools," developed by Expert-InfoCAD of Amherst, N.H. with some additional, extended functionalities. The non-OOPL can have different libraries of low level routines system functions and/or debugging capabilities. Examples of the extended functionalities include the following:

1. means for accessing the metadata associated with an application, class-heads and class-members from inside the programming language, and retrieving the value of the current class members;

2. a graphic functions library to use in the display list creation;

3. multimedia functions library with read and play capabilities; and 4. means to link an operating system dependent external shared object file or dynamic link libraries.

One embodiment of the present invention contains a run-time compiler that compiles the member functions to platform independent bytecodes. To increase performance of a created program, the steps for executing a member function are as follows:

1. if the bytecodes of the function are previously loaded in memory, the bytecodes are used; otherwise, 2. if a saved bytecodes version of the function is saved on the hard disk and has a more recent date than the source code of the function, the bytecodes are loaded and used; otherwise, 3. the function source code file is compiled and the bytecodes are loaded in memory and also saved on the disk as bytecodes.

7. Creating an Object-Oriented Structure in Memory from the Tables

At run-time, when an application is selected from the Software Catalog Table (for example the Application 1104 "CorpCAD" in FIG. 11-A column 1102), the application metadata is loaded in memory as a structure FIG. 18-A, 1851. The corresponding application file, "ApplFile," (corpcad.dbf shown FIG. 11-A column 1103) is opened and the class-heads' characteristics from the Application file (CorpCad.pdf shown in FIG. 13, 1300) are loaded in memory to form an array of object-oriented sub-structures FIG. 18-A, 1852 (class 1 to n) to the structure 1851. And, for each class-head, its "Class-File" (FIG. 13-A column 1303) is opened and the class-members are loaded as another substructure FIG. 18-B, 1853 (member 1 to n) to the structures 1852. Each class table is represented by Items 1853, 1855, 1856. In one embodiment, Abstract Classes (e.g., FIG. 13-A column 1305) are not loaded in memory except when they are called by inheritance (column 1308) from a concrete class (column 1305). At run-time, when loading a class-head to store it in the object-oriented structure, if the class-head contains inheritance 1308, it is resolved first, i.e., the members of the inherited super-class (attributes and methods) are read and loaded into memory in the object-oriented structure, recursively, and from left to right before loading the derived-class members. If a member (attribute or method) has the same name (Title) as a member that is already loaded in memory for the same object, the previously loaded attribute can be overwritten and replaced by this attribute according to the virtual properties of the member and the object, with similarity to the C++ OOPL grammar.

An example for loading a class object-oriented structure that has inheritance is illustrated in FIGS. 13, 15, 16 and 17. The Application Table (1300 of FIG. 13) for this sample CAD application is loaded first in memory, followed by loading the objects as listed in the column entitled "Object-Name" (FIG. 13-A column 1302) from top to bottom as follows:

1. EntityHeader Object (OID=1). It has Inheritance (column 1308) equals to 0 (i.e., none). It is an Abstract class—as the Abstractness (column 1305) shows—and is not loaded in memory. Its Class Table, listing its member, is shown in FIG. 15.
2. TableHeader Object (OID=2) is similar to the "EntityHeader" Object. The TableHeader is an abstract class and is not loaded.
3. Line Object (OID=3) is the next to be loaded, as it has Inheritance (column 1308) equal to the OID 1, i.e., it has the Object "EntityHeader" as a super-class. The Object EntityHeader Class FIG. 15 is loaded, first, in memory followed by the "Line" class FIG. 16. The combined schema, as loaded in memory, is illustrated by FIG. 17. When instantiated, the class in FIG. 17 is used to represent the "Line" entity; the members with scopeLevel 1713 equal to 2 are stored in a repository as shown in FIG. 17-C.

The remaining classes shown in FIG. 13-A are similarly loaded. BrickWall Object (OID=11) has multi-inheritance equal to the OID 3 and 6. It has the Object "Line" (OID=3) as a supper-class which recursively has the "Entity Header" (OID=1) as another super-class. First, the "EntityHeader" schema is loaded, followed by the "Line" schema (OID=3); then the "Wall" schema (OID=6)—as the second inheritance—is loaded.

Loading the application classes' object-oriented structure in memory is similar to linking the objects during building an application in the C/C++ programming languages.

Genericity for parameretized applications, classes and members are resolved after resolving all the inheritances (again, more details on genericity are illustrated in section 9 below).

8. Run-time Deployment of an Application

As described in the above sections, the object-oriented class declarations are saved in database tables which are structured files representing the class object-oriented structures. This allows loading the classes' object-oriented structure of an application directly in a computer memory without the need for compilation, using techniques similar to that used in DBMS. The loaded classes' object-oriented structure, together with the member functions compiled at run-time, represent a running program.

A main advantage of directly deploying the application from its source code is that it creates an open system representing an application in self-descriptive database tables. "Open" here refers to both the straightforward recognition of data in tables (as opposed to having to understand and master language rules of traditional OOPL) and to the unconcealed nature of the deliverables that the present invention may beget (i.e., delivering pre-deployed applications as tables as opposed to the closed binary format which is common in the commercial software industry). Hence, the present invention has much more clarity in the codes than conventional OOPLs and directly produces a running program which may be easily customized, modified or added to by subsequent users. Such an open system can spur and foster innovation by domain experts in an ad-hoc fashion similar to the conventional database techniques.

FIG. 18-B depicts a block diagram further illustrating how the Application Tables 1802, 1803, 1807, the functions' source code 1811, and the user document 1801 are loaded in memory to form an object-oriented data structure for each object, all of which, together, represent a running program. The functions' source code 1811 are compiled at run-time to platform independent bytecodes and saved in memory 1810. The end-user opens or creates a document 1801, and creates or selects a layout. The document data tables 905 are indexed and the indices are saved in memory 1809. Pointers to the functions' bytecodes 1802 and pointers to the data tables and their indices 1813 are saved with the object-oriented data structure 1803–1807 for each object. Image for memories of the functions' bytecodes 1810 and the tables' indices are saved as cache on a hard disk or any networked storage structure to increase performance when the document or the application is re-opened/re-loaded at a later time.

Figure 19:
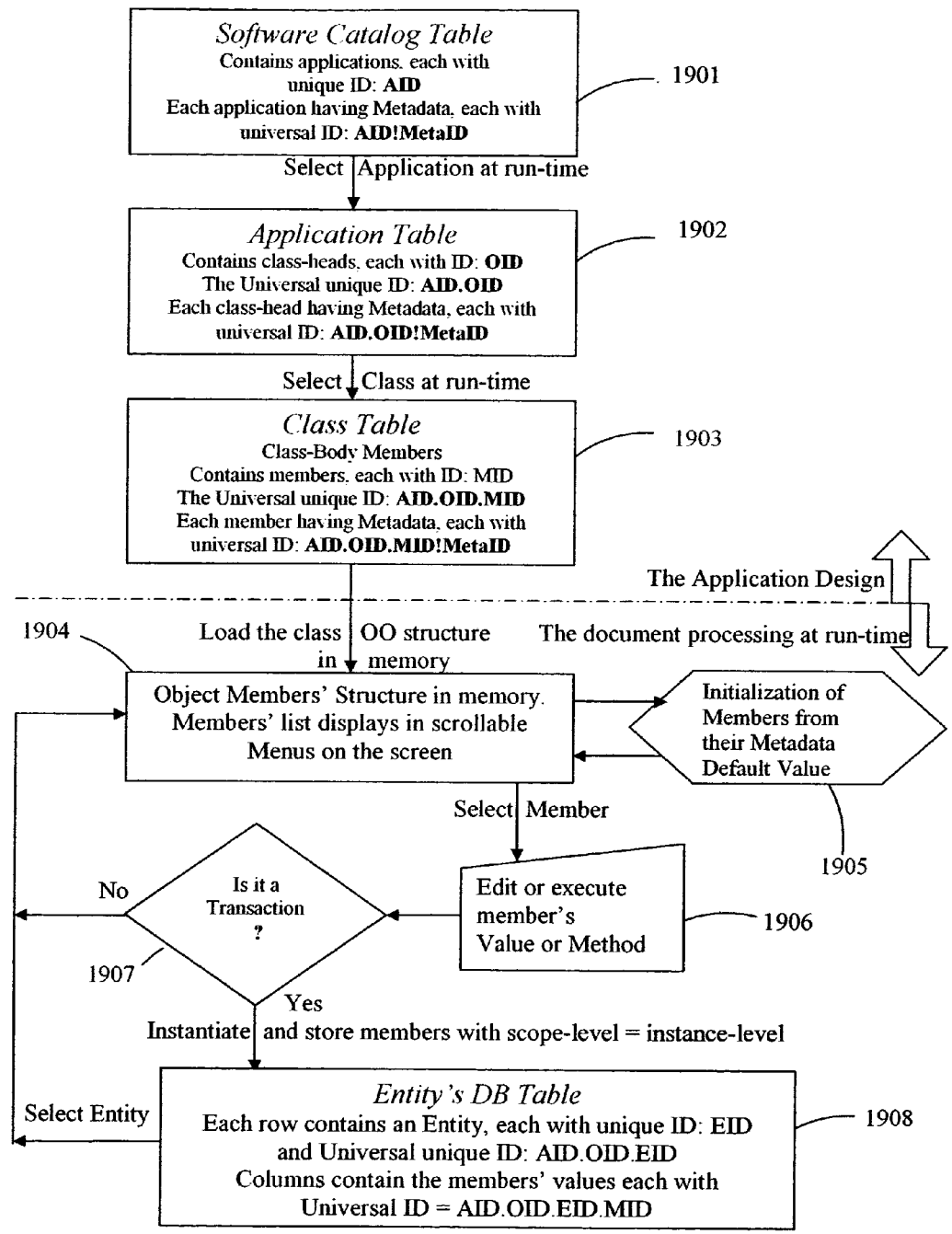
FIG. 19 depicts a flowchart of an embodiment of the steps performed when several instructions selected by an end-user are performed.

FIG. 19 depicts a flowchart of the steps performed when several instructions selected by an end-user are performed at run-time as follows: The end-user selects an application to load from the Software Catalog Table 1901, and then selects a class from the Application Table 1902 to become current. The selected class-members' structures 1903 are loaded in memory 1904 and its members initialized 1905 with the metadata default value (MetaID #16 in FIG. 14). Further selection of a class-member 1906, depending on the Member Type (MetaID #4 in FIG.14), either (a) triggers a function, (b) prompts to change the value of an atomic member, or (c) prompts to select a foreign key from the list of primary keys of a composite object. If the function selected involves a transaction 1907, the entity (instance of the object) information is stored in the repository 1908, with the entity having complex unique IDs which are composed of the current application ID (AID), the current class ID (OID), the current Document ID (DID), the current Layout ID (LID), and the entity unique ID (EID). The LID is used if the document has a layout capability. The DID is used to add ViewPort capability to the Layout.

Figure 20:
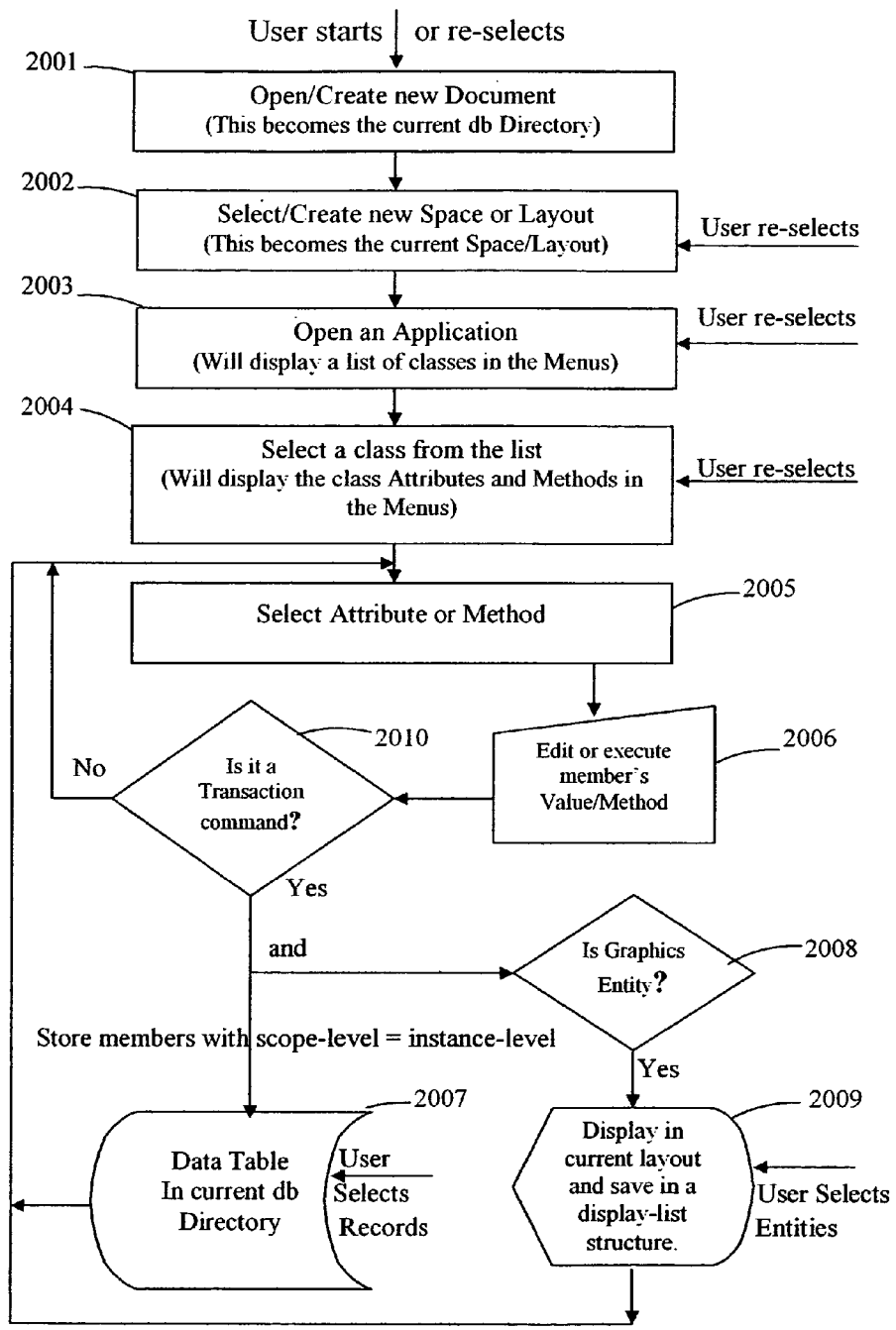
FIG. 20 depicts a flowchart of an embodiment of the steps performed when several instructions selected by an end-user at run-time are performed for an embodiment of the invention that has graphics (screen displayable) entities.

FIG. 20 depicts a flowchart for an embodiment of the invention that has graphics entities of the steps performed when several instructions selected by an end-user at run-time are performed. First; the end-user selects a document to open or create (step 2001). The user then selects, or creates a new space or layout to work on (step 2002). The user then opens an application to use (step 2003) and selects a class (step 2004). The user then selects an attribute or method (step 2005). The user can then edit or execute the members' values or methods in step 2006. If the function executed is a transaction 2010, the value or method is stored in a database 2007. If the function executed is for a graphics entity 2008 that has its proxy image defined by the member functions, the value or method is displayed on the screen 2009 in the current layout (as selected in step 2002) and saved in memory in a display list structure. Also saved with the display list structure is the entity complex unique IDs which are composed of the current Application ID (AID), the current class ID (OID), the current Document ID (DID), the current Layout ID (LID), and the entity unique ID (EID). An image of the display list structure in the computer memory can be saved as cache on the hard disk or any other networked storage to increase performance when the document is re-opened at a later time.

Another advantage of the current invention over traditional applications is that it saves with each object its universal unique ID in the persistence repository, and is also saved with the image of entities in the display list. The entity's universal unique ID is a complex string containing the application ID and the class ID from where this entity was instantiated. This allows creating an end-user document which is created or edited using more than one application. This, in turn, permits the creation of small size applications that can be used as reusable components of a larger virtual application—composed of the smaller applications—selected by an end-user at run-time.

Figure 21:
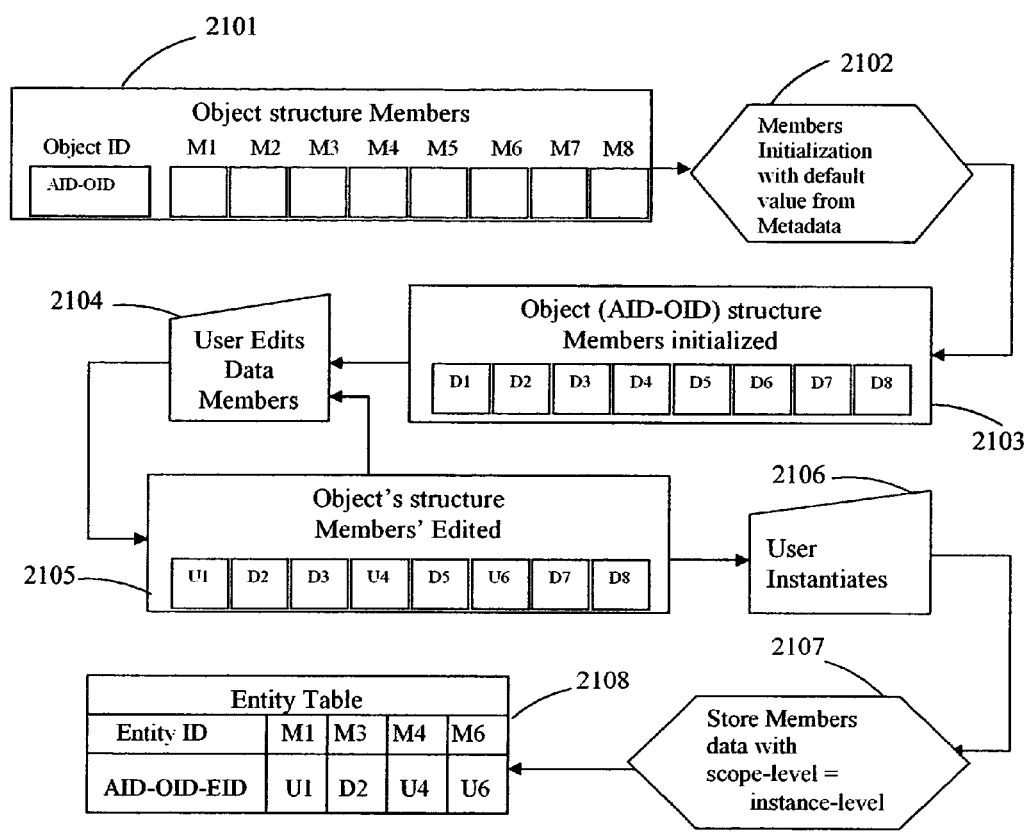
FIG. 21 depicts a flowchart of an embodiment of the steps processed to instantiate a new entity using the currently-loaded object having a member's structure.

FIG. 21 depicts a flowchart of the steps processed to instantiate a new entity using the currently-loaded object having a member's structure 2101. First, the members of the current object are initialized (step 2102) with their default value as saved in the metadata (MetaID # 16, FIG. 14) to create the initialized structure 2103. Then, the end-user edits the data member (step 2104) to produce the edited structure 2105, followed by selecting a function to instantiate (step 2106) the object. In one embodiment, the data members with scope-level equal to instance level are stored (step 2107) in the entity table 2108.

Figure 22:
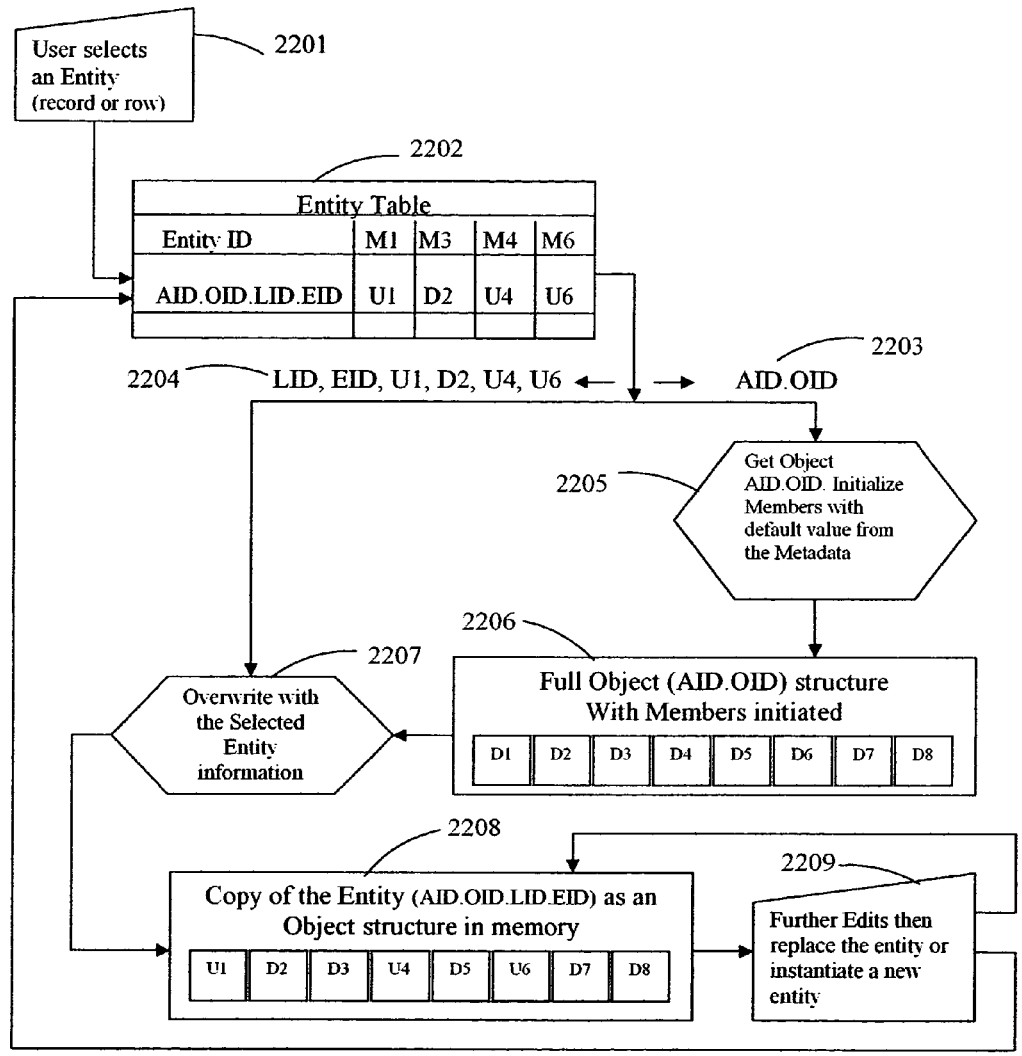
FIG. 22 depicts a flowchart of an embodiment of the steps performed when an end-user selects a row 2201 from the entity table 2202 having a traditional database format.

FIG. 22 depicts a flowchart of the steps performed when an end-user selects a row (step 2201) from the entity table 2202 having a traditional database format, i.e., containing only the attributes with scope-level=instance-level. The AID-OID (Application identifier and Object identifier) 2203 are sent to initialize the members with their default values saved as metadata (step 2205) to form a full object structure having its members initialized 2206. The original Entity ID and the members' values 2204 are sent to overwrite the corresponding initialized member (step 2207) to form a full object-oriented structure 2208 with the data updated from the entity table 2202. Then, the end-user further edits (step 2209) the data member structure 2208, followed by selecting a function to instantiate or replace (step 2209) the current object. In one embodiment, only the data members with scope-level equal to instance level are stored back in the entity table 2202.

If an end-user selects an entity from the graphic screen, its Entity Unique ID is retrieved from the display list as saved in memory; and the entity information is retrieved from the entity table 2202.

Figure 23:
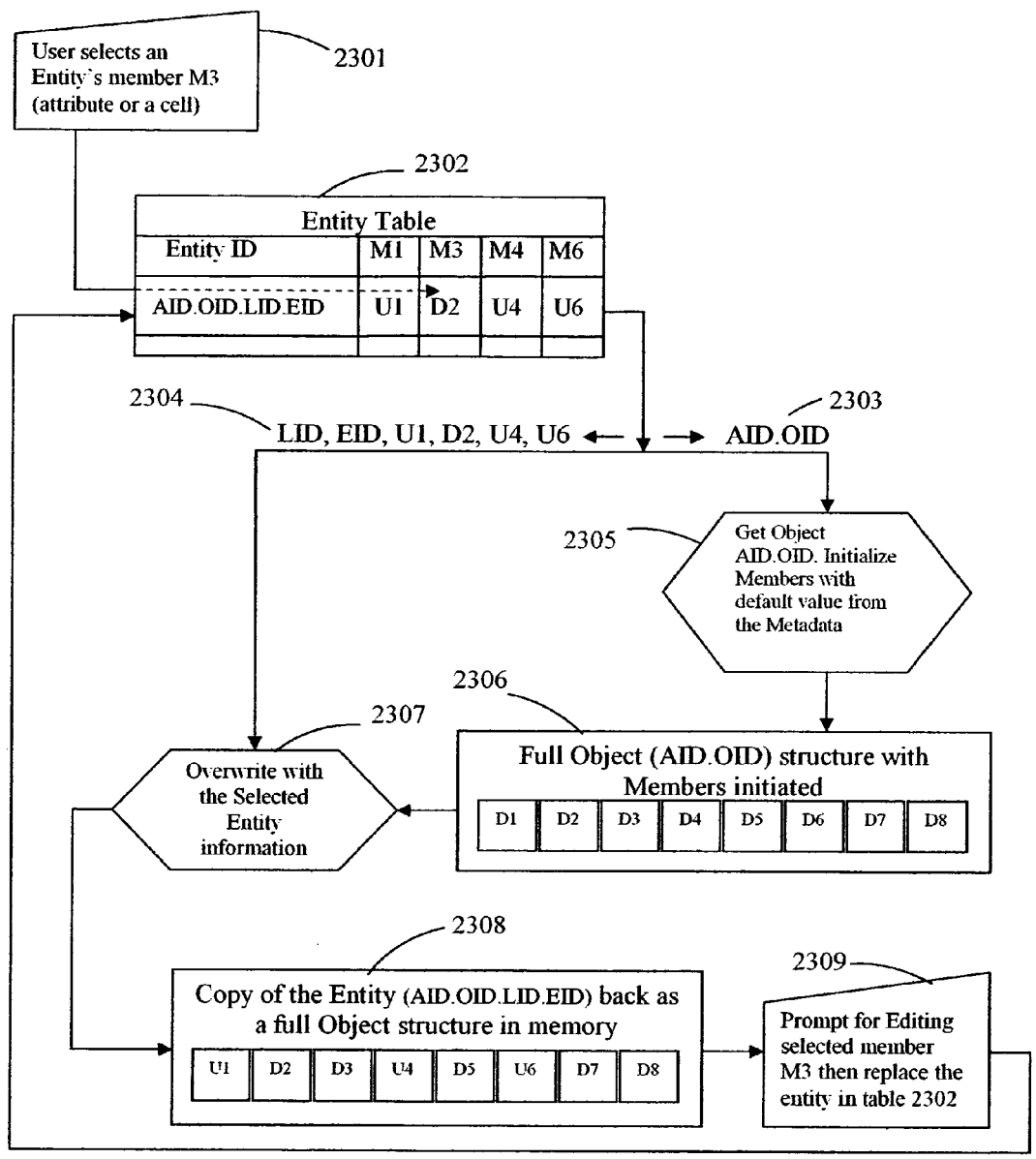
FIG. 23 depicts a flowchart of an embodiment of the steps performed when an end-user selects an attribute (cell) 2301 from the Entity Table 2302 having a traditional database format.

FIG. 23 depicts a flowchart of the steps performed when an end-user selects an attribute (a single cell) (step 2301) from the entity table 2302 having a traditional database format. The Application ID and Object ID (AID and OID) 2303 are sent to initialize the object members with their default values saved as metadata (step 2305) to form a full object structure with the initialized members 2306. The original Entity ID and the object data members' values 2304 are sent to overwrite the initialized member 2307 to form a full object-oriented structure 2308 with the data updated from the entity selected. Then, the end-user is prompted (step 2309) to edit the value of the selected member. And the data members with scope-level equal to instance level are stored back in the entity table 2302.

9. Resolving the Genericity (Parameterized Classes or Generics)

The present invention uses two methods to support parameterized classes. "Genericity" herein means a way to pass information from a low level table to a higher level table in order to change the structure or the inheritance of a template class. The present invention details two methods to apply genericity as follows:

1. Parameters Method: Passing Parameters from Low Level Tables to the Next, Higher Level Tables.

Figure 24:
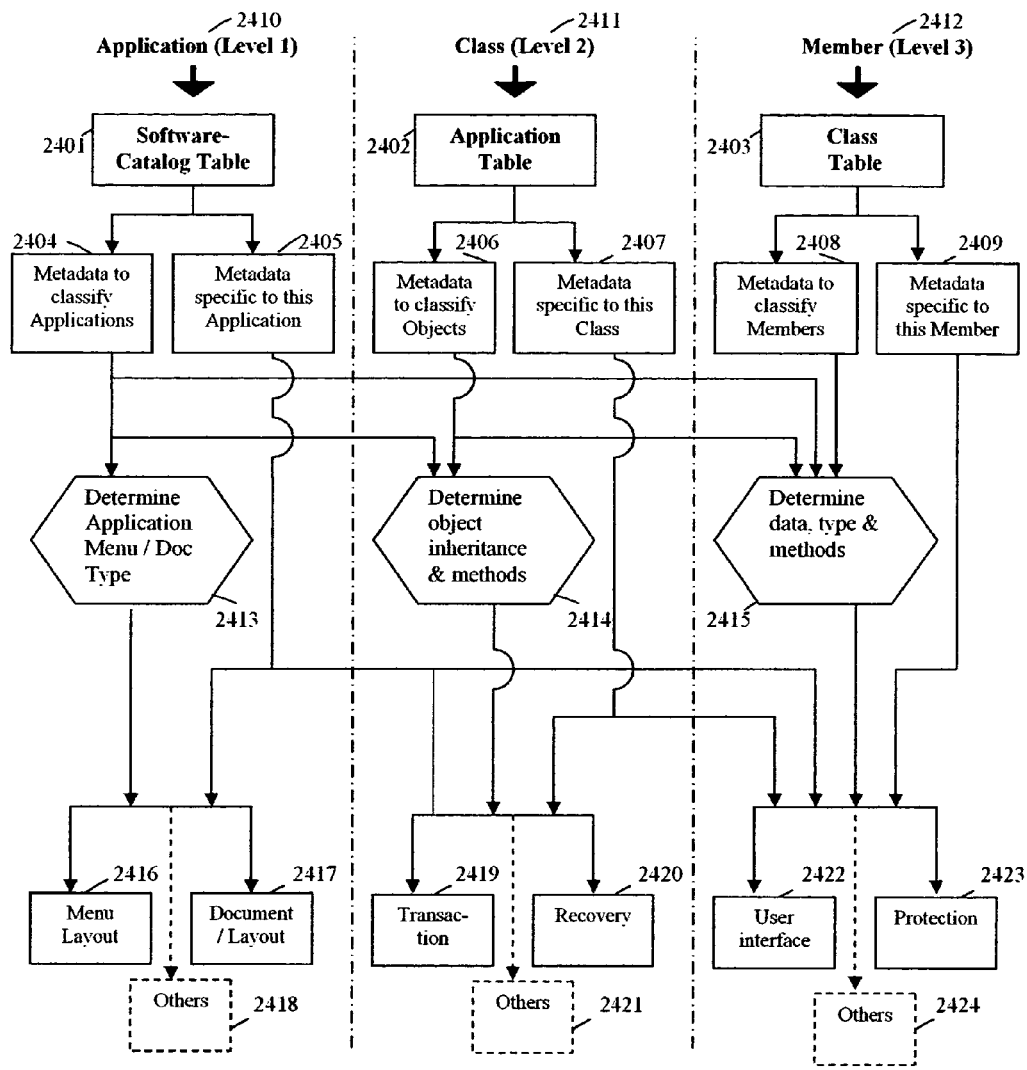
FIG. 24 depicts a flowchart of an embodiment of the means that can be used to simplify the development of the software process from metadata information about the application, the object or the class-member.
Figure 34:
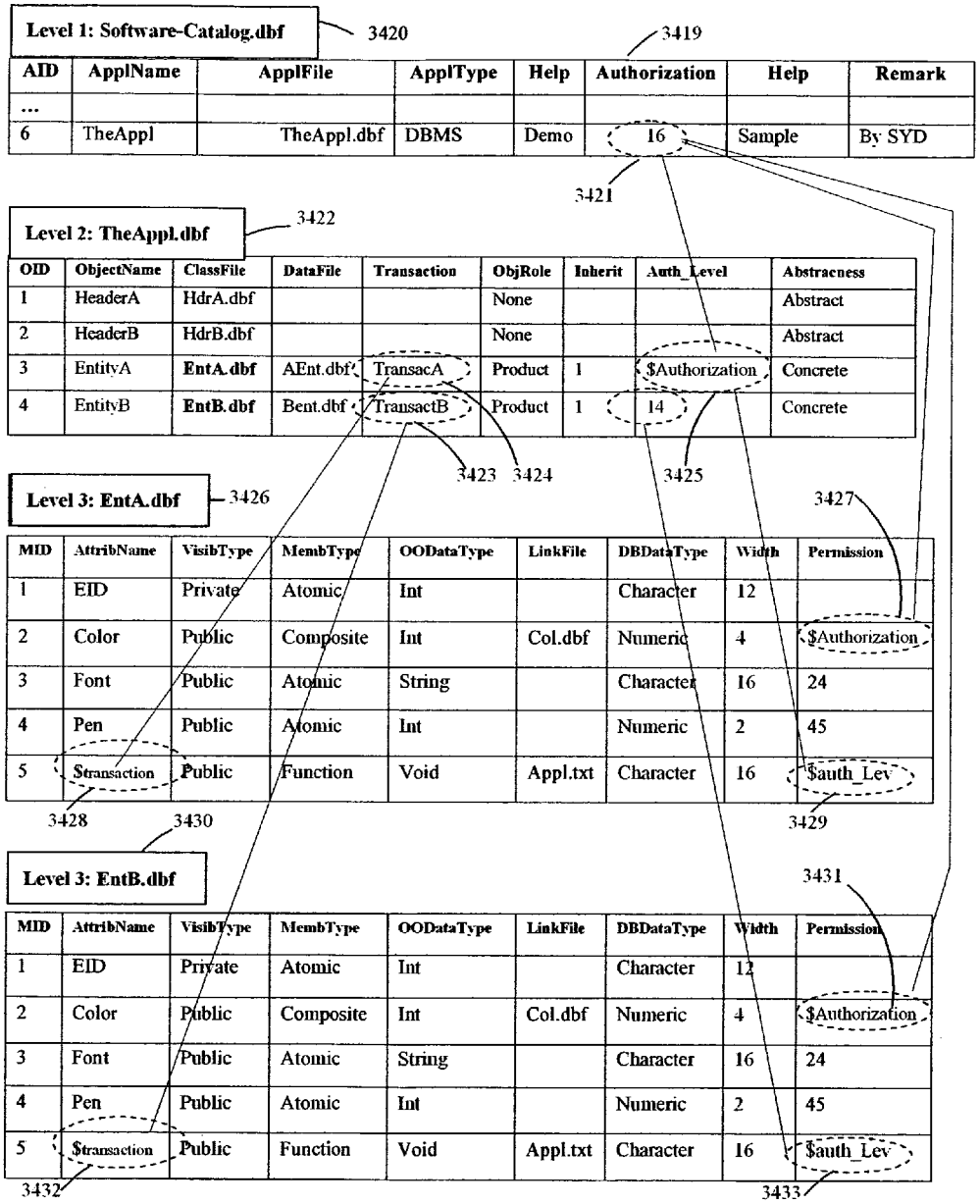
FIG. 34-A is a diagrammatic representation of an embodiment of a fragment of a Software Catalog that depicts how this Parameters Method works to support parameterized classes.

Referring to FIG. 24, the metadata at level 2 2411 and level 3 2412, except the Object IDs and member IDs, can be assigned the keyword "Generic" by the application modeler, to be replaced by a parameter passed from a lower level at run-time to support "genericity" or parameterized types. The parameters are stored in the lower level in a column called "Parameters" that stores a parameters list. A non-null value in this column specifies that the class called by this record is a "Template Class." The parameters list is distinguished by the order of appearance of the keyword "Generic" in the corresponding Application Table or Class Table defining the members of the class-head and class-body, respectively. This is a more extended type of genericity than that used in the C++ OOPL. The parameters, passed to the class-head or the class-body, compose the signature for the class to support class overloading as well as the needed function overloading if the parameters to the function contain metadata. FIG. 34-A is a diagrammatic representation of a fragment of one preferred embodiment of the present invention that depicts how this "Parameters Method" works to support parameterized classes. The Software Catalog Table 3401, at level 1, has the column 3402 called "Parameters." The record with AID=6, for the application "MyAppl" which has a link to an ApplFile table "MyAppl.dbf," contains a list of four parameters in the Parameters column 3403. FIG. 34-A demonstrates how the parameters list at level 1 replaces the fields at the next, higher level in the table "MyAppl.dbf" for each instance of the keyword "Generic" in the table, in the order it appears in that table from top to bottom and left to right (as, for example, the first element in the list "Insert" replaces the first occurrence of the keyword "Generic" in the cell 3407). Similarly, the Class Table 3405 "MyAppl.dbf" at level 2 also has a column called "Parameters" 3406. The record with OID=4 for the class "EntityB" which has a link to a ClassFile "EntB.dbf" table contains, in the Parameters column, a list of three parameters 3408. FIG. 34-A also demonstrates that this parameters list at level 2 replaces the fields at the next, higher level in the table "EntB.dbf 3409 for each instance of the keyword "Generic" in the table, in the order it appears from top to bottom and left to right (as, for example, the second element in the parameters list "CA.dbf" replaces the second occurrence of the keyword "Generic" in the cell 3410). A sample use of the above method is shown in FIG. 14.

2. Metadata-Variable Method: The Parameters from a Lower Level Table to Any of the Higher Level Tables are Passed as Metadata Variables.

A metadata variable is the metadata field's title preceded by a particular character such as the dollar sign operator ("$") as, for example, the variable "$Authorization." FIG. 34-B is a diagrammatic representation of a fragment of one preferred embodiment of the present invention that depicts how the Metadata-Variable Method works to support parameterized classes. The Software Catalog Table 3419, at level 1, has the column 3420 called "Authorization." The record with AID=6 for the application "TheAppl" which has a link to an ApplFile table "TheAppl.dbf" contains a value=16 for the Authorization field 3421. The linked file "TheAppl.dbf" 3422 has a column with title Auth_level, that has a value equal to $authorization for the record with OID=3. The word $authorization is a variable for the metadata, from the table 3419 at level 1 having a value=16. The value for Auth_Level field 3425 for the record with OID=3 is set to 16. Similarly, an embodiment of the table "EntA.dbf" 3426 at level 3 has fields set to values by metadata variable as follows:

$authorization 3427 at the record with MID=2 receives a value of 16 from level 1.

$auth_level 3429 at the record with MID=5 also receives a value of 16 from 3425 at level 2.

$transaction 3428 at the record with MID=5 receives a value of TransacA.

Another embodiment of a similar table "EntB.dbf" 3430 at level 3 has fields set to values by metadata variable as follows:

a. $authorization 3431 at the record with MID=2 receives a value of 16 from level 1.

b. $transaction 3432 at the record with MID=5 receives a value of TransacB.

c. $auth_level 3433 at the record with MID=5 also receives a value of 16 from 3425 at level 2.

Moreover, the present invention also enables passing parameters from the Document Application to the loaded Data Application into this document to any of the three levels 1, 2 and/or 3. For example, the metadata variables used in the "Docs Manager" for the currently-loaded document from the Projects Catalog Table 2507 (level 1) and the Project Table 2509 (level 2) can also be used as variables—at any level—in the Data Application Tables loaded at run-time.

If two fields have the same Title at different levels, the value of the lower level prevails and is used. Similarly, if two fields have the same Title in the Applications Table and the Docs Manager Table, the value in the Docs Manager Table prevails and is used.

10. The Member Function Overloading

A function is declared once in the Class Table with a return type but without parameters. The function is defined in the source code file. The function can have more than one definition with several parameter signatures. The signature also includes the ID of the calling object. This allows the modeler to create different versions of the object using genericity or parametric classes. In one embodiment, the member functions are called from two locations: from within another function or from the menu system as follows:

a) Calling a function from within another function, with the required parameters that match any of signatures the functions defined in the source code file. If no matching signature was found, an error is issued; or b) Calling a function from the dynamically created menu system: The members' functions are then called with no parameters or a NULL.

Functions called with a NULL parameter—either from the Menu or from another function—search for their definition with a NULL parameter and use it. Otherwise, an inference engine that matches each of the source code functions' parameters name with the current class-member name uses its value (if this is not NULL) until the parameters of a function are satisfied; or else an error message is issued.

11. Reusability of Applications, Classes and Patterns

Reusable classes and reusable patterns (i.e., patterns of source code) as, for example, parameterized classes, are well known in the software development arts. The present invention also extends the reusability to applications.

Reusable Classes

The virtual engine, detailed below and which is part of an embodiment of the present invention, is provided with libraries of the most common reusable classes. In one embodiment and for programming languages that are designed to allow application programs to be built that can be run on any platform without having to be rewritten or recompiled by the programmer for each separate platform, the virtual engine is software that mimics the performance of a hardware device and acts as an interface between the application program and the microprocessor (or hardware platform) that actually performs the program's instructions. An example of such application programs are the programs written with the Java® programming language (developed by Sun Microsystems, Inc. of Santa Clara, Calif.). For many of these reusable classes, more than one type or mode may exist in the libraries. For example, for a locking mechanism, there are:

1. Read (or shared) mode Lock;
2. Write (or exclusive lock) mode Lock;
3. Two phase Locking;
4. Multigranulity Locking;
5. Class Hierarchy Locking; and
6. Complex Object Locking.

And, because the present invention is an open system that can easily be understood and enhanced, these libraries can grow larger over time by the participation of domain experts and other users from different disciplines.

Moreover, the virtual engine of the current invention also has the capability to use operating system compatible class libraries stored on a computer system as archives of sharable objects—or as dynamic link libraries (dll files)—by providing the name of the class library in the column "Map_Lib" (not shown in the drawings) in the Application Table, and creates a class table defining the members (with similar names) that are needed for an application. These are, for example, the different Microsoft Foundation class libraries, developed by Microsoft Corporation of Redmond, Wash., or the Rogue Wave reusable object-oriented libraries developed by Rogue Wave of Boulder, Colo.

Reusable Applications

An advantage of the present invention over traditional OOPLs is that the present invention adds information about an application in the Software Catalog Table and such information is inherited by each object used by an application. Having the characteristics for each application defined separately in a table (Software Catalog Table representing the application characteristics or Application-Head) allows one or more of the following:

1. Creating inheritances between applications: This is enabled by adding the metadata "Inherit" for an application to represent the application inheritance list; and by the possibility of defining an application as "Virtual." The classes of a virtual Base Application may be overwritten from the Derived Application.

2. The domain expert or application modeler can classify the application into different categories. Objects used by the application inherit the classification of their application.

3. Creating a parameterized application: An example of a parameterized application is to have the same object module as an Application Table used by two applications, each having its behavior dependent on the calling application's characteristics. This further increases the modularity reusage of the objects.

12. Techniques to Simplify the Development of an Application

One goal of the present invention is to provide a programming environment that enables an expert in a certain field to design, author and/or enhance his or her own software program without, or with minimum help, from a professional software programmer. However, there are aspects of software development which go beyond the scope of one's domain expertise, but which are needed, however routine they may be, for the full realization of a functional application. These may include the creation of a user interface, icon, a help system and several common routines for a certain type of application. For this purpose, the present invention details methods and techniques to simplify the development of many parts of an application to be within the functional capacity of the domain expert or application modeler as much as possible.

The following is a list of techniques used by an embodiment of the present invention. Some of these techniques have been described above.

1. First, the present invention defines the classes of an application in RDB tables. This by itself is a major simplification to software development because database tables are self-descriptive, clean, have clarity and allow editing in an ad-hoc fashion. The different tables needed to define the classes are created using standard forms previously saved in metatable. These forms guide the domain expert or modeler, during input, on how to fill the tables with the metadata information, and can also be used to automatically check on the syntax and integrity of the input metadata.

2. Another benefit for defining the class declaration in RDB tables is applying proven techniques used in RDBMS to the object-oriented software development to directly deploy an application without compilation of the source code, as detailed in sections 7 and 8 above. Moreover, applying indexing and memory management to the object-oriented data structure similar to the proven techniques used in the RDBMS increases performance, even amidst quantitiave complexity as these techniques can handle very large data. Further, as mentioned already, directly deploying an application from the source code without creating an intermediate binary file creates an open system. Also, the present invention programming environment provides a run-time tool to track and display the changes in the current class data members' values, and to track the local variables inside a running member's functions.

3. The present invention provides a means to create a new application that inherits one or more applications, as described above (e.g., the Inherit metadata illustrated in FIG. 10 row 10 and FIG. 11-B, 1110). This feature greatly facilitates the software development.

4. Moreover, the virtual engine detailed with the present invention has intelligence at run-time to recover from missing information. For example, a class-member with a "Not-Null" metadata set to "ON" automatically prompts an end-user for the member value, as explained in section 1 above.

5. Moreover, an intelligent inference engine can match an overloaded function with the appropriate parameters, as explained in section 10 above.

6. Adding more intelligence, organizing and managing software on a computer system is possible by extending the object hierarchy to incorporate additional information about the application itself for classifying and describing its type (as defined in section 4) which is inherited by the objects used by the application and thus can be used to modify their behavior using parametric classes.

7. Moreover, the present invention details techniques to add more intelligence, and means to organize and manage the projects and documents created by the object-oriented applications on a computer system through the additional hierarchies of classes for the project and the document linked with the software applications, as detailed in FIG. 25-A and FIG. 25-B. Characteristics of projects and objects are linked to the application's objects and thus can be used to modify their behavior by passing parameters or using metadata variables.

8. The domain expert or modeler can classify the objects and the members of the classes into different categories by using the database-enabled capability to add metadata in an ad hoc fashion. This additional metadata can be used to facilitate the development of the software as follows: (a) Proper classification enables the built-in functions in the virtual engine to select and call the proper routines—with the proper parameters—as intended by the modeler, directly from the information in the tables, without writing source code; (b) The current invention has Genericity or parameterized type (similar to template classes in C++) capability which can be defined in the Software Catalog Table, the Application Table, the Class Tables and/or the Documents Tables; (c) The modeler can use metadata to classify the projects, the documents, the applications, the classes, and the class-members into different categories to enable using common functions and/or common objects for these categories, and which may be automatically selected at run-time according to their categories; (d) The modeler can use metadata to store information about the projects, the documents, the applications, the classes or the class-members. This information can directly be passed as parameters to member functions or a program's pre-built system functions.

9. As detailed above, defining an object according to the present invention is composed of creating a Class Table containing different members of the class, and writing the member functions in a source code file. The member functions, for a certain object, handle a set of operations that may be performed on the object. These operations are divided into two types:

a. "Managing" functions manage object activity such as constructor, destructor, initialization, assignment, memory management, menu system, help system, user interface, type conversion and unit conversion. The current invention automates these functions from the modeler's class metadata information.

b. "Implementation" functions provide the capability associated with the class abstraction and which are directly related to the role that this object (i.e., ObjRole 1306) plays in the application. Normally a domain expert or modeler knows exactly what the attributes and functions are for these classes within the field of his or her expertise. These functions mainly handle the relation between the attribute of the current object. These functions can be written with an extension programming language ancillary to the present invention. One embodiment of the present invention uses a programming language called "MINERtools," developed by Expert InfoCAD Corporation, of Amherst, N.H., with some extended functionalities, such as those detailed in section 6 above.

10. The object universal identifier defines the object instance, its class and application, as well as the document and project where it is located. Thus, this universal identifier can be used to hyperlink or to reference the object from another specified or remote location in the same or another document. Users can activate and edit or query this object from the specified location. Three types of links can be used: (a) a normal hyperlink, similar to that used in markup languages, i.e., the link is attached to another object or element; (b) a View-link, for objects that have proxy image, the image is displayed at the specified location, and the view can have different properties such as scale, rotation and color; and (c) a Copy-link where an insert entity referencing the object is inserted at the new location, and similar to the View-link the proxy image is displayed at the new location, but a new identical entity occurrence is inserted at the new location (the new entity occurrence can have its own scale, rotation and other properties). Similarly a whole document can be referenced or linked using its Document identified.

The present invention has techniques to automate and facilitate the usage of reusable classes and patterns by using database table capabilities to add, in an ad-hoc fashion, (a) metadata to classify the objects and the members of the classes and (b) metadata containing information specific for a project, document, application, object or class-member. Proper classification enables a program created by the present invention to select and call the proper routines, with the proper parameters, as intended by the modeler, directly from the information in the tables, without writing source code.

FIG. 24 depicts a flowchart of the means that can be used to simplify the process of the software development using additional metadata information. In one embodiment, extra metadata can be added to an object's three hierarchical levels used to declare an application and its classes, such as the following:

1. Application (level 1) 2410: Additional metadata stored in the Software Catalog Table 2401. In one embodiment, two types of metadata are used to simplify the object-oriented development as follows:
    a) Application Metadata to classify the applications 2404 in the Software Catalog Table into different categories as, for example, CAD, CAM, database (DB) systems, or Spreadsheet systems. The data to classify the applications 2404, as designed by the developer/modeler, may be used as follows:
       i) At the Application level 1 2410, its value is checked (step 2413) and is used, for example, to specify the type of Document root class to generitically inherit, or to specify the type of Menu Layout class to generitically use.
       ii) At the Class level 2 2411, its value is checked (step 2414) and is used, for example, to specify types of classes to generitically load and link with the current application.
       iii) At the Member level 3 2412, its value is checked (step 2415) and is used, for example, to specify the types of member data or function member to generitically use by the members of the current class.
    b) Application Metadata holding data information 2405 about this specific application as, for example, a help message about the application. This metadata information is also sent to the three levels to be used as parameters to the functions used at these three levels.
    Samples of the different functions that are controlled by the metadata at level 1 are shown by a menu layout 2416, a document layout 2417, and others 2418.
2. Object (level 2) 2411: Additional metadata stored in the Application Table 2402. In one embodiment, two types of metadata are used to simplify the object-oriented development, such as the following:
    a) Class-Head Metadata to classify the Classes 2406 in the Application Table into different categories as, for example, a locking mechanism, a recovery mechanism, a transaction mechanism, etc. The data to classify the classes 2406, as designed by the developer/modeler, are used as follows:
       i) At the Class level 2 2411, its value is checked (step 2414) and is used, for example, to specify types of classes to generitically load and link with the current application.
       ii) At the Member level 3 2412, its value is checked (step 2415) and is used, for example, to specify the types of data members or member functions to generitically use by the member of the current class.
    b) Class-Head Metadata holding data information 2407 about this specific class as, for example, a help message about the class. This metadata information is sent to level 2 and level 3 to be used as parameters to the functions used at these levels.
    Samples of the different functions that are controlled by the metadata at level 2 are shown by a transaction block 2419, a recovery block 2420, and others 2421.
3. Member (level 3) 2412: Additional metadata stored in the Class Table 2403. In one embodiment, two types of metadata are used to simplify the object-oriented development, such as the following:
    a) Class-Body Metadata to classify the Members 2408 in the Class Table into different categories as, for example, Authorization functions, recovery function, transaction function, etc. The data to classify the classes 2406, as designed by the developer or modeler, are used as follows:
       i) At the Member level 3 2412, its value is checked (step 2415) and is used, for example, to specify the types of data members or member functions to use by the member of the current class.
    b) Class-Body Metadata holding data information 2409 about this specific member as, for example, a prompt message to use in getting the user input value for this member, an icon to display in the menu box for this member, a help message about the member, etc. This metadata information as variables may be used as parameters to the member functions.
    Samples of the different functions that are controlled by the metadata at level 3 are shown by a user interface block 2422, a protection block 2423, and others 2424.

Figure 31:
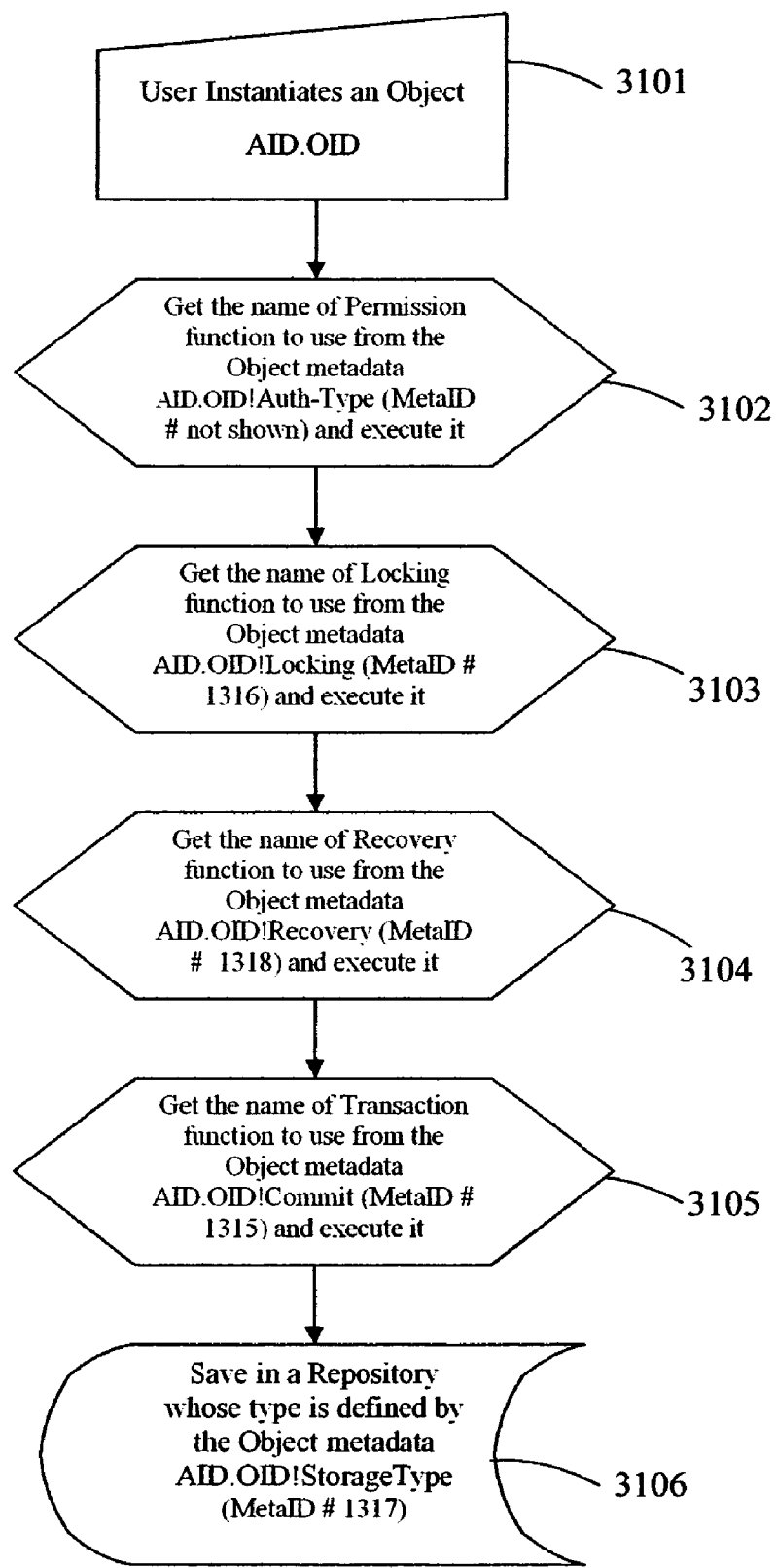
FIG. 31 depicts a flowchart of an embodiment of the steps performed when an object is instantiated.

An example demonstrating how the above techniques are used is illustrated in FIG. 31. FIG. 31 depicts an embodiment of a flowchart of the steps performed when an object is instantiated. The information in the class object metadata, as designed by the modeler, is used to automate selection of methods from different, pre-existing standard options available in a library. These methods are the common functions that are used by most of the traditional database management systems. The metadata name and ID used in this example are from FIG. 12 and FIG. 13-B. This is illustrated as follows: when an object is instantiated (step 3101), (a) it gets the name of the permission function (step 3102) to use as saved in the object metadata AID.OID!Auth-Level; (b) it gets the name of the locking function (step 3103) to use as saved in the object metadata AID.OID!Locking; (c) it gets the name of the recovery function (step 3104) to use as saved in the object metadata AID.OID!Recovery; (d) it gets the name of the transaction function (step 3105) to use as saved in the object metadata AID.OID!Transaction; and finally, (e)

it gets the type of the repository (step 3106) to use as saved in the object metadata AID.OID!StorageType.

Figure 28:
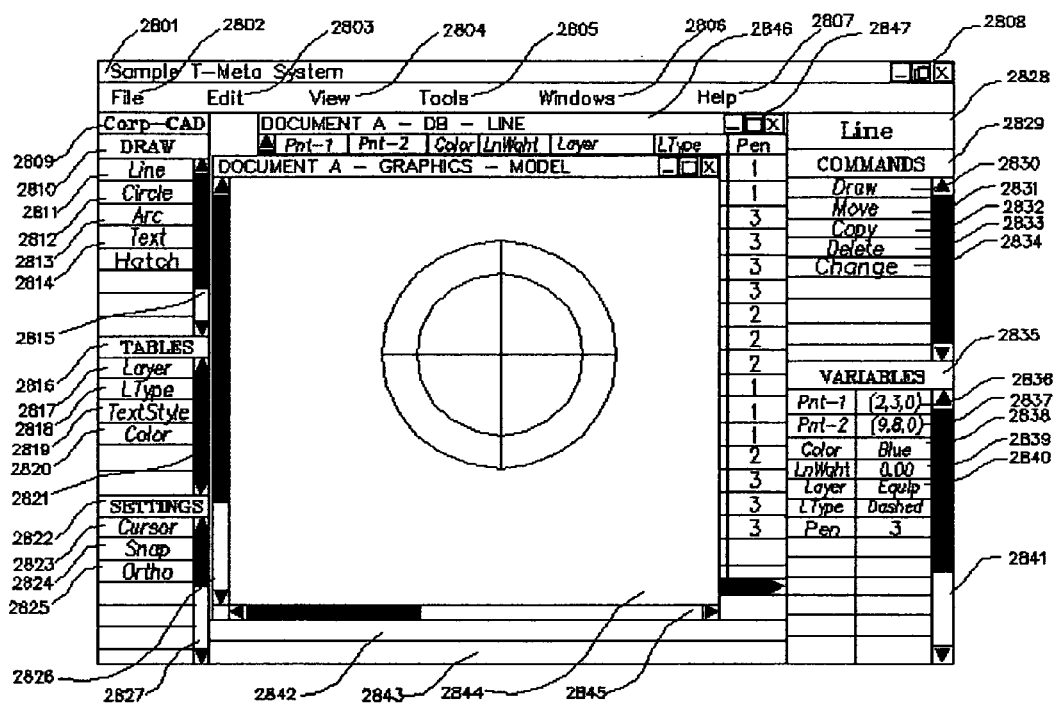
FIG. 28 depicts a diagrammatic representation of an embodiment of a dynamically-created menu system for a sample CAD application based on the metadata information stored in the Application Tables.

A second example demonstrating how the above techniques are used to create a dynamic menu system based on classification of the object by the modeler is shown in FIG. 28, which represents a sample menu created for a CAD system. The methods to create this menu are detailed as follows:

1. When an end-user runs the virtual program, a simple Menu is displayed containing minimum commands to allow the end-user to:
   a. Open a Document to be the container for an object that is instantiated;
   b. Create a layout if the instantiated object for the document is displayed; or
   c. Load an Application.
2. If the end-user wants to work on a CAD document, he or she opens a New Document, and a "Model-Space" Layout is created by default. If the end-user picks the command "Load Application," a dialog displays with the available applications' list found in the Software Catalog Table as shown in FIG. 11.
3. If the end-user selects the Application "Corp-CAD" from the dialog, a new menu is loaded whose type is automatically selected based on the type of the application loaded as defined by the modeler in metadata "ApplType"=CAD, as shown in FIG. 11-A. A sample of this menu and the list of commands are displayed in FIG. 29. The name of the selected application displays in the box 2809 in FIG. 28 as "Corp-CAD."
4. Any genericity, such as in the Corp-CAD Application, is resolved, for example, for the Color (OID=15) composite object.
5. The concrete objects' names (e.g., shown in ObjectName 1302 and Abstractness 1305 of FIG. 13-A) of the Corp-CAD Application are listed. This list is further divided into three sub-lists according to their object role ("ObjRole") 1306 (of FIG. 13-A) as follows:
   a. Referring to FIG. 28, the first sub-list with ObjRole=Product is displayed in a scrollable Menu having boxes 2810–2815, with Menu Title="Draw" from the metadata "RoleTitle" 1307 of FIG. 13-A.
   b. The second sub-list with ObjRole=Attribute is displayed in a second scrollable Menu having boxes 2816–2821, with Menu Title="Tables" from the metadata "RoleTitle" 1307 (of FIG. 13-A).
   c. The third sub-list with ObjRole=Tools is displayed in a scrollable Menu having boxes 2822–2825 with Menu Title="Settings" from the metadata "RoleTitle" 1307.
6. The end-user then selects an object from any of the three scrollable lists described above in 4(a), 4(b) or 4(c) to become the current object. Assume the end-user selected "Line" 2811 from FIG. 28. The Line Class becomes the current class and its name displays in the current class block 2828.
7. Referring to FIG. 28 (unless otherwise noted), the members of the Line Class, whose inheritance was resolved during the loading of the application (as shown in the Class Table in FIG. 17), and which have their visibility type VisibType=Public, are listed into two scrollable menus according to their member type MembType (also shown in FIG. 17), the first list containing the member name whose MembType=Function is displayed in the scrollable Menu 2829–2834 with a title COMMAND; and the second list with MembType=Atomic or MembType=Composite is displayed in the scrollable Menu 2835–2841 with a title VARIABLES. Composite members (complex attributes) have a value displayed equal to the foreign key, but stay normalized.
8. Clicking on a box in the VARIABLES Menu with an attribute having MembType=Atomic, the end-user is prompted with the attribute Prompt Message, "Prompt," (e.g., as shown in the Prompt menu 1717 of FIG. 17-B) in the Prompt Area 2843 and a descriptive message, "Message," (e.g., as shown in Message menu 1718 of FIG. 17-B) displays in the Message Area 2842.
9. In one embodiment, clicking on a box in the VARIABLES Menu with an attribute having MembType=Composite, will display a pop-up menu with the list of the primary keys from this Joined table "LinkFile" table name (e.g., LinkFile 1706 of FIG. 17-A). The end-user selects an existing Primary key from the JOIN table to be displayed as a new Foreign Key 2840.
10. Clicking on a function box in the COMMANDS menu can execute this function. The steps for executing a function can include: (a) if the bytecodes of the function are previously loaded in memory, the bytecodes are used; otherwise (b) if a saved bytecodes version of the function is saved on the hard disk and has a more recent date than the source code of the function, the saved bytecodes version is loaded and used; otherwise (c) the functions' source code are compiled and the bytecodes are loaded in memory and then executed. The bytecodes are also saved on the disk as bytecodes for future usage to increase performance.
11. Right clicking, for example, on any box of the class menus or the member menus can display a pop-up with the "Help" message saved as metadata (e.g., as shown in FIG. 11-A, FIG. 13-B, and FIG. 17-B).

13. Object Persistent Storage

The present invention is an OOPE that mainly operates on data. Data persistence beyond the lifetime of a single program execution, if required, may be saved in any format required by a modeler. In one embodiment, the members of a class that have a scope level equal to "instance" are stored. A user document is saved on the hard disk in a folder or in an archive file, both of which will have a document name. The instances created for each of the Concrete Objects that are listed in the Application Table are saved in their own file format as specified in "StorageType" (e.g., StorageType 1317 shown in FIG. 13-B).

The present invention has several techniques to facilitate the development of object persistence, such as the following:
1. The virtual program has a set of reusable applications for each type of the commonly known applications such as, for example, word processing, spreadsheets, computer-aided design (CAD) and databases. Each of these sample applications saves the created document into one or more traditional file formats. These samples can be easily enhanced using the application's inheritance capabilities to create customized applications.
2. The virtual program has a set of reusable classes that can access (e.g., insert, edit, query, save, etc.) the data in several database formats. These reusable classes are subdivided into, for instance:
   a) Classes that save the database in complex, binary proprietary database formats, using one of the following methods:
      i) Interface with Open Database Connectivity (ODBC) compliant databases to access relational databases.

ii) Running an embodiment of the present invention as a plug-in to other programs that supply the interface as an application programming interface and using the tools available with the other programs to store, retrieve, display and/or manage the data. Such capabilities are available in many programs, such as, for example, Fox-Pro developed by Microsoft Corporation of Redmond, Wash.; Oracle Software developed by Oracle Corporation of Redwood Shores, Calif.; and ObjectARX, an interface to AutoCAD, developed by AutoDesk, Inc. of San Rafael, Calif.

iii) To save the data in a CAD drawing proprietary file format, several products are available, such as a drawing file format using, for instance, a DWGdirect library developed by OpenDesign Alliance of Phoenix, Ariz.; an AutoCAD OEM library developed by AutoDesk, Inc. of San Rafael, Calif.; or an ARRISCAD file format using a library developed by Expert-InfoCAD of Amherst, N.H.

b) The format may also be a semi-structured format, such as, for example, rtf, HTML, XML, etc.

c) Moreover, the format may be a structured database format, such as, for example, *.csv or *.dbf (DBASE IV). It should be noted that any of a variety of formats may be used.

3. Techniques to store a document having a plurality of objects in a structured database tables' format. Storing the data in a database rather than in binary format provides many advantages, such as:

a) The easiest way to pass data from the current invention system to other programs such as, for example, *.csv and *.dbf (DBASE IV).

b) Database tables are considered an open system, are self-descriptive and provide clarity.

c) The current invention class definition tables can be integrated within the document folder to form a plug-and-play document. Moreover these tables can be viewed, edited, searched, queried and/or printed using any DBMS.

d) Possibility of reusability or sharing of the database table for objects that have ObjRole (e.g., ObjRole 1306 of FIG. 13-A) equal to either Attribute or Utils with other documents. Objects with ObjRole=Attribute or Utils may represent the business model or standards for a certain group of projects. Moving these data from the document directory to a standard directory, or to the program directory, simplifies and automates the creation of documents according to certain business models or policies as set by, for example, company management, thus greatly increasing quality and performance.

An embodiment of these techniques is summarized as follows:

a) The document is a directory (folder) or an archive file that contains the plurality of the tables that compose the document.

b) Concrete objects have their instances stored as tables in the document folder or in the archive file.

c) In one embodiment, only the members of an object that have scope level equal to "instance" are stored in their persistence storage.

d) Member that represent complex attributes are saved as the foreign key to this information as well as the name of the file that contain the information. The information can be:
i) Another database table.
ii) A multimedia file.

e) Each Entity (record or row) added to its document database table has its unique EID (entity ID) composed of:
i) The AID (the current Application ID) to be used if multi-applications on the same document are used,
ii) The OID (current Object ID) to be used if multi-applications on the same document are used,
iii) An entity unique ID (number) for its row number in the database document, and
iv) For entities that have proxy image, other IDs may be added, such as PID (project ID), DID (Document ID), and LID (Layout ID).

f) Each record added to the database document may also have its image composed of one or more display records added to a display list database. In one embodiment, the display records hold the same unique ID as the database entity.

4. The present invention has capabilities to package the application tables that have been used to create the document folder with the document folder itself. This package, as a folder or an archive file, can be used as a plug-and-play document that can be viewed and edited on any remote system having the virtual machine installed.

14. Proxy Entity

Some graphical entities, such as vector graphics (CAD) entities and raster (pixels) images, have an image that can be displayed on the screen or printed. An image proxy object may be used that has the same universal unique EID as the entity in the database, has its own methods to display itself when queried to do so, and act as a stand-in for the real image. The proxy entities are maintained in a separate database called the "display list." A record added to the database document may also have its image composed of one or more display records added to a display list database. These display records can hold the object universal unique EID. The virtual engine detailed in the present invention has a built-in display list management system that includes navigation tools on the document proxy image on the screen and entities-selection capabilities. The member functions in proxy objects should specify how the object displays using the system functions supplied with the graphic functions library.

The display list may be maintained in memory in binary format. The display list can be regenerated from the document database. And the display list for each document can also be dumped on the hard disk as binary files for each table, for increased performance during re-opening of the document database. Provision is provided to re-create any Concrete table display list if its Database-table file has a more recent creation/modification date than the saved display-list file.

Figure 26:
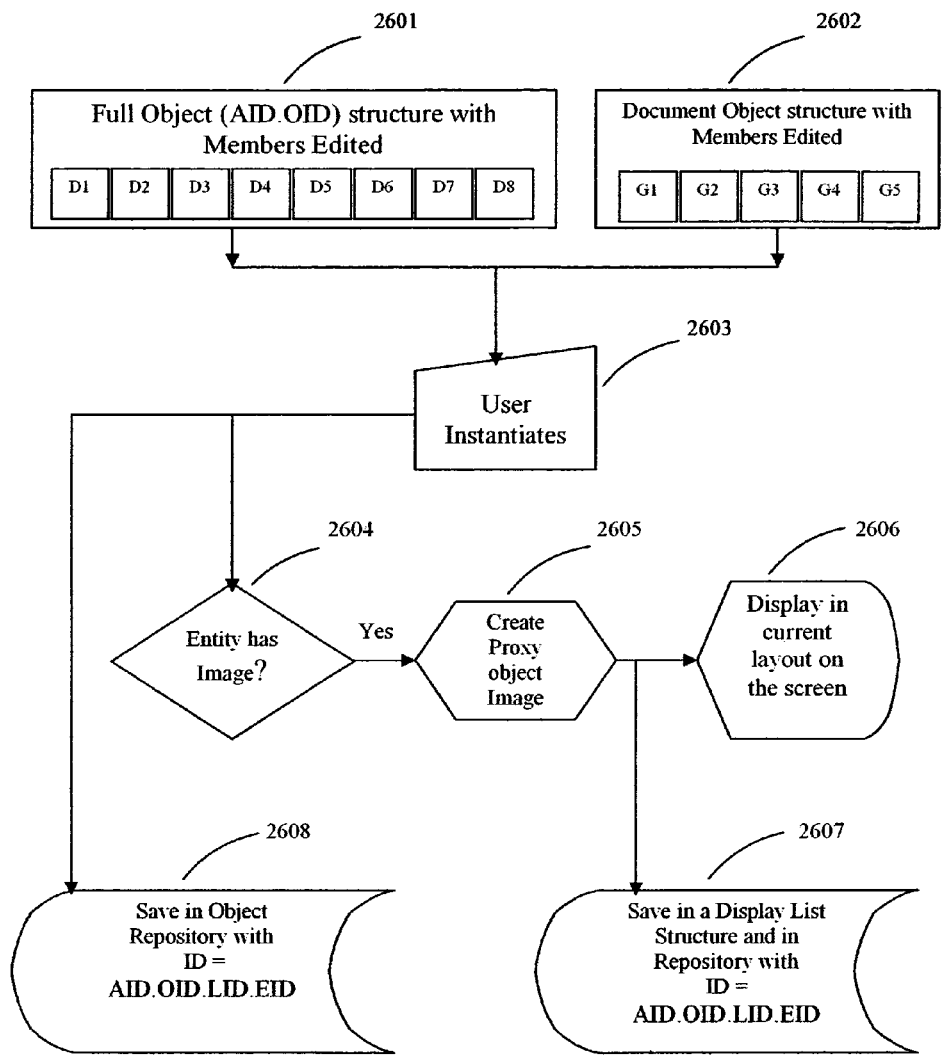
FIG. 26 depicts a flowchart of the steps performed when an end-user instantiates a graphics entity which is saved in the document that has a proxy object image defined by a document object.

FIG. 26 depicts a flowchart of the steps performed when an end-user instantiates (step 2603) a graphics entity 2604. The proxy object image is created (step 2605) and is displayed on the screen (step 2606) in the proper Layout, and also sent to the display list database structure (step 2607) to be saved with the same Object ID (step 2608).

15. Business & Industry Standards—Predefined Reusable Database Tables

Reusability is not only for the application and classes. The current invention extends reusability to information saved in the database tables. During designing an application, the developer or modeler can instantiate many of the objects that compose the application to place some constraint on the data that the end-user uses, in his or her design of the document, to force some business standard to be applied in order to increase performance, quality and productivity.

In one embodiment, the object classes defined in the Application Tables are sub-divided according to the object role (ObjRole 1306) that they perform in the application into four categories:
1. Object with Product role; these are Concrete Objects: These are the objects that compose a goal of an application created by the invention. The modeler can input initial data in the persistent database tables for these "Product Role" Objects to represent a certain default Prototype used to establish the environment for each new document the end-user creates.
2. Object with Attribute role; these are also Concrete Objects: These are the objects used by the "Product" or other "Attribute" object to define their complex attributes. The data in the tables for these objects represent a set of instantiated "Attribute Role" objects—for example, representing a certain office standard, or a project standard, for the user to select from on a primary key during the insertion or editing of a "Product" Objects (i.e., object with ObjRole equals Product). These tables can be automatically filled by capturing the information from an existing document such as, for example, from a drawing DWG file, to represent a certain style for drafting in a CAD application.
3. Object with Tools role; Concrete Objects: These are the objects used by the application as a whole for different settings, and editing or drafting aids such as: Cursor shape, Osnap, Ortho, Navigation, Entity Selection, Viewing the created document(s), Panning and Zooming in the displayed document and settings the Working plane, and other settings. The predefined data table represents several settings normally associated with the type of application used for the end-user to select from at run-time.
4. Object with None role; these are Abstract Objects: A goal of these objects is organizational for the other categories to use by inheritance. No data can be predefined for these abstract tables.

The above categories can be empty tables and filled or edited by the end-user at run-time if permission for such edit is granted as defined in the "Auth" metadata (e.g., "Auth" metadata 1313 in FIG. 13-B).

FIG. 27-A is an embodiment of a block diagram illustrating the role of the modeler and the end-user in creating the different tables for an application and a document created by the present invention. A document 2703 created can also be packaged with the Application Tables 2702 used to create the document and be considered a plug-and-play document 2701 that can be loaded and edited on a remote system having the virtual engine installed.

FIG. 27-B is an embodiment of a block diagram illustrating the role of the modeler that has been extended to create documents' database tables. These tables may be used as business standards as, e.g., objects having object role=Attribute and Tools (or Utilities). In some embodiments, the tables are part of the application package. The job of the end-user may be limited to creating the tables for objects having object-role=Product, thus increasing consistency, quality and productivity.

16. Project and Innovation Management

Figure 32:
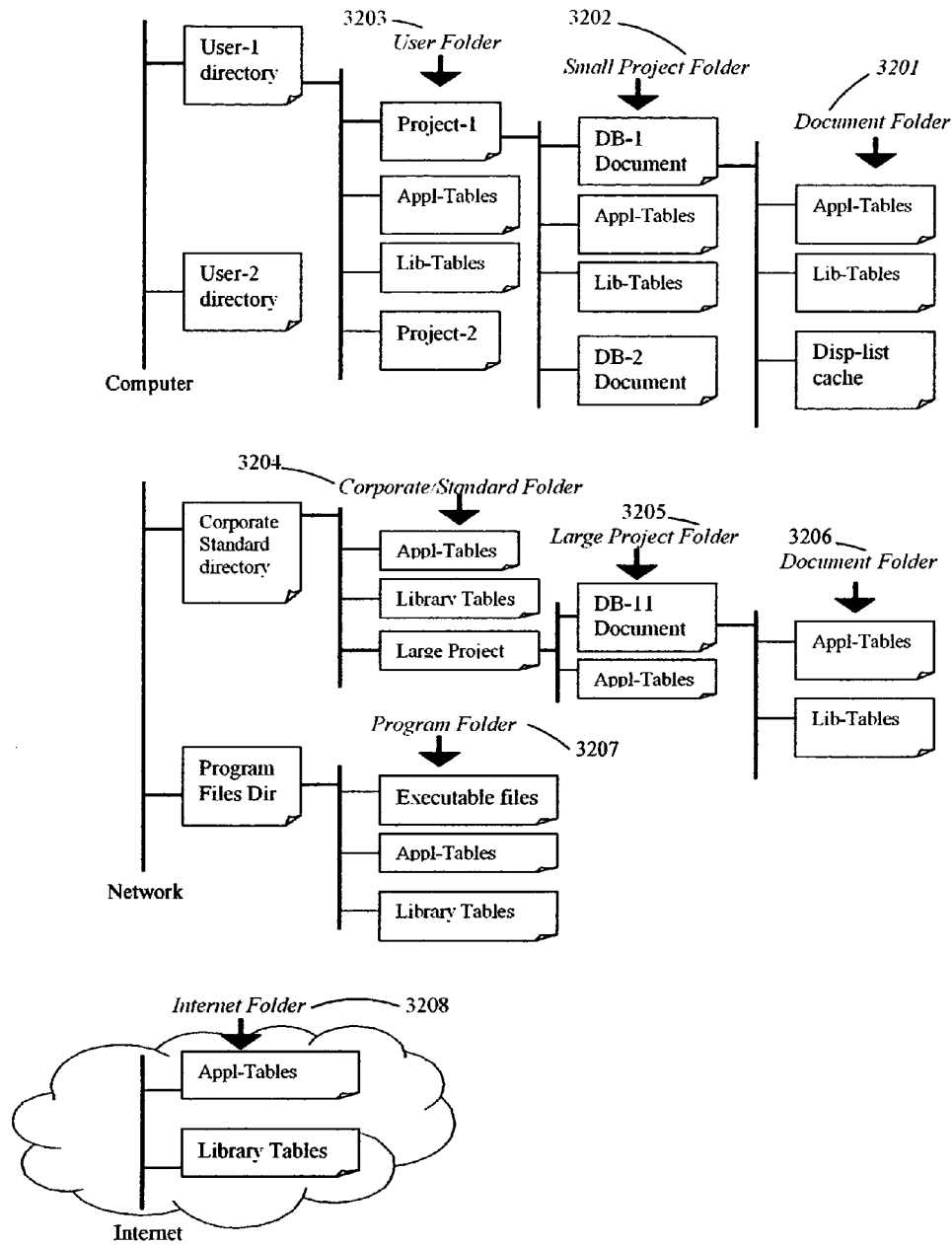
FIG. 32 depicts a diagrammatic representation of an embodiment of a fragment of a directory hierarchical structure that enables managing project documents and innovation on a certain computer system.

FIG. 32 depicts a sample diagrammatic representation of a fragment of a computer system directory's hierarchical structure for the present invention that enables managing projects, documents, as well as the Application Tables; and which allows adding innovation to the software on a certain computer system, without disturbing the current work in progress for a certain project. The directory's hierarchy can be divided into four categories:
1. Each end-user has his or her own directory called the "User Folder" 3203. The User Folder contains one or more projects, each project has a folder and this folder is the "Small Project Folder" 3202. Each small project has one or more folder for each document. This is the current "Document Folder" 3201.
2. Each business, office or group has a Standard Directory. This is called the "Corporate/Standard Folder" 3204 and is designed to be a directory in which corporate and office standard files, shared files and data common to all projects are stored. In a network environment, it is a directory on the network so that common office standard data may be found and used by everyone on the network. The standard directory also has a folder for each large project shared by several users called the "Large Project Folder" 3205 and this contains one or more document folders 3206.
3. The program files directory called the "Program Folder" 3207 is where the virtual machine program may be installed, contains files common to all users and contains also the reusable applications and classes provided with the virtual program. It also contains the main standard applications that are adopted by a firm.
4. An Internet directory called the "Internet Folder" 3208 is a directory or repository on the World Wide Web, accessible to users of the virtual engine. The repository is constantly managed and updated by the virtual program vendor. It contains reusable applications and reusable classes that have been tested and approved by the vendor and/or a selected a group of end-users and domain experts.

In one embodiment, the User Folder and Corporate/Standard Folder are defined to a running program by the two Environment Variables saved during installation of the virtual program in an .ini file or in a .cshrc or .login file for a specific end-user. At run-time, the currently-loaded document defines the Document Folder and the Project folder.

During loading an Application (from any directory), the program may look for one of the following:
 a. the ApplFile 1103,
 b. the ClassFile 1303,
 c. the LinkFile 1506, or
 d. the database file "DataFile" 1304
 in the following directories shown below, and in the given order, until the required file is found:
  i. The current Document Folder.
  ii. The current Project Folder.
  iii. The Corporate/Standard Folder.
  iv. The Program Folder.
  v. The Internet Folder.

The above order permits making a copy of a file from the Internet or the Program Folder and modifying its contents, including its new version, and putting it in the Document Folder to be used within the scope of the document. Putting it in the Project Folder can make it visible to all documents in that project. This feature encourages end-users to innovate with and within the software without disturbing the other current work in progress. Accepted innovation can move to lower levels in the above directories' order after being properly tested on different documents and projects.

The Project/Document objects supplied with an embodiment of the present invention contain objects that perform the following:
1. Save with each document the following database tables:
   a. the definition of the layouts used by the document; and
   b. the Applications used by the Document and their versions.
2. Get permission to create a new version for a file. Save the history and definitions in a file in the program directory. A version for a file can be "Temporary" or "Permanent." Temporary versions are saved on the Document Folder level with the capability to roll back a Temporary version. In some embodiments, other users cannot use temporary versions.
3. Perform an automatic upgrade of the document's databases. This automatic upgrade may be limited to:
   a. Adding a new column for each member of a class added; or
   b. Deleting a column for each member of a class deleted.

The virtual engine detailed with the present invention has several built-in routines to perform the following functions:
1. Organize the versioning for the classes and applications and keep track of the changes in a history file.
2. Organize the Unique ID for the Application and classes, such as, for example: Application and Classes on the Internet starts with 1000000; Application and Classes on the Program directory starts with 100000; Application and Classes on the Standard directory starts with 10000.
3. Move new versions from a low level folder to a higher level folder and keep track of that move in the versions' history file in the program directory to be used for an automatic upgrade of the files with older versions upon loading a document.
4. If a version of a file changed, the program prompts the end-user with three options:
   a. Automatic update of the data of an object if the "update function" with the object class exists;
   b. Some updates can be automatically handled such as adding or deleting a column in the database file; or
   c. Load the older version using programs like the UNIX SCCS or MicroSoft Source Safe program and save this older version within the document folder.

17. Apparatus (Virtual Engine) to Directly Deploy an Application

A virtual program (also called a "virtual engine" or "virtual machine") is used to deploy an application created from the present invention and saved on the computer system. This virtual program is a software product designed to enable the development and deployment of an object-oriented application created by the present invention. This virtual program does not contain any knowledge or information; rather, it is like the shell of an executable object-oriented program. The program can interpret a tabular object-oriented program created by the present invention. One advantage of shells is that the user does not have to write the program himself. Therefore, the shell is reusable over many different topics.

Running this virtual program displays a minimized menu with, for example, the commands "Open a Document," "Load an Application" and "Help."

Opening an existing document can bring a menu associated with the type of application which has been used on with this document, and display the document on the screen.

Figure 29:
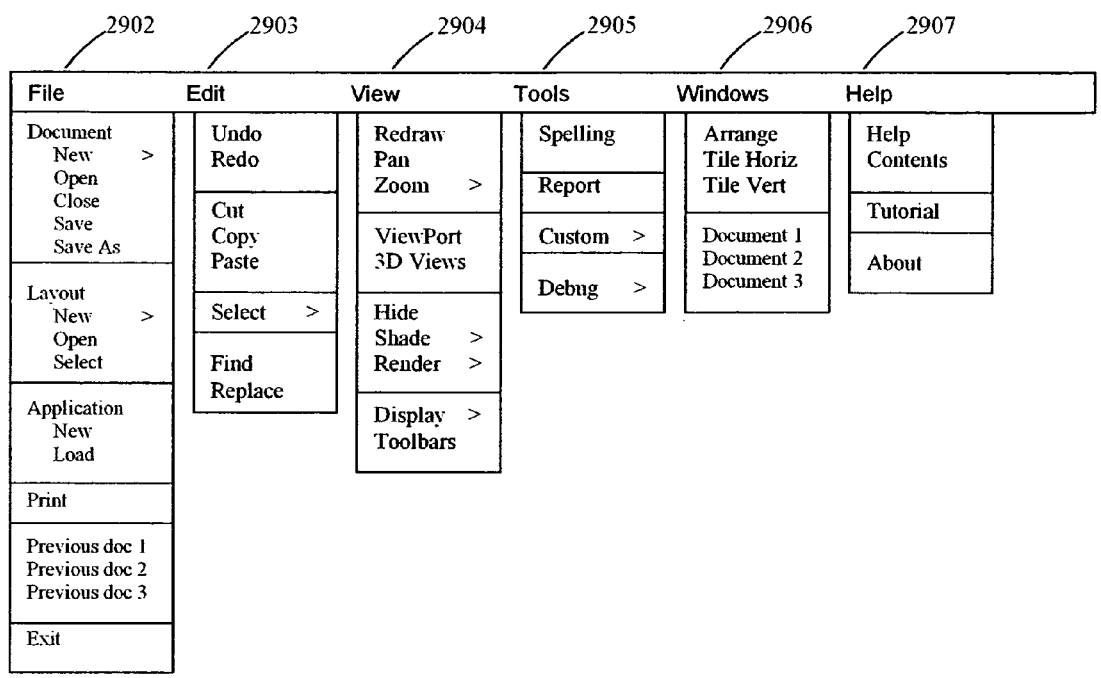
FIG. 29 is a diagrammatic representation of an embodiment of the menu commands' pull-down menu of FIG. 28 containing the common commands to most applications of a certain type.

In one embodiment, if a user chooses "Load an Application," a pop-up with the list of data applications available on the computer system is displayed. Selecting an application to load brings a special menu associated with the type of application loaded and opens an empty document whose type is also associated with the type of application loaded. The special menu displays a set of pull-down menus on the screen, each containing a set of built-in commands common for applications of that type. A sample of the special menu for one embodiment of the present invention that represents a CAD application is shown in FIG. 28. The Main-Frame 2802–2807 with its pull-down menus and sub-commands is shown in FIG. 29, and is composed of: File 2902, Edit 2903, View 2904, Tools 2905, Windows 2906 and Help 2907.

The virtual program also contains the following engines designed to deploy a selected application and load the document:
1. An engine to read the classes' names in the Application Table. Three different lists are created according to the ObjRole of the classes: "Product" objects list, "Attribute" objects list and the "Tools" objects list.
2. An engine to read the class schema (class-body) of each concrete object listed in the Application Table and to create, in memory, an object-oriented structure for each object.
3. An indexing engine to read and index the Database Table—from the document directory—for each object listed in the Application Table. The index for each file is also saved on the computer hard disk for future use to increase performance. If the Database Table has been modified, the corresponding index is updated and saved on the disk.
4. An application interface macro-programming language engine, which has a run-time compiler to compile the source code of the objects' member functions from their files. The compiled functions, which are platform independent bytecodes, are saved in memory. A copy of the compiled functions is also saved on the computer hard disk for future use to increase performance. If the source code is modified, the files are recompiled and resaved on the disk. A pre-built library of system functions exists within the virtual program. These system functions can be called from the members' functions to perform several low-level computer related tasks. This library is similar to the standard C-Library function. The virtual engine also has an interpreter to execute the bytecodes' functions at run-time.
5. An engine to create, at run-time, a dynamic menu system for a currently-loaded application. This dynamic menu displays the three objects' names list ("Product," "Attribute," and "Tools") in three scrollable menus as shown in FIG. 28. The name of the currently-loaded application displays in box 2809.
   a. The Product Object list displays in the scrollable list menu in boxes 2810–2814. The RoleTitle associated with Product displays in box 2810.
   b. The Attribute Object list displays in the scrollable list menu in boxes 2817–2820. The RoleTitle associated with Attribute Objects displays in box 2816.
   c. The Tools Object list displays in the scrollable list menu in boxes 2822–2825. The RoleTitle associated with Tools displays in box 2822.

From any of these menus, an end-user selects an object to be current. By default, the first Concrete object displays as the current object 2828. The attributes of the current object are divided into two lists: (a) Attributes (Atomic or Complex) list and (b) Methods list. The methods list is displayed in a scrollable menu 2830–2834. This scrollable menu has a title "COMMANDS." The Atomic and Complex attributes list is displayed on the screen in another scrollable menu 2836–2840, and, near each attribute, its current value is also displayed. This scrollable menu has a title "VARIABLES."

The area in the middle of the screen contains (a) a scrollable database table 2846 containing the current object database table and (b) several scrollable screens 2844 for each Layout of the current document. Each screen area displays the proxy objects of the document associated with a certain Layout.

The area at the bottom of the screen contains (a) a message area 2842 to display a message to the end-user associated with the current prompt and (b) a prompt area 2843 to prompt the end-user with the prompt message to get an input.

6. The virtual engine may also have a memory storage area—depending on the method the modeler has selected to commit the instances created—to store each of the instantiated objects that compose documents created by applications as a data structure for each of the Concrete Objects for each application used. These instantiated objects are called the "Document Database." In one embodiment, these instantiated objects in memory are not saved to the hard disk, except if the end-user issues the command "Save" or "Commit." The capability for Undo and Redo of entities in the stored memory inserted or modified is provided.

7. The virtual engine also has a display-lists engine for each of the Concrete Objects. The system Library contains the function to display primitive entities such as Line, Arc, Filled Polygon or Text on the screen. The objects' member functions control how each inserted entity is displayed on the screen, or is printed or plotted. A separate memory storage area to store the display list is provided. The display list may be re-created at any time from the Document Database.

18. Operational Processes

The following are sample operational processes and methods utilized in an embodiment of the invention.

Loading an Application

In one embodiment, when an end-user loads an application, the list of the different non-abstract objects available (as listed in the Application Table) display on the menus. A new database can be opened with the application. The end-user can select an object from the menu or from the Screen Area to become the current object. The class inheritance is then resolved, which means that the object properties and inherited properties form an object-oriented structure in memory. The member function displays in the COMMANDS scrollable menu 2829, and the data members display with their value in the VARIABLES scrollable menu 2835. Complex objects may have a value equal to the foreign key, but stay normalized. By selecting an atomic attribute box, the end-user is prompted in the prompt area 2843 with the attribute Prompt Message saved as metadata 1517 in the Class Table (FIG. 15-B) of the current object, and the metadata message 1518 displays in display area 2842. The end-user can enter a new value that is displayed in the Attribute Box 2836–2840. By selecting a complex attribute in the Attribute Box 2838 (Join table) a pop-up menu displays with the list of the primary keys from this Joined table. The end-user may select a new key and its value displays in the Attribute Box 2838. Selecting a function from the COMMANDS Menu 2829 executes this function. The steps for executing a function include: (a) if the bytecodes of the function is previously loaded in memory, it is used; otherwise, (b) if a saved bytecodes version of the function is saved on the hard disk and has a more recent date than the source code of the function, it is loaded and used; otherwise, (c) the function's source code is compiled and the bytecodes is loaded in memory, executed and also saved on the disk as bytecodes. If the function, for example, was Draw 2830, it is executed. The results of executing the Draw command FIG. 26 are two records: (i) a record formatted as the current object schema (class members' table) with inheritance resolved. This goes to the database document in memory 2607 for this object and, optionally, is also saved to the database document on the disk if the application is so designed. A universal unique EID (Entity ID) is created for this record composed of the AID and OID (current Application-ID and current Object-ID) and a unique number for this record in the database document is added to it. (ii) One or more records holding the same entity universal unique identifier are created by the proxy object 2606 and are added to the display list database 2608 in memory to represent the proxy image of this object; and, optionally, are also saved to the hard disk. The newly-created proxy objects are also displayed on the screen area 2606.

Opening a Database Document

Opening an existing database document loads in memory each of the concrete object database files from the hard disk and, if the display list files have a date more recent than the database file, the display list files are also loaded in memory. Otherwise, the display list is re-created from the database files and is displayed on the screen area.

Inserting an Instance of the Current Entity in the Database

First, the end-user edits the attributes in the Variables area 2835 by choosing an attribute (e.g., attribute 2836) to enter its new value, and cursor input is allowed. When attributes are edited, the end-user then selects the method to use for insertion from the Commands area 2829. The method for the specific object is then executed. The processes performed are illustrated in FIG. 21.

Selecting a Single Entity from the Screen

In one embodiment, selecting an entity with the cursor from the screen selects the entity with the same coordinates from the display list in memory. The selected entity EID is retrieved from the display list and the entities in the display list holding the same EID are highlighted on the screen. The entity in the database holding the same EID is simultaneously selected and its attribute information and methods display on the COMMANDS and VARIABLES menus (e.g., shown in FIG. 28).

Modifying/Deleting a Selected Entity in the Database

In one embodiment, an end-user selects, one at a time, the variable to edit from the Variables-Menu 2835, and the end-user is then prompted to enter new value(s). The end-user then selects the required commands from the Commands Menu 2829. The record in the database and the display list is modified to reflect these changes on the selected entity, keeping the same EID. The processes performed are illustrated in FIG. 22.

Selecting a Group of Entities in the Database by Area Selection

The OID of each entity selected is retrieved. The selected OID is saved in memory as a list representing the current selection set.

Modifying/Deleting a Group of Selected Entities in the Database

An end-user may change the variables' values and then select a command from the command area. The selected command is executed repeatedly against each OID in the current selection set.

Cut, Copy and Paste to the Clipboard

The list of entities' EIDs selected is saved in the Clipboard (a temporary repository for data); and the proper selected function is executed repeatedly against each OID saved in the list.

19. Other Embodiments of the Present Invention

1. As a Plug-In to Other Computer Software that has an Application Programming Language Interface Another embodiment of the present invention is its use as a plug-in to other software applications that have an application interface programming language interface. This can allow using the hosting software interface programming language, with its provided system library, in writing the object members' functions. Moreover, no display list engine is needed as the hosting software can perform the task. The present invention can add capabilities to create and add complex entities to the hosting software. For example, in the CAD industry, the invention can translate the user sketches directly to complete 2D construction documents customized to the end-user's office standards; or translate sketches to 3D design.

2. As an Advanced Object-Oriented Modeling, Design and Testing Tool

Another embodiment of the present invention is the use of the present invention's method and apparatus as an object-oriented modeling, design and testing tool. For example, a Pilot Project for complex application domains, such as Mechanical Engineering, Very Large Scale Integration (VLSI) Design, Architecture and Computer Integrated Manufacturing Applications can use the present invention to thoroughly design and test a new object-oriented program before its final development.

3. Using the Invention Over the Internet and Cross Platform as a Virtual Machine Another embodiment of the present invention is to build a version of the Virtual Machine apparatus as a cross-platform independent virtual machine with extra capability to browse the Internet and load applications from remote websites. An object-oriented application that uses the invention, as described, can be composed of a set of RDB tables and methods, both of which can be ASCII files and can be sent over the Internet and other networks to be executed on an end-user's computer. The Application is loaded directly to the end user's virtual machine for testing and/or pay-per-use purposes. Large corporations with several office locations may use this embodiment for better control of the applications' versioning and maintenance.

Another embodiment is to send over the Internet the compiled methods instead of their source code for better performance. The methods, when compiled, consist of byte-codes, which are also architecture and operating system independent, and can be sent over the Internet and other networks. The RDB tables and the bytecodes are actually executed on a particular platform by means of a virtual machine which allows the object-oriented application to run on any platform, regardless of how or where the application program was developed on; and regardless of the particular platform which attempts to run the program.

20. Hardware Architecture of a Computer System

Figure 30:
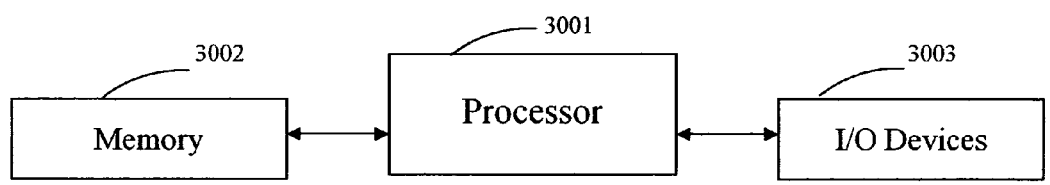
FIG. 30 is a block diagram illustrating a generalized hardware architecture of a computer system suitable for implementing various aspects of the present invention.

Referring now to FIG. 30, an embodiment of a block diagram is shown illustrating a generalized hardware architecture of a computer system suitable for implementing the current invention as described in detail herein. The computer systems may also be coupled via a network such as, for example, Internet, Intranet, etc., to connect the computer to other computers, such as a client computer (not shown in FIG. 30), or for emerging "grid" or "utility" computing. The exemplary computer system of FIG. 30 is for descriptive purposes only, and may comprise the following:

1. A processor 3001 as used herein is intended to include any processing device such as, for example, one that includes a central processing unit (CPU) and/or other processing circuitry. The processor may also include a digital signal processor, as is well known in the art. It is also to be understood that the term "processor" may refer to more than one processing device and that various elements associated with a processing device may be shared by other processing devices.

2. A memory 3002 as used herein is intended to include memory associated with a processor or CPU such as, for example, RAM, ROM, a fixed memory device (e.g., hard drive), a removable memory device (e.g., CD or diskette), flash memory, etc.

3. "Input/output devices" or "I/O devices" 3003 as used herein is intended to include, for example, one or more input devices (e.g., keyboard, mouse, etc.) for entering data to the processing unit, and/or one or more output devices (e.g., CRT display, printer, etc.) for presenting results associated with the processing unit.

Accordingly, software components including instructions or code for performing the methodologies of the present invention, as described herein, may be stored (e.g., as an article of manufacture) in one or more of the associated memory devices (e.g., ROM, fixed or removable memory) and, when ready to be utilized, loaded in part or in whole (e.g., into RAM) and executed by a CPU.

21. Advantages of the Present Invention

The previously described versions of the present invention have many advantages, including those summarized below. The present invention does not require that all the advantageous features and all the advantages need to be incorporated into every embodiment of the invention.

Simplifying and Improving Software Development

The present invention enables software development tasks to be accomplished by authoring (i.e., filling in) and/or editing a set of database tables, as opposed to the traditional, cumbersome source code writing and compilation. The database tables combine and link the data in an organized manner that is more easily understood, and visible as a whole, to a programmer, domain expert or modeler. Moreover, these tables are accompanied by forms (i.e., metatables) which serve to guide a user's input with descriptions; and they can also be used for syntax checking, limiting the input to a set of legal values and including help messages about each entry. It is thus easier to control the design of a software program, especially a large one, written in tables than if written in the prior art, text format as a collection of classes. Also, tables facilitate working as a team on a software project. It is well known that tables can be modified in an ad hoc fashion without loosing the integrity of the design or the program data.

Thus, the techniques used in DBMSs that handle the management of databases, are incorporated in the present invention to simplify and improve the software development process. For example, a programmer using the present invention can add, view and update table data using online forms (i.e., metatables); find and retrieve just the data needed by using queries, and the data can be retrieved from several tables based on relationships; and analyze or print data in a specific layout. All this will result in more control, better quality and faster development for a software project.

While simplification and seamless management of software development are goals of the present invention, it would be for naught if the quality of resulting applications is at all compromised. In fact, the tables in the present invention serve to improve the quality and capability of software. Examples of such improvement include: creating inheritance between applications; using more than one application to edit or create entities (input) into a document; and allowing for modularity, where each application performs a single defined task on a certain document (e.g., in one document, a CAD application only does graphics entities, Text inserted in a drawing is done using a Word-Processor, and Tables are inserted in a drawing using a Spreadsheet). Some of these improvements are discussed below.

Further, the present invention can serve as a tool for domain experts, who have little or no traditional programming experience, to create or modify software simply by working with a database system. Indeed, it is the domain expert, and not the programmer, who is best suited to represent knowledge and address software needs within a particular expertise. Now, the domain expert is given that power by working with tables, which have descriptive text and help messages about each piece of information required.

In short, using a system of database tables for a complete programming environment has significant benefits as tables are, at once, clean, self-descriptive and dynamically powerful.

Dynamic Creation and Updates

By using an embodiment of the present invention, software applications can be developed, deployed and modified much faster than traditional applications. The techniques involved in traditional software development, including authoring source code, compiling, linking and debugging are often time consuming. The present invention, with its DBMS approach, is dynamic and can modify applications simply by changing a value in a table (e.g., the Class Table in FIG. 15) that is part of the database which composes a program. Thus, software created using the present invention can be created or edited "in real-time" to represent dynamic data, or to incorporate new ideas, findings, and desired functionalities as they arise.

Modularity Usage and Performance

Embodiments of the present invention allow for applications to be created and deployed in a piecemeal fashion, instead of a "bulky" end-product approach typically used by software makers. Modules created using the present invention can be selected, commingled and run by an end-user at that user's discretion. This advantage can be viewed, generally, as twofold.

First, multidiscipline know-how, represented in the tables, can be brought together in an application to truly address an end-user's (or project's) unique and changing software needs. Typically, traditional applications are created for a very particular market-need and, thus, generally address only issues common to that market. Ancillary software needs require additional investment (often from a different software vendor) from the end-user, with a cautious eye towards "compatibility" issues between applications. The present invention is suited to easily append "outside" additions to an application (or have multi-applications running in one document as mentioned below) to form a heterogeneous computing environment. A "software application" under the present invention thus describes something dynamic, focus being more on the utility aspects of a program, rather than seeing a program as a semi-static commodity.

Second, end-users may be given freedom to choose exactly what functionalities they want (and are willing to pay for) in a program, unlike the typical scenario where the user will use only a fraction of an application's capabilities, despite paying the "full" price.

Reusability

Further, another advantage of the present invention is the automation of reusability. With additional metadata to classify objects and class members, the application modeler can select a standard method from available lists to use, and the program which is being created will, behind the scene, automatically use the proper routine based on the classifying metadata at run-time. Additionally, the present invention enables an application to have its own characteristics saved as metadata in the Software Catalog Table (e.g., FIG. 11), and these characteristics can be sent to the classes and their members to overwrite or assign a new object and member classification. The result is that the same object-class called from different applications will behave differently, according to the calling application's characteristics.

Application Inheritance

Another advantage of the present invention is that applications can inherit one another. For example, large applications can be created by selecting a plurality of smaller applications and embedding them together. This can viewed as another aspect of modularity.

Platform Independency

Applications created by the present invention are platform independent and can run on any operating system (OS). Systems of prior art are particularly suited to have software written and run on a particular platform and OS. The present invention overcomes these limitations. Here, the object-oriented source code are written in tables, which are platform independent, similar to a text file; and the methods' source code are written in a text format. Both are acceptable inputs into any platform or OS, and thus can directly be the input to the present invention's virtual engine (which is platform dependent) to create a running application. Thus, software created by the present invention can be developed, deployed and maintained on any platform or OS (e.g., Windows, Linux, Sun Solaris).

The present invention is also suitable for running over the World Wide Web. Programs can be created and sent over the Internet (because they can be read and understood by the virtual engine) to be downloaded and run on a user's computer. Programs can also be stored over a network or the Internet, instead of on a user's machine. Further, a program on the Internet can be continuously updated from a central location to reflect the latest changes made to the program.

Interoperability

Another advantage is that the software applications creating using the present invention are interoperable, allowing for an exchange of information between multiple heterogeneous applications due to their open, commonly-understood, homogenous table code database. That is, because the component objects can be designed by an expert in a field, or any one using industry-standard or agreed-upon meanings and concepts, the components can be made interoperable for most people working in that field or industry.

Multi-Application Document

Another advantage is that the present invention can bestow multi-application documents. Each single entity (i.e., instance of an object) stored in a document, stores with it the object universal ID that created that entity. Thus, that entity's original object structure can be restored back during editing of the entity, including the data and methods that describe the behavior of that object. The end-result is that one can have a document containing several simultaneously-running applications. Furthermore, as mentioned above, applications can be smaller with more granularity. Thus, for example, a CAD system can have its text writing capability accomplished by a word processor application, both of which can exist concurrently in the same document.

Availability of New Features

Moreover, by using a universal entity ID that is saved with each instantiated entity, it is possible herewith to have new features not known in traditional software applications. For example, using "Cut and Paste" between different documents, say, Document-A and Document-B, it is now possible to keep, with each copied entity, that entity's original characteristics and original application using the present invention. Thus, the copied entity can now be edited using its original application. Moreover, if the copied entity is saved in Document-B as a linked entity, one will be able to edit the entities in Document-A directly from Document-B, or vice-versa. A more detailed illustration is as follows: If we Cut one or more cell(s) from a spreadsheet document and paste it into a word-processor document as a reference, the pasted cell(s) will keep a universal ID to its source document and source application. We can then edit the value in the pasted cell(s) in the word-processor document using the cell's original spreadsheet application; or vice-versa. Finally, as another example, in a CAD drawing, if we cut an area and paste it into another drawing as linked entities, any edit to an entity in the pasted area (in either drawing) can show up in the other drawing; and any other new entities which, when inserted were linked to a location to the entities pasted, will change their location if the pasted entity moves in either drawing. This can greatly enhance security and privacy as, for example, changes in the base document can be made by small changes in other documents without revealing the base document.

Security and Safety

Traditional systems are made with pointers' usage. These are generally insecure because you do not know what is "behind them." The present invention is in an open system that can be easily checked manually by end-users, or at run-time, during loading the tables in computer memory by a simple code security object that runs before compiling the member functions. This can reduce a modeler's liability because he can specify the set of operations his code is allowed to perform as well as restricted operations of his code. Code access security can also help minimize the damage that can result from security vulnerabilities in the code.

Moreover, security and accessibility of the data for the present invention is now a design issue (through the database tables) and not a development issue (through writing traditional source code). Thus, security can be well managed throughout the lifecycle of a project. Special techniques can also be easily applied to many parts of a program created using the present invention such as implementing industry guidelines, office standards, and/or business rules.

Data Mining

The present invention is ideal for data mining as additional metadata can be added to the tables to classify the data, thereby enabling important information to be mined, or even captured directly—at the source end, when the data is created—and appended to the data repositories for faster, less expensive and more accurate results.

Open Innovation and Diffusion of Functional Knowledge

Finally, another advantage of the present invention is that the design and development (and, at the user's option, the delivery) is made in an open, self-descriptive environment which creates a hotbed for innovation. Unlike traditional OOPLs, the table-oriented environment here is concise and self-descriptive (e.g., FIG. 3) and thus, for example, can minimize potential for programming error while work on a program is done in a collaborative fashion. This is because the tables provide a general view of the complete scope of work and any input can be guided by a form (i.e., metatable) with description, help and checks on input. Further, the deliverables of the present invention are, ideally, the database tables themselves. The tables belonging to the selected application are loaded in memory at run-time to form a running application, in stark contrast to the traditional method of sending (closed) binaries. This optional elimination of the deliverable binaries allows subsequent users to read and comprehend the table code, add to it, share and innovate freely.

Additional, the present invention, by helping to put software development in the hands of domain experts, may assist in the functional diffusion of the sciences and useful arts. Generally, software firms have solely a profit incentive to create software products. If a market is not lucrative enough, then would-be applications may never see the light of day, no matter how beneficial they may be to a particular domain or branch of science. Domain experts, however, may have other incentives to create applications using the present invention, such as the diffusion of knowledge across many disciplines, problem solving for a specific field, or research. Thus, by giving domain experts a tool for software development, the present invention may help diffuse knowledge and solve problems by giving birth to applications that, though not necessarily "market winners," are beneficial across a variety of disciplines.

Although illustrative embodiments of the present invention have been described herein with reference to the accompanying drawings, it is to be understood that the invention is not limited to those precise embodiments, and that various other changes and modifications may be affected therein without departing from the scope or spirit of the invention.

Although the present invention has been described with reference to specific details, it is not intended that such details should be regarded as limitations upon the scope of the invention, except as and to the extent that they are included in the accompanying claims.

What is claimed is:

1. A method for enhancing an object-oriented programming language, the method comprising:
   a) declaring a plurality of classes in databases comprising metadata describing characteristics defining a structure of each class, each class in the plurality comprising:
      i) a class-body comprising a plurality of class-body members, each member comprising a plurality of class-body member metadata in the plurality of metadata, the class-body metadata describing characteristics defining the class-body members, and wherein the plurality of class-body members metadata for a class are stored together, and ii) a class-head comprising a plurality of class-head metadata in the plurality of metadata, the class-head metadata describing characteristics defining the class-head; and b) extending the metadata associated with the class-head and class-body by adding additional metadata to the databases;

c) storing the class-body into a plurality of rows and a plurality of columns in at least one database in said databases, each row representing a class-body member definition and each column representing metadata defining a single characteristic of the class-body member;

d) declaring a plurality of metadata describing characteristics defining an application, each application in a plurality of applications comprising:
   i) an application-body comprising a plurality of class-heads for classes composing the application, wherein the plurality of class-heads of the classes that compose the application are stored together, and wherein each of the class-heads has metadata pointing to its class-body storage,
   ii) an application-head comprising a plurality of application-head metadata in the plurality of metadata, the application-head metadata describing characteristics defining the application; and e) declaring a plurality of metadata describing characteristics defining a domain wherein a plurality of software applications related to a domain are organized in a domain software catalog comprising a plurality of metadata describing characteristics defining a domain in a plurality of domains, each domain in the plurality comprising:
   i) a domain software catalog-body comprising a plurality of application-heads that make up the domain software catalog, and wherein the plurality of application-head metadata that make up the domain software catalog are stored together, and wherein each application-head has metadata pointing to said application body storage, and
   ii) a domain software catalog-head comprising a plurality of domain software catalog-head metadata in the plurality of metadata. the domain-head metadata describing characteristics defining the domain, and
   iii) storing the plurality of metadata for the plurality of domain software catalog-heads and wherein each domain-head has metadata pointing to its domain software catalog-body storage.

2. The method of claim 1 wherein the database storing the class-body members metadata comprises a metatable.

3. The method of claim 1 wherein the plurality of class-body member metadata comprises object-oriented definition data for a class-body member.

4. The method of claim 1 wherein the plurality of class-body member metadata further comprises relational database definition data for an attribute type.

5. The method of claim 1 wherein the plurality of class-body member metadata comprises definition data for classifying the class-body members into different categories.

6. The method of claim 1 wherein the plurality of class-body member metadata comprises definition data to store specific programming information about the class-body members.

7. The method of claim 1 further comprising organizing the plurality of metadata describing the class-head metadata in a plurality of rows and plurality of columns, each row representing a class-head definition and each column representing metadata defining a single characteristic of the class-head.

8. The method of claim 1 wherein the database storing the class-head metadata further comprises a metatable.

9. The method of claim 1 wherein the plurality of class-head metadata comprises object-oriented definition data for a class-head.

10. The method of claim 1 wherein the plurality of class-head metadata comprises definition data to store specific programming information about the class-heads.

11. The method of claim 1 further comprising using metadata to classify the plurality of classes into different categories.

12. The method of claim 1 further comprising declaring a plurality of metadata defining the characteristics for the software application in a database table.

13. The method of claim 1 wherein the plurality of metadata describing the software application is organized in a plurality of rows and a plurality of columns, each row representing a software application definition and each column representing metadata defining a single characteristic of the software application.

14. The method of claim 1 wherein the database table further comprises a metatable.

15. The method of claim 1 wherein the plurality of metadata definition further comprises a unique identifier for the software application.

16. The method of claim 1 further comprising storing programming information about the software application in definition data of the plurality of metadata definition.

17. The method of claim 1 further comprising using definition data of the plurality of metadata to classify the software application into a category in a plurality of categories.

18. The method of claim 1 further comprising deploying a software application from the plurality of classes and the metadata associated with the plurality of classes.

19. The method of claim 18 further comprising using the software application metadata, the class-head metadata, and the class-body members' metadata to dynamically create a user interface for prompting an end-user for input during running of the deployed application.

20. The method of claim 1 further comprising initializing instances of a plurality of data structures from the class-body member metadata.

21. The method of claim 1 further comprising using a document manager application to create a document to be used as a container for instances created by applications used by the document.

22. The method of claim 1 further comprising using the software application metadata, the class-head metadata, and the class-body members' metadata to dynamically create a menu system for the software application.

23. The method of claim 1 further comprising using the software application metadata, the class-head metadata, and the class-body members' metadata to dynamically create a help system for the software application.

24. The method of claim 1 wherein a domain expert extends the metadata by adding the any number of additional metadata.

* * * * *